(12) United States Patent
Xu et al.

(10) Patent No.: US 11,922,005 B2
(45) Date of Patent: Mar. 5, 2024

(54) SCREEN CAPTURE METHOD AND RELATED DEVICE

(71) Applicant: Huawei Technologies Co., Ltd., Guangdong (CN)

(72) Inventors: Jie Xu, Shanghai (CN); Wen Hua, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 158 days.

(21) Appl. No.: 17/640,486

(22) PCT Filed: Sep. 2, 2020

(86) PCT No.: PCT/CN2020/113053
§ 371 (c)(1),
(2) Date: Mar. 4, 2022

(87) PCT Pub. No.: WO2021/043171
PCT Pub. Date: Mar. 11, 2021

(65) Prior Publication Data
US 2022/0334697 A1    Oct. 20, 2022

(30) Foreign Application Priority Data
Sep. 6, 2019    (CN) .......................... 201910846710.9

(51) Int. Cl.
*G06F 3/0488*    (2022.01)
*G06F 3/04817*    (2022.01)
*G06F 3/0486*    (2013.01)

(52) U.S. Cl.
CPC ........ *G06F 3/0488* (2013.01); *G06F 3/04817* (2013.01); *G06F 3/0486* (2013.01); *G06F 2203/04104* (2013.01)

(58) Field of Classification Search
CPC .... G06F 3/0488; G06F 3/0484; G06F 3/0486; G06F 3/04886; G06F 3/04817;
(Continued)

(56) References Cited

U.S. PATENT DOCUMENTS

2014/0313143 A1    10/2014    Jung et al.
2015/0212978 A1    7/2015    He et al.
(Continued)

FOREIGN PATENT DOCUMENTS

CN    107301013 A    10/2017
CN    107896279 A    4/2018
(Continued)

*Primary Examiner* — Ting Z Lee
(74) *Attorney, Agent, or Firm* — WOMBLE BOND DICKINSON (US) LLP

(57) ABSTRACT

A screen capture method includes: determining a first touch control operation, where the first touch control operation is a movement operation in which a plurality of touch control points move by a distance greater than or equal to a first preset distance threshold in a first screen, the first screen includes N split-screens, and N is a positive integer greater than 1; determining whether start positions of the plurality of touch control points during the movement in the first touch control operation are all located in a target split-screen in the first screen, where the target split-screen is any one of the N split-screens; and if the start positions of the plurality of touch control points during the movement are all located in the target split-screen in the first screen, capturing current display content of the target split-screen as a first screenshot.

22 Claims, 38 Drawing Sheets

(58) Field of Classification Search
CPC . G06F 2203/04104; G06F 2203/04803; G06F 2203/04808
See application file for complete search history.

(56) References Cited

U.S. PATENT DOCUMENTS

| | | |
|---|---|---|
| 2015/0281563 A1 | 10/2015 | Ruben et al. |
| 2017/0277403 A1* | 9/2017 | Huang ................ H04L 65/4015 |
| 2017/0277625 A1 | 9/2017 | Shtuchkin et al. |
| 2018/0160054 A1 | 6/2018 | Gandhi et al. |
| 2019/0079663 A1 | 3/2019 | Wang et al. |
| 2019/0114065 A1 | 4/2019 | Tsao et al. |
| 2019/0147026 A1* | 5/2019 | Jon ....................... G06F 40/171 |
| | | 715/230 |
| 2020/0404383 A1* | 12/2020 | Li ...................... H04N 21/8455 |
| 2022/0043544 A1* | 2/2022 | Su ........................... G06F 16/54 |

FOREIGN PATENT DOCUMENTS

| | | |
|---|---|---|
| CN | 107977144 A | 5/2018 |
| CN | 108984091 A | 12/2018 |
| CN | 109240577 A | 1/2019 |
| CN | 109358791 A | 2/2019 |
| CN | 109388304 A | 2/2019 |
| CN | 109426420 A | 3/2019 |
| CN | 109683761 A | 4/2019 |
| CN | 109976655 A | 7/2019 |
| CN | 110032418 A | 7/2019 |
| CN | 110096326 A | 8/2019 |
| CN | 110737386 A | 1/2020 |
| KR | 20150056346 A | 5/2015 |
| WO | 2016015585 A1 | 2/2016 |
| WO | 2017118391 A1 | 7/2017 |

\* cited by examiner

FIG. 2F

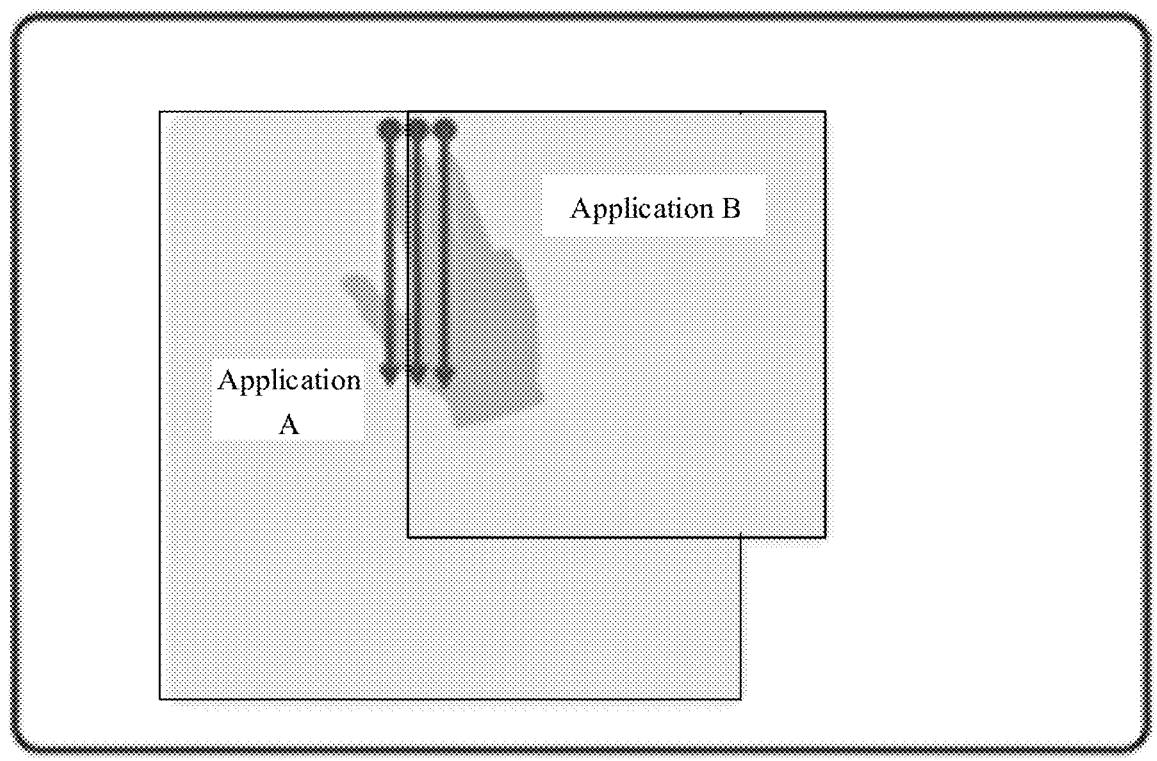
FIG. 3E(1)

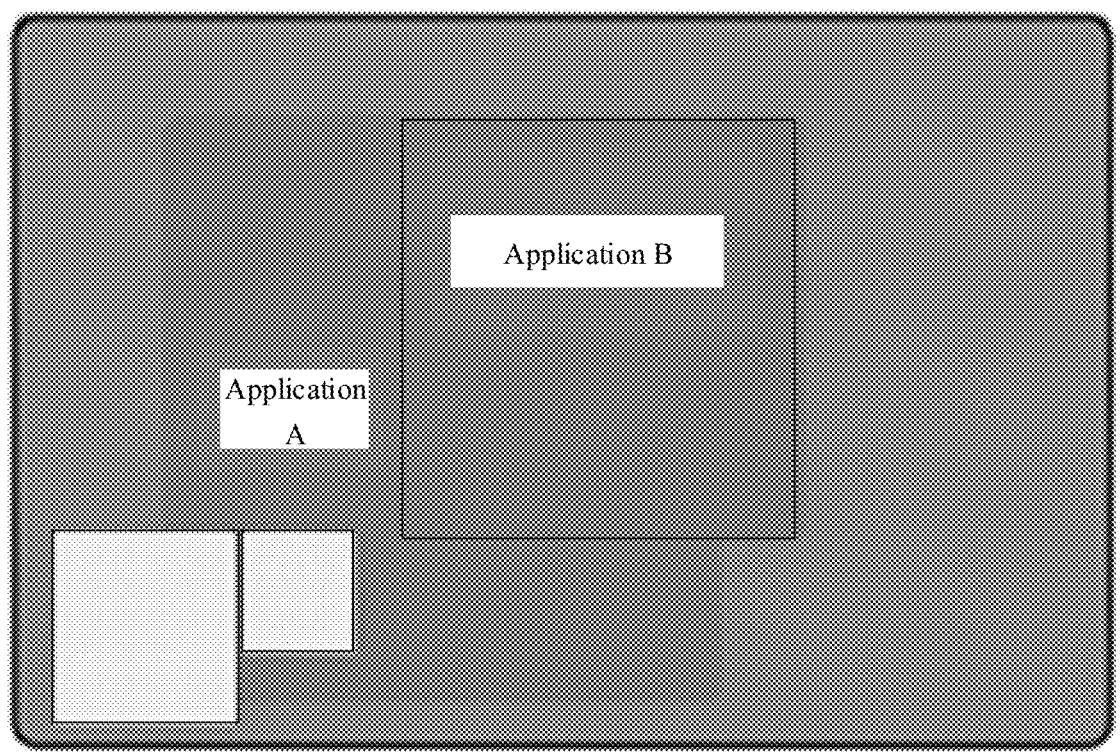
FIG. 3E(2)

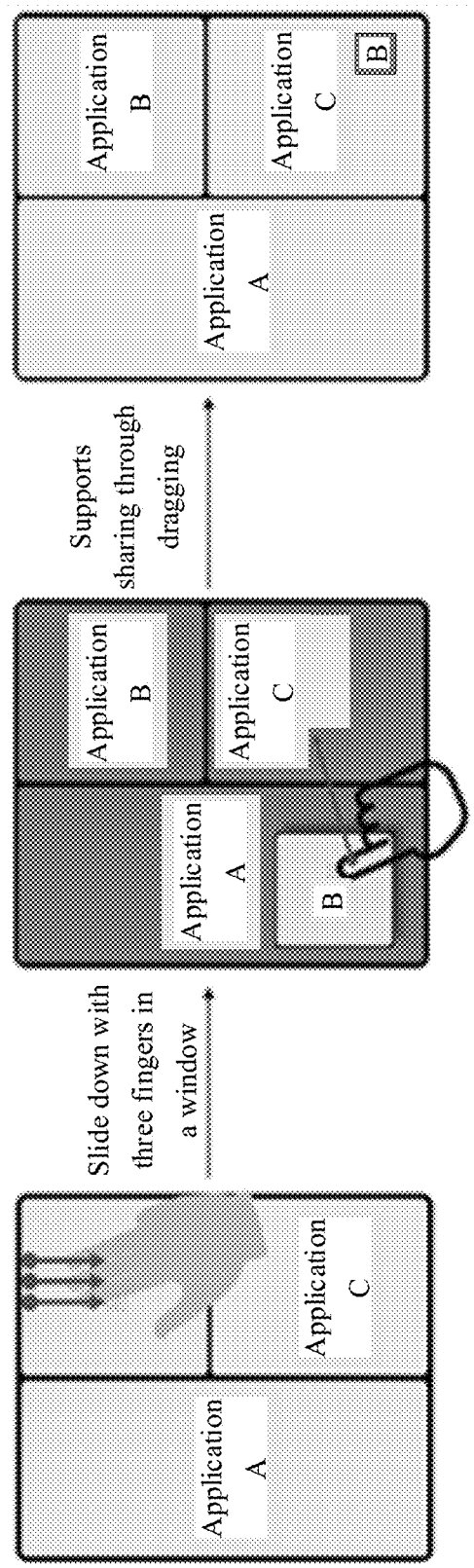

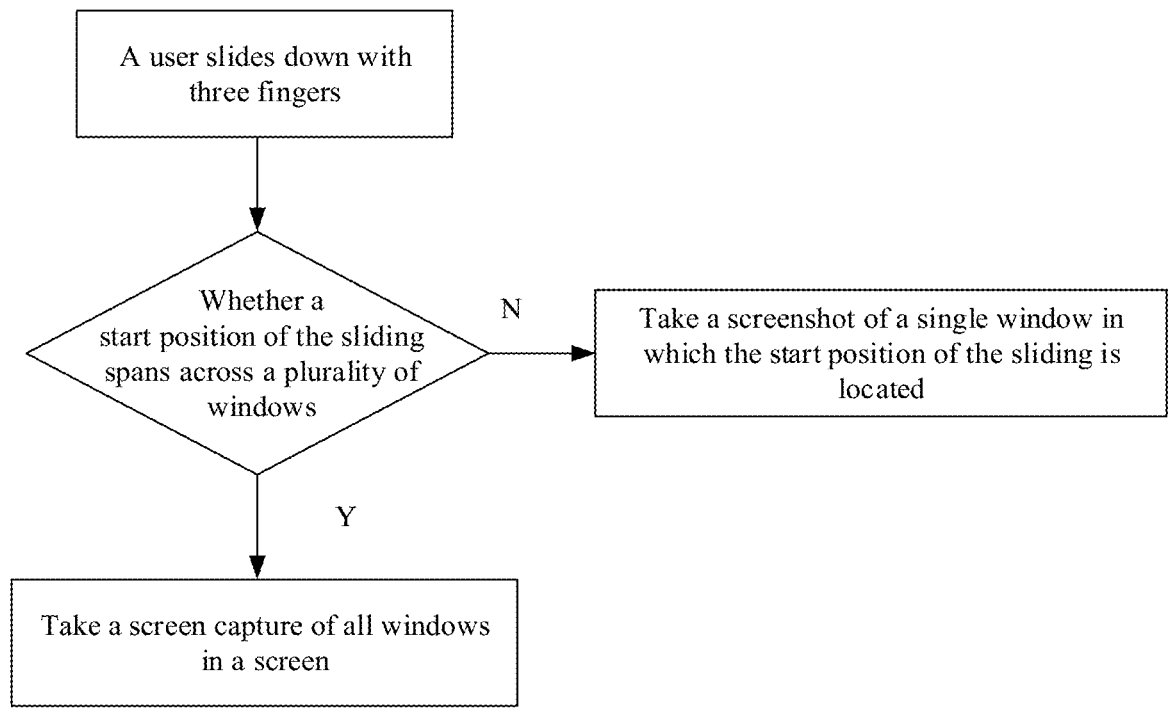
FIG. 5D(4)

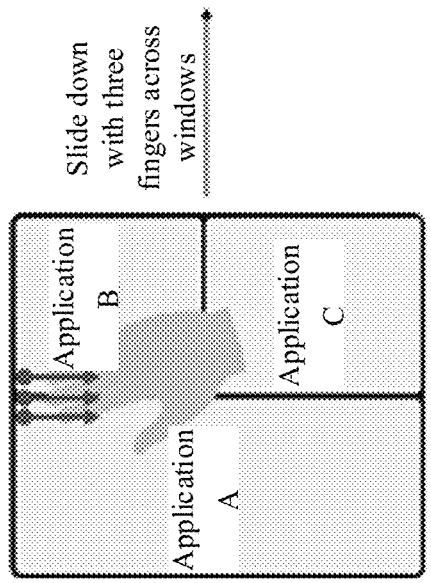
FIG. 5E(1)
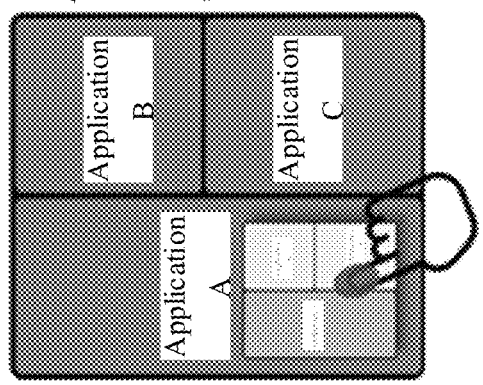
FIG. 5E(2)
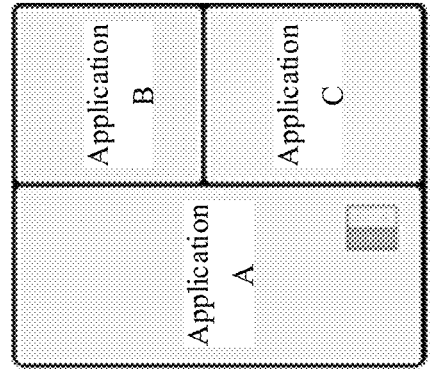
FIG. 5E(3)

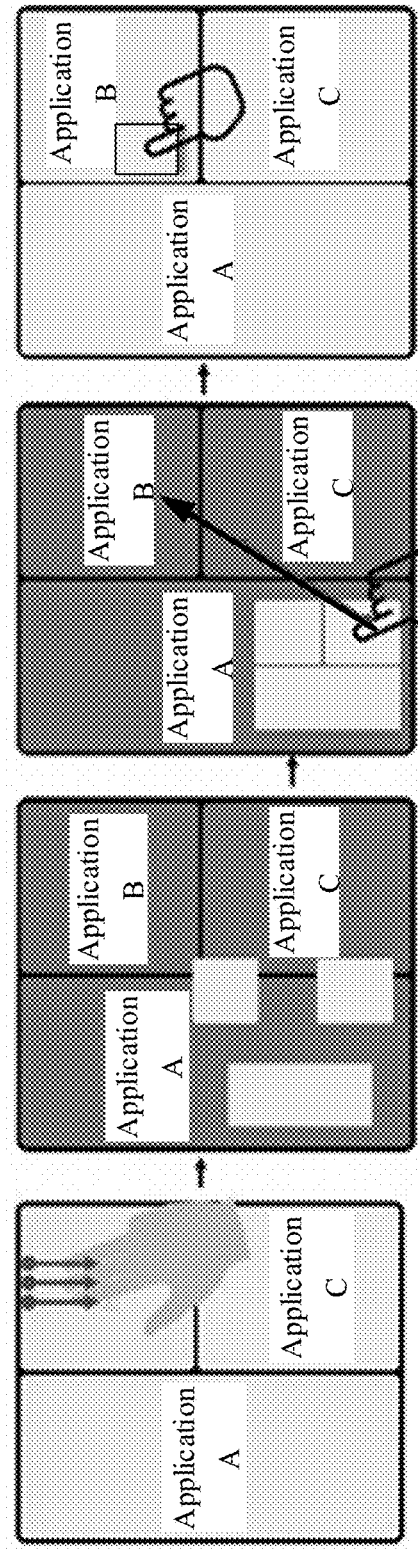
FIG. 5F(4)
FIG. 5F(3)
FIG. 5F(2)
FIG. 5F(1)

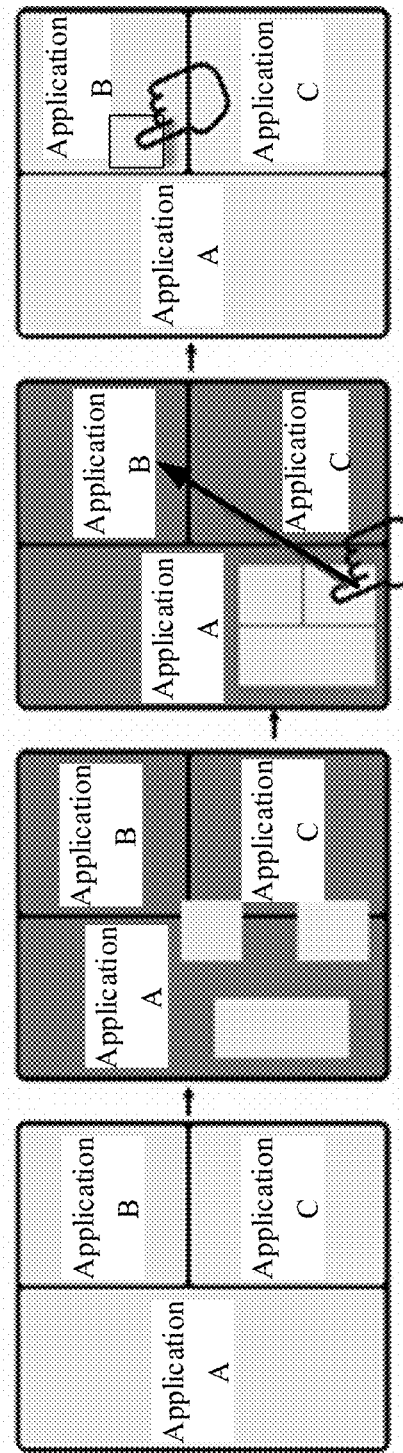

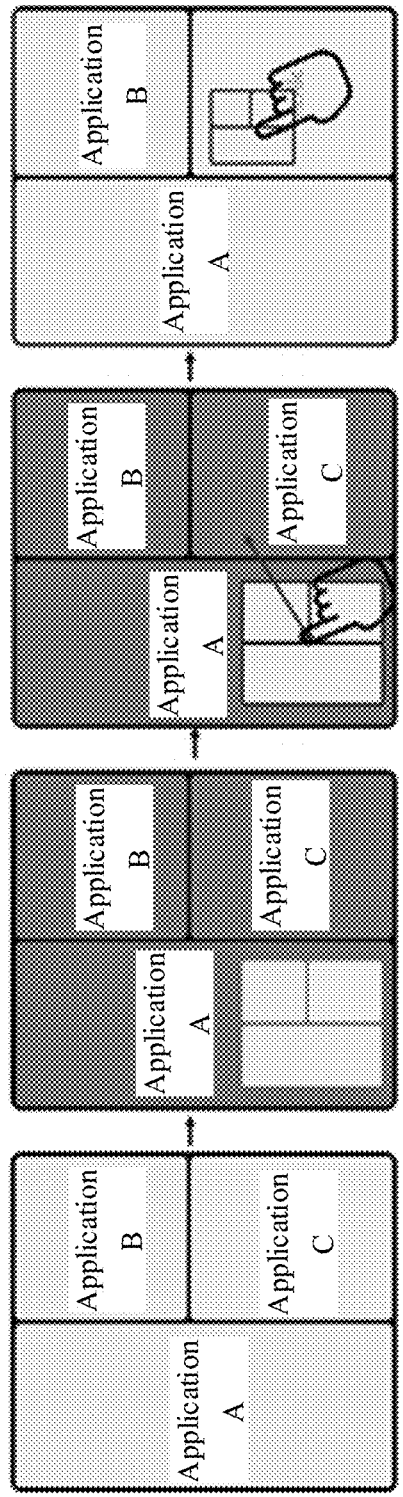

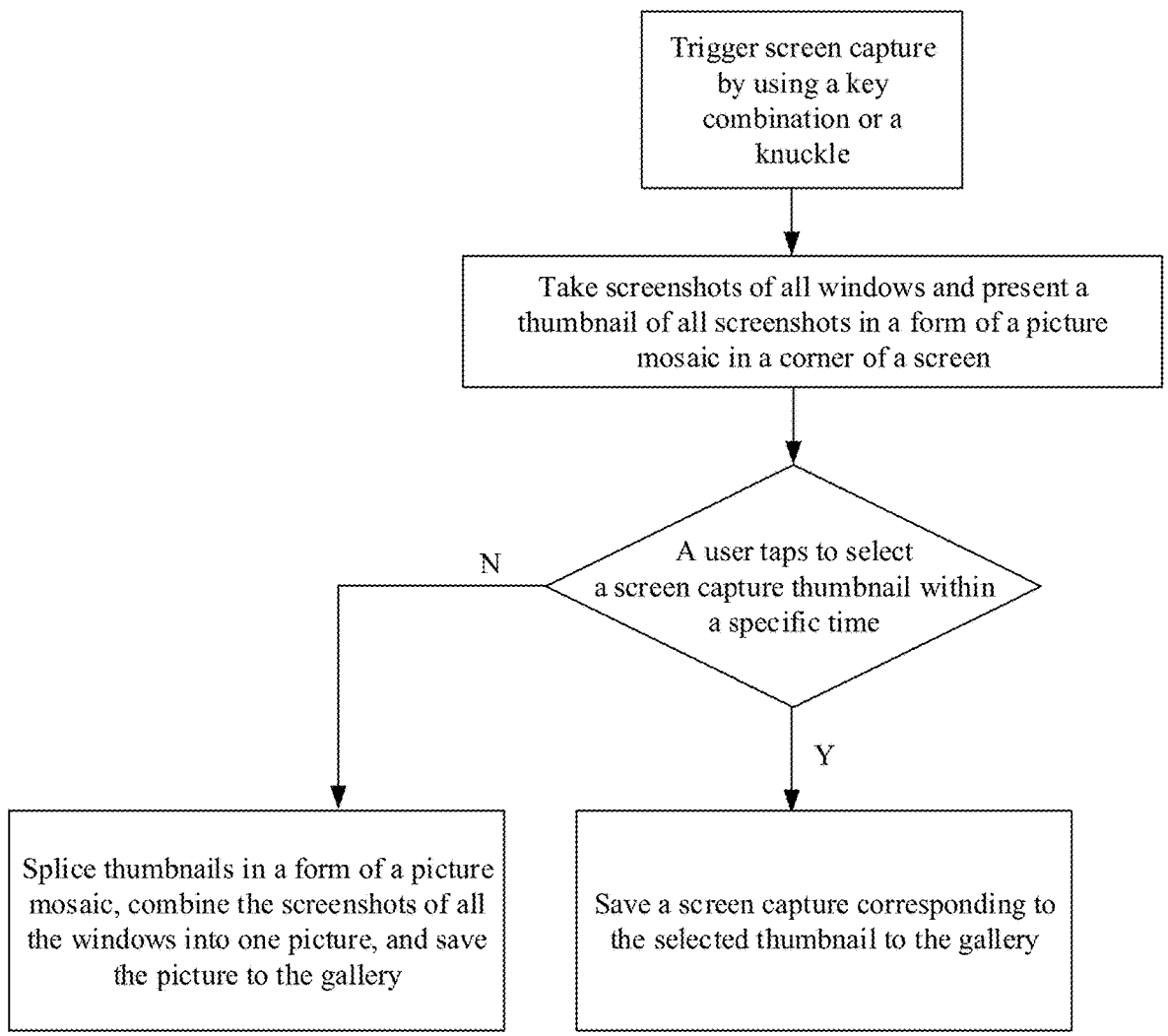
FIG. 5H(5)

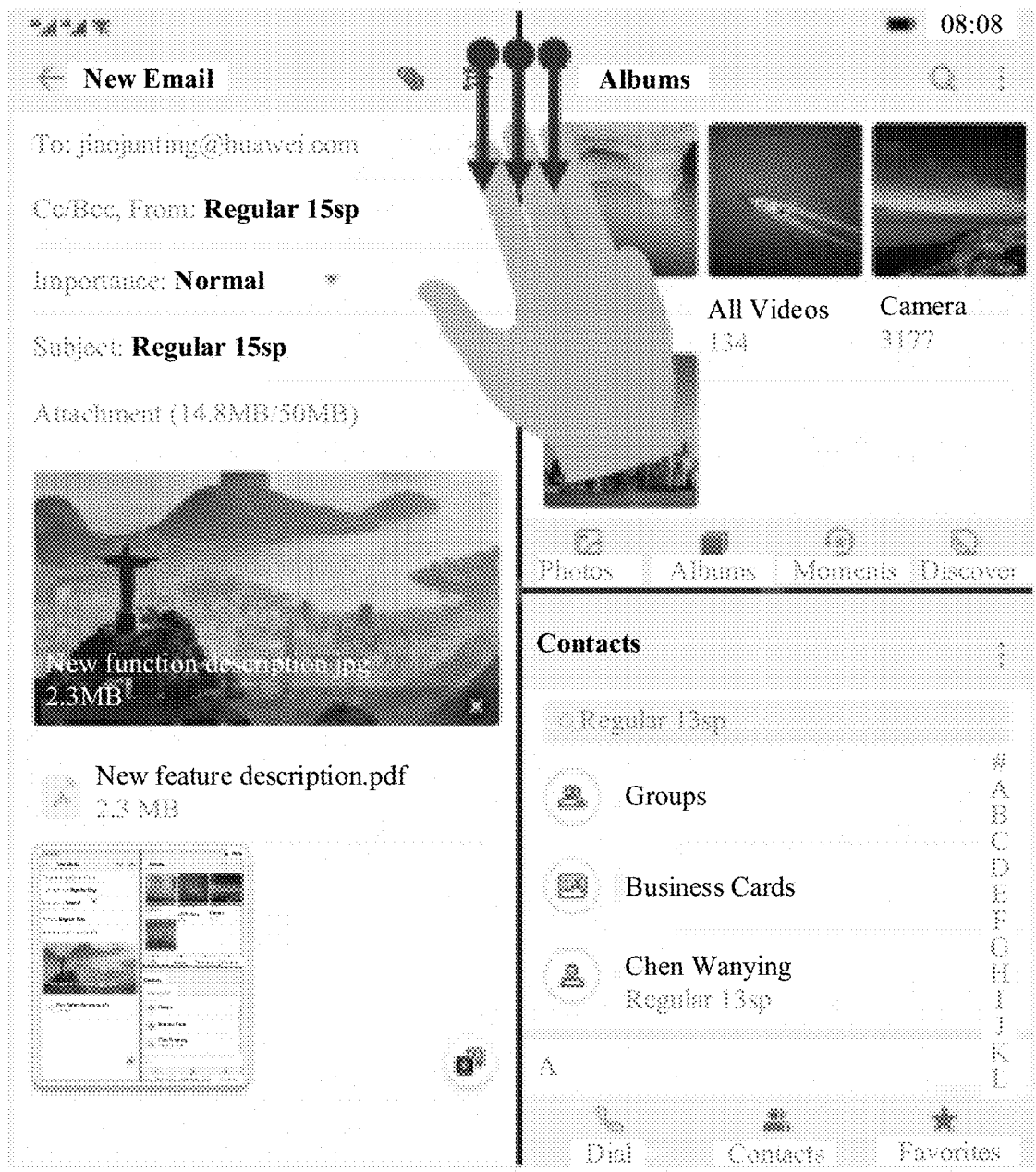
FIG. 5I(1)

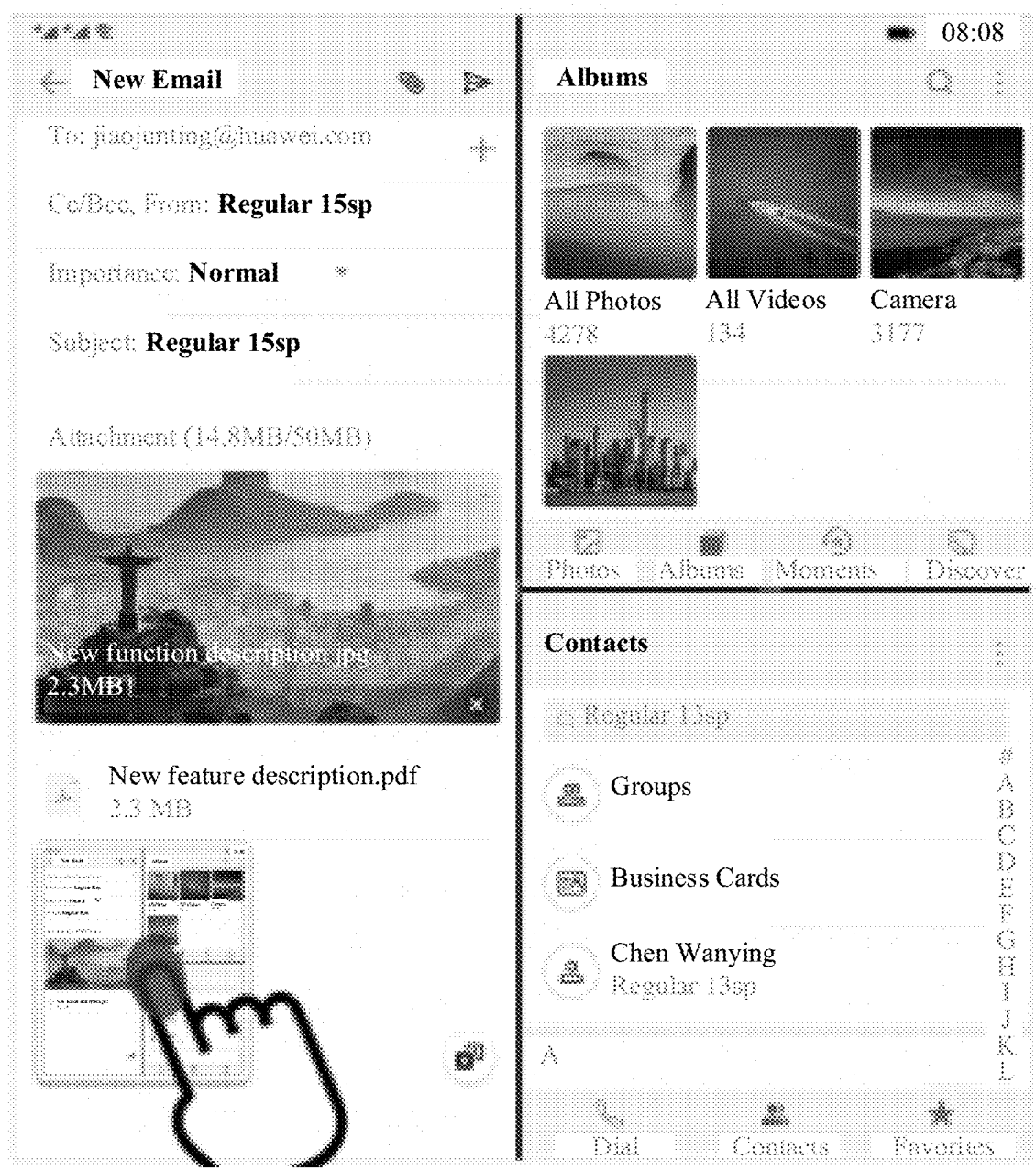
FIG. 5I(2)

SCREEN CAPTURE METHOD AND RELATED DEVICE

CROSS-REFERENCE TO RELATED APPLICATIONS

This application is a National Stage of International Application No. PCT/CN2020/113053 filed on Sep. 2, 2020, which claims priority to Chinese Patent Application No. 201910846710.9, filed on Sep. 6, 2019, both of which are hereby incorporated by reference in their entireties.

TECHNICAL FIELD

This application relates to the field of electronic device technologies, and in particular, to a screen capture method and a related device.

BACKGROUND

As network conditions become increasingly mature, user equipment provides more diversified functions. A screen capture function of an electronic device is increasingly frequently used in daily life. During screen capture, people can take a screenshot of display content on an entire screen of a terminal by performing operations such as touch control by using a knuckle or pressing a key combination. However, as use cases with a plurality of windows and a plurality of tasks on an electronic device appear more frequently in daily life of a user, capture and sharing of screen content of a single window of the plurality of windows and screen content of all of the plurality of windows also gradually become a highly frequent daily task. However, existing screen capture operations are mostly operations of taking a screenshot of an entire display of a terminal device. For a plurality of split-screen windows of an existing display or two display windows of a dual-screen terminal or a foldable-screen terminal, to separately capture one window, a user needs to capture the entire display first, and then manually remove, by using picture editing software, information displayed on other screens in the screen capture picture, to finally obtain a screenshot of one single screen. This process is cumbersome and complex, reducing efficiency in screen capture. In addition, picture editing software needs to be used, also reducing flexibly of screen capture.

Therefore, how to enable a user to capture a window more conveniently in the case of a plurality of windows is a problem that needs to be resolved urgently.

SUMMARY

In view of the foregoing problem, this application is proposed, to provide a screen capture method and a related device to overcome the foregoing problem or at least partially resolve the foregoing problem.

According to a first aspect, an embodiment of this application provides a screen capture method, which may include:

determining a first touch control operation, where the first touch control operation is a movement operation in which a plurality of touch control points move by a distance greater than or equal to a first preset distance threshold in a first screen, the first screen includes N split-screens, and N is a positive integer greater than 1;

determining whether start positions of the plurality of touch control points during the movement in the first touch control operation are all located in a target split-screen in the first screen, where the target split-screen is any one of the N split-screens; and if the start positions of the plurality of touch control points during the movement are all located in the target split-screen in the first screen, capturing current display content of the target split-screen as a first screenshot.

By using the method provided in the first aspect, in this embodiment of this application, the first touch control operation may be determined from a plurality of received touch control operations, and whether the start positions of the plurality of touch control points during the movement in the first touch control operation are all located in the target split-screen in the first screen may be determined. If yes, the current display content of the target split-screen is captured as the first screenshot. Therefore, in this way, after it is determined that the start positions of the plurality of touch control points are all located in the same screen, a screenshot of the single screen can be directly obtained from a plurality of windows. This can achieve the purpose of flexibly and rapidly obtaining a screenshot of a target split-screen area, so that a user can obtain the screenshot within a relatively short time. In addition, it is unnecessary to place a screen capture picture in picture editing software to manually remove display information of other split-screens in the screen capture picture, thereby simplifying a screenshot taking operation for the user.

In an embodiment, the first screenshot is a thumbnail, and if the start positions of the plurality of touch control points during the movement are all located in the target split-screen in the first screen, the method further includes: capturing current display content of the N split-screens in the first screen as corresponding screenshots; and generating a second screenshot, where the second screenshot includes the screenshots corresponding to the N split-screens, the screenshots are arranged in the second screenshot in a manner in which the corresponding split-screens are distributed in the first screen, and each of the screenshots corresponding to the N split-screens is a thumbnail that is allowed to receive a touch control operation. In this embodiment of this application, an electronic device first determines whether the start positions of the plurality of touch control points during the movement in the first touch control operation are all located in the target split-screen in the first screen. If yes, not only the current display content of the target split-screen is captured as the first screenshot, the current display content of the N split-screens in the first screen further needs to be captured as corresponding screenshots, and the second screenshot is generated. It should be noted that the screenshots corresponding to the N split-screens in the second screenshot each may independently receive a touch control operation. In other words, the screenshots that correspond to the N split-screens and that are included in the second screenshot exist independent of each other and are not connected to each other. In addition, a distribution manner of the screenshots corresponding to the N split-screens is the same as a distribution manner of the corresponding split-screens in the first screen. For example, the first screen includes a first split-screen and a second split-screen. After a first touch control operation of the user on the first split-screen is received, a screenshot of the first split-screen is taken, to obtain a corresponding first screenshot. Then, a screenshot of the first split-screen and a screenshot of the second split-screen are separately taken, and a corresponding second screenshot is generated. The first screenshot and the second screenshot are both thumbnails and float over the first screen. In summary, after the screenshot of the target split-screen is taken, screenshots of all split-screens are taken, to prevent misjudgment of an operation intention of the user by the electronic device or misjudgment of a target split-screen caused by a misoperation of the user, thereby improving accuracy of screenshot taking and user experience in screenshot taking.

In an embodiment, the first screenshot is a thumbnail, and the method further includes: receiving a screen capture operation performed by using a knuckle or a screen capture operation performed by pressing a key combination; capturing current display content of all split-screens in the first screen as corresponding screenshots based on an instruction of the screen capture operation performed by using a knuckle or an instruction of the screen capture operation performed by pressing a key combination; and generating a second screenshot, where the second screenshot includes screenshots corresponding to the N split-screens, the screenshots are arranged in the second screenshot in a manner in which the corresponding split-screens are distributed in the first screen, and each of the screenshots corresponding to the N split-screens is a thumbnail that is allowed to receive a touch control operation. In this embodiment of this application, the second screenshot generated in this embodiment of this application includes the thumbnails of the screenshots corresponding to the split-screens. The thumbnails of the screenshots corresponding to the plurality of split-screens are independent of each other, and the thumbnail corresponding to each split-screen can independently receive a touch control operation, to facilitate sharing and editing for the user. It is also unnecessary for the user to enter picture editing software to separately edit and crop an entire screenshot to obtain a screenshot of a single split-screen, thereby greatly improving user experience in screenshot taking and simplifying an operation process of screenshot taking.

In an embodiment, the method further includes: receiving a second touch control operation, where the second touch control operation is an operation of tapping a target screen capture thumbnail in the first screenshot or the second screenshot, and the target screen capture thumbnail is at least one of screen capture thumbnails corresponding to the N split-screens in the first screenshot or the second screenshot; and saving the target screen capture thumbnail to the gallery based on the second touch control operation, and deleting all screenshots except the target screen capture thumbnail in the first screenshot or the second screenshot. In this embodiment of this application, the second touch control operation may be used to select the target screen capture thumbnail in the first screenshot or the second screenshot, to determine the target screen capture thumbnail, in the plurality of screenshots, that the user expects to keep. In addition, when the target screen capture thumbnail in the first screenshot or the second screenshot is tapped, all screenshots except the target screen capture thumbnail may be deleted. It should be noted that the target screen capture thumbnail may be screenshots corresponding to a plurality of split-screens. A second operation may be implemented to prevent misjudgment, by the electronic device, of a first operation of the user. Alternatively, when the instruction of the screen capture operation performed by using a knuckle or the instruction of the screen capture operation performed by pressing a key combination is received, and a single split-screen needs to be captured, it is unnecessary to perform secondary editing in picture editing software, thereby simplifying a screenshot taking operation for the user.

In an embodiment, the method further includes: receiving a drag operation on the target screen capture thumbnail, where the drag operation is an operation of moving the target screen capture thumbnail by using at least one touch control point; and controlling, based on the drag operation, the target screen capture thumbnail to be shared or inserted to a split-screen area in which an end position of movement of the drag operation is located. In this embodiment of this application, sharing of the target split-screen to an application included in any one of the N split-screens in the first screen may be directly implemented by performing the drag operation on the target screen capture thumbnail. The target screen capture thumbnail may be controlled, based on the drag operation, to be shared or inserted to the split-screen area in which the end position of the movement of the drag operation is located. In a conventional technology, to share the target screen capture thumbnail to a split-screen included in the first screen, an operation of selecting a target application further needs to be performed in addition to a sharing operation. Compared with the conventional technology, the manner of direct dragging to the target application simplifies a process of sharing the target screen capture thumbnail, improving user experience in operation.

In an embodiment, the method further includes: if the second touch control operation is not received within a first time period after any one of the first touch control operation, the instruction of the screen capture operation performed by using a knuckle, or the instruction of the screen capture operation performed by pressing a key combination is received, splicing all screen captures in the second screenshot into one picture and saving the picture and the first screenshot to the gallery. Therefore, in this embodiment of this application, after a screenshot taking instruction issued by the user is received, if no other operation of obtaining a screenshot based on the screenshot taking instruction is received again within a time period, the obtained screenshot may be directly saved, so that the screenshot can be subsequently used again by the user, without a need to take a screenshot again, thereby avoiding a waste of resources. The screenshot taking instruction may include any operation of the first touch control operation, the instruction of the screen capture operation performed by using a knuckle, or the instruction of the screen capture operation performed by pressing a key combination.

In an embodiment, the method further includes: if the start positions of the plurality of touch control points during the movement are not all located in the target split-screen in the first screen, capturing current display content of the first screen as a third screenshot and saving the third screenshot to the gallery. In this embodiment of this application, the electronic device first determines whether the start positions of the plurality of touch control points during the movement in the first touch control operation are all located in the target split-screen in the first screen. If not, to be specific, if the start positions of the plurality of touch control points during the movement in the first touch control operation are located in areas of at least two split-screens, current display content of all the split-screens in the first screen is captured as the third screenshot. Therefore, in this embodiment of this application, if the user needs to capture display content of the entire screen, the user only needs to place the start positions of the plurality of touch control points during the movement in areas of at least two split-screens and a screenshot of the first screen can be taken. This avoids problems of a cumbersome screen capture operation and a relatively long time of screen capture for the user, thereby improving user experience in screen capture.

In an embodiment, the method further includes: if the plurality of touch control points move by a distance length greater than or equal to a second preset distance threshold during movement in the target split-screen, taking a long screen capture of a split-screen area of the target split-screen, where the second preset distance threshold is greater than the first preset distance threshold and a ratio between the second preset distance threshold and a height of the target split-screen is greater than a preset ratio threshold; or if the first touch control operation on the target split-screen is received again within a second time period after the first touch control operation is received, taking a long screen capture of a split-screen area of the target split-screen; or if the first touch control operation includes four touch control points, taking a long screen capture of a split-screen area of the target split-screen. In this embodiment of this application, the electronic device may take a long screen capture of the target split-screen in the first screen. The target split-screen may be any one of the N split-screens. It should be understood that different operation methods are available for triggering an operation of taking a long screen capture, and results of performing the operations of taking a long screen capture are also different. A plurality of trigger modes are available for taking a long screen capture. This avoids the problems of a cumbersome screen capture operation and a relatively long time of screen capture for the user, thereby improving user experience in screen capture.

According to a second aspect, an embodiment of this application provides an electronic device. The electronic device includes one or more processors, a memory, and one or more keys, where the memory, the display, and the one or more keys are coupled to the one or more processors, the memory is configured to store computer program code, the computer program code includes computer instructions, and the one or more processors execute the computer instructions to perform the following operations:

determining a first touch control operation, where the first touch control operation is a movement operation in which a plurality of touch control points move by a distance greater than or equal to a first preset distance threshold in a first screen, the first screen includes N split-screens, and N is a positive integer greater than 1;

determining whether start positions of the plurality of touch control points during the movement in the first touch control operation are all located in a target split-screen in the first screen, where the target split-screen is any one of the N split-screens; and if the start positions of the plurality of touch control points during the movement are all located in the target split-screen in the first screen, capturing current display content of the target split-screen as a first screenshot.

In an embodiment, the first screenshot is a thumbnail, and the processor is further configured to: if the start positions of the plurality of touch control points during the movement are all located in the target split-screen in the first screen, capture current display content of the N split-screens in the first screen as corresponding screenshots; and generate a second screenshot, where the second screenshot includes the screenshots corresponding to the N split-screens, the screenshots are arranged in the second screenshot in a manner in which the corresponding split-screens are distributed in the first screen, and each of the screenshots corresponding to the N split-screens is a thumbnail that is allowed to receive a touch control operation.

In an embodiment, the first screenshot is a thumbnail, and the processor is further configured to: receive a screen capture operation performed by using a knuckle or a screen capture operation performed by pressing a key combination; capture current display content of all split-screens in the first screen as corresponding screenshots based on an instruction of the screen capture operation performed by using a knuckle or an instruction of the screen capture operation performed by pressing a key combination; and generate a second screenshot, where the second screenshot includes screenshots corresponding to the N split-screens, the screenshots are arranged in the second screenshot in a manner in which the corresponding split-screens are distributed in the first screen, and each of the screenshots corresponding to the N split-screens is a thumbnail that is allowed to receive a touch control operation.

In an embodiment, the processor is further configured to: receive a second touch control operation, where the second touch control operation is an operation of tapping a target screen capture thumbnail in the first screenshot or the second screenshot, and the target screen capture thumbnail is at least one of screen capture thumbnails corresponding to the N split-screens in the first screenshot or the second screenshot; and save the target screen capture thumbnail to the gallery based on the second touch control operation, and delete all screenshots except the target screen capture thumbnail in the first screenshot or the second screenshot.

In an embodiment, the processor is further configured to: receive a drag operation on the target screen capture thumbnail, where the drag operation is an operation of moving the target screen capture thumbnail by using at least one touch control point; and control, based on the drag operation, the target screen capture thumbnail to be shared or inserted to a split-screen area in which an end position of movement of the drag operation is located.

In an embodiment, the processor is further configured to: if the second touch control operation is not received within a first time period after any one of the first touch control operation, the instruction of the screen capture operation performed by using a knuckle, or the instruction of the screen capture operation performed by pressing a key combination is received, splice all screen captures in the second screenshot into one picture and save the picture and the first screenshot to the gallery.

In an embodiment, the processor is further configured to: if the start positions of the plurality of touch control points during the movement are not all located in the target split-screen in the first screen, capture current display content of the first screen as a third screenshot and save the third screenshot to the gallery.

In an embodiment, the processor is further configured to: if the plurality of touch control points move by a distance length greater than or equal to a second preset distance threshold during movement in the target split-screen, take a long screen capture of a split-screen area of the target split-screen, where the second preset distance threshold is greater than the first preset distance threshold and a ratio between the second preset distance threshold and a height of the target split-screen is greater than a preset ratio threshold; or if the first touch control operation on the target split-screen is received again within a second time period after the first touch control operation is received, take a long screen capture of a split-screen area of the target split-screen; or if the first touch control operation includes four touch control points, take a long screen capture of a split-screen area of the target split-screen.

According to a third aspect, an embodiment of this application provides a computer storage medium, including computer instructions. When the computer instructions run on an electronic device, the electronic device is enabled to perform the screen capture method according to any one of the first aspect of the embodiments of this application or the implementations of the first aspect.

According to a fourth aspect, an embodiment of this application provides a computer program product. When the computer program product runs on an electronic device, the electronic device is enabled to perform the screen capture method according to any one of the first aspect of the embodiments of this application or the implementations of the first aspect.

It can be understood that all of the electronic device provided in the second aspect, the computer storage medium provided in the third aspect, and the computer program product provided in the fourth aspect may be configured to perform the screen capture method provided in the first aspect. For attainable beneficial effects thereof, refer to the beneficial effects of the screen capture method provided in the first aspect. Details are not described herein again.

BRIEF DESCRIPTION OF DRAWINGS

To describe the technical solutions in the embodiments of this application or in the background more clearly, the following describes the accompanying drawings required in the embodiments of this application or the background.

FIG. 2F to FIG. 2H show a group of user interfaces for confirming, saving, and sharing a screen capture thumbnail according to an embodiment of this application;

FIG. 3E(1) and FIG. 3E(2) show another group of user interfaces on which display content of a first screen is captured as a picture by using a first touch control operation according to an embodiment of this application;

FIG. 5D(1) to FIG. 5D(4) are schematic diagrams of a group of user interfaces on which a screenshot of a single screen is taken and shared to a current split-screen according to an embodiment of this application;

FIG. 5E(1) to FIG. 5E(3) are schematic diagrams of a group of user interfaces on which a screenshot of an entire screen is taken and shared to a current split-screen according to an embodiment of this application;

FIG. 5F(1) to FIG. 5F(4) are schematic diagrams of another group of user interfaces on which a screenshot of a single screen is taken and shared to a current split-screen according to an embodiment of this application;

FIG. 5G(1) to FIG. 5G(4) are schematic diagrams of still another group of user interfaces on which a screenshot of a single screen is taken and shared to a current split-screen according to an embodiment of this application;

FIG. 5H(1) to FIG. 5H(5) are schematic diagrams of another group of user interfaces on which a screenshot of an entire screen is taken and shared to a current split-screen according to an embodiment of this application; and FIG. 5I(1) and FIG. 5I(2) are schematic diagrams of a group of user interfaces on which a screenshot of a single screen is taken and shared to an application included in a current interface in actual application according to an embodiment of this application.

DESCRIPTION OF EMBODIMENTS

Figure 1A:
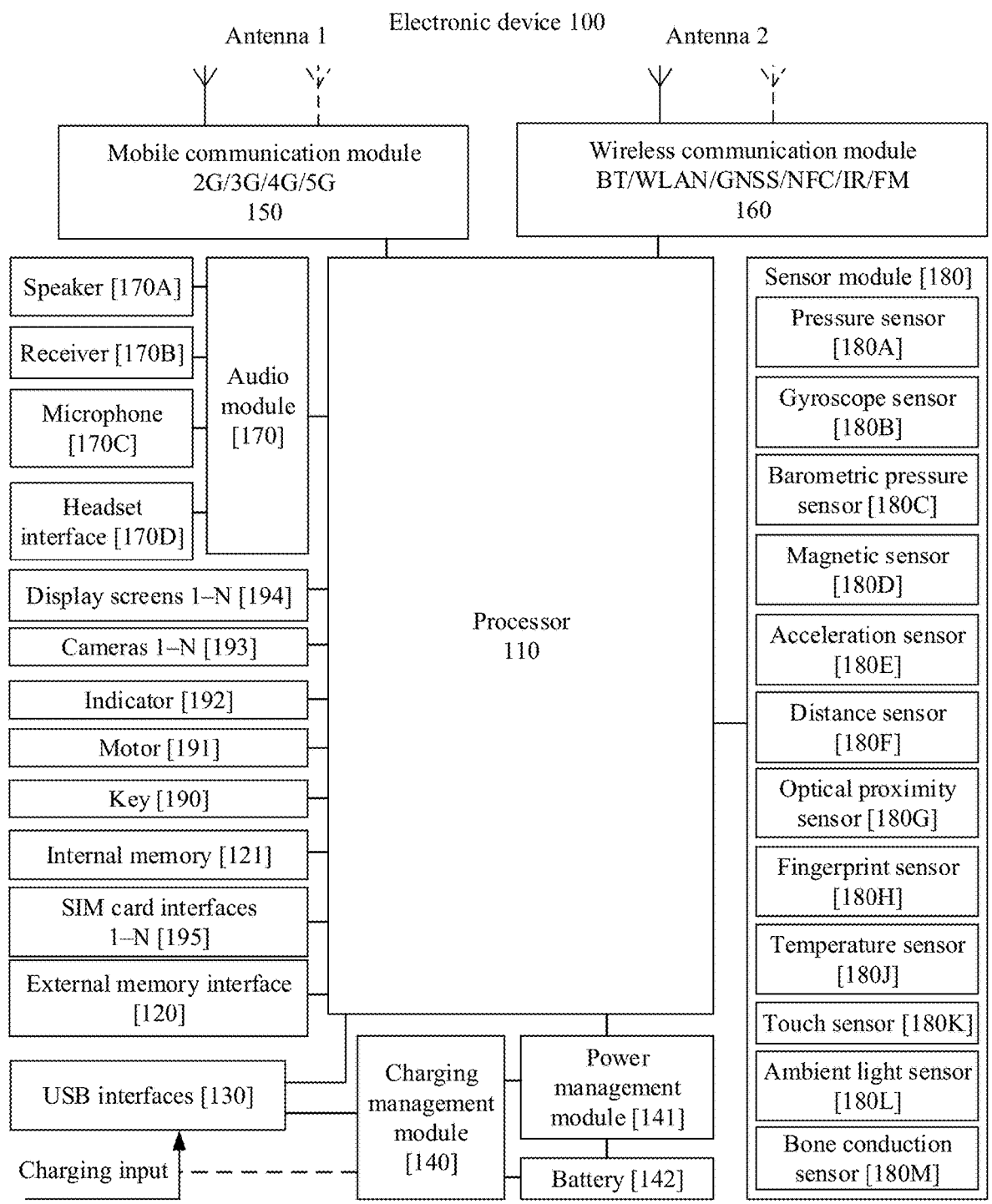
FIG. 1A is a schematic diagram of a structure of an electronic device 100 according to an embodiment of this application.

The following describes embodiments of this application with reference to the accompanying drawings in the embodiments of this application.

In the specification, claims, and accompanying drawings of this application, the terms such as "first", "second", and "third" are intended to distinguish between different objects but do not describe a specific sequence. In addition, the terms such as "include", "comprise", "have" and any variants thereof are intended to cover non-exclusive inclusion. For example, a process, method, system, product, or device that includes a series of operations or units is not limited to the listed operations or units, but may, in some embodiments, further include other operations or units that are not listed, or, in some embodiments, further includes other operations or units inherent to such a process, method, system, product, or device.

An "embodiment" mentioned in this application means that a specific feature, structure, or characteristic described with reference to the embodiment may be included in at least one embodiment of this application. The phrase occurred at different locations in the specification does not necessarily refer to a same embodiment, or an independent or alternate embodiment exclusive of another embodiment. Persons skilled in the art understand, in explicit and implicit manners, that an embodiment described in this application may be combined with another embodiment.

Terms such as "component", "module", and "system" used in this specification are used to represent computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process according to, for example, a signal having one or more data packets (for example, data from two components interacting with another component in a local system, a distributed system, and/or across a network, such as the Internet interacting with other systems by using the signal).

In the specification, claims, and accompanying drawings of this application, the terminal "user interface (UI)" is a medium interface for an application or an operating system to interact or exchange information with a user. The UI converts information from an internal form to a form that is acceptable to the user. A user interface of an application is source code written in a specific computer language such as Java and extensible markup language (XML). The source code of the interface is parsed and rendered on a terminal device and is finally presented as content recognizable by a user, for example, a picture, text, or a control such as a button. A control is also referred to as a widget and is a basic element of the user interface. Typical controls include a toolbar, a menu bar, a text box, a button, a scrollbar, a picture, and text. An attribute and content of a control on the interface is defined by a label or a node. For example, in XML, controls included in an interface are stipulated by using nodes such as <Textview>, <ImgView>, and <VideoView>. One node corresponds to one control or attribute on the interface, and the node is parsed and rendered and then presented as content visible to a user. In addition, interfaces of many applications, for example, a hybrid application, usually further include a web page. A web page is also referred to as a page, and can be understood as a special control embedded in an interface of an application. A web page is source code written in a specific computer language, for example, hypertext markup language (HTML), cascading style sheets (CSS), or JavaScript (JS). Source code of a web page can be loaded by a browser or a web page display component with a similar function as the browser and displayed as content recognizable by a user. Specific content included by a web page is also defined by a label or a node in source code of the web page. For example, in HTML, <p>, <img>, <video>, and <canvas> are used to define elements and attributes of a web page.

A common presentation form of a user interface is a graphical user interface (GUI), which is a user interface that is related to a computer operation and that is displayed in a graphical manner. A GUI may be an interface element such as an icon, a window, or a control that is displayed on a display of an electronic device. The control may include a visual interface element such as an icon, a button, a menu, a tab, a text box, a dialog box, a status bar, a navigation bar, or a widget.

First, some terms in this application are explained and described, to facilitate understanding by persons skilled in the art.

(1) Window: A window is a most important part of a user interface. A window is a rectangular area corresponding to an application on a screen and includes a framework and a customer area. A window is a visual interface between a user and an application that produces the window. Each time a user starts to run an application, the application creates and displays a window. When the user operates an object in the window, the program responds accordingly. The user terminates running of a program by closing a window, and selects a corresponding application by selecting a corresponding application window.

(2) A touch sensor is a device that captures and records physical touch or hugging on a device and/or an object. The touch sensor enables the device or object to detect touch usually from a human user or operator. A touch sensor may also be referred to as a touch detector.

Next, an example electronic device provided in the following embodiments of this application is described.

FIG. 1A is a schematic diagram of a structure of an electronic device 100 according to an embodiment of this application. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset interface 170D, a sensor module 180, a key 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of this application does not constitute a specific limitation on the electronic device 100. In some other embodiments of this application, the electronic device 100 may include more or fewer components than those illustrated in the figure, combine some components, split some components, or have a different component arrangement. The illustrated components may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a neural center and a command center of the electronic device 100. The controller may generate an operation control signal based on an instruction operation code and a sequence signal, to control a fetch instruction and an execution instruction.

The processor 110 may further be provided with a memory, configured to store instructions and data. In some embodiments, the memory in the processor 110 may be a cache. The memory may store an instruction or data recently used or cyclically used by the processor 110. If the processor 110 needs to use the instruction or data again, the processor 110 may directly invoke the instruction or data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general purpose input/output (GPIO) interface, a subscriber identity module (SIM) interface, a universal serial bus (USB) interface, and/or the like.

It can be understood that an interface connection relationship between the modules illustrated in this embodiment of this application is merely intended for an illustrative purpose, and does not limit a structure of the electronic device 100. In some other embodiments of this application, the electronic device 100 may alternatively use an interface connection mode different from that in this embodiment or combine a plurality of interface connection modes.

The charging management module 140 is configured to receive a charging input from a charger. The charger may be a wireless charger, or may be a wired charger. In some wired charging embodiments, the charging management module 140 may receive a charging input from a wired charger through the USB interface 130. In some wireless charging embodiments, the charging management module 140 may receive a wireless charging input from a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives an input from the battery 142 and/or the charging management module 140, to supply power to the processor 110, the internal memory 121, an external memory, the display 194, the camera 193, the wireless communication module 160, and the like. The power management module 141 may further be configured to monitor parameters such as a battery capacity, a quantity of battery circles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be multiplexed, to improve antenna utilization. For example, the antenna 1 may be multiplexed as a diversity antenna of a wireless local area network. In some other embodiments, an antenna may be used in combination with a tuning switch.

The mobile communication module 150 may provide a wireless communication solution applied to the electronic device 100, including 2G, 3G, 4G, 5G, or the like. The mobile communication module 150 may include at least one filter, a switch, a power amplifier, a low noise amplifier (LNA), and the like. The mobile communication module 150 may receive an electromagnetic wave through the antenna 1; perform filtering, amplification, and other processing on the received electromagnetic wave; and transfer a processed electromagnetic wave to the modem processor for demodulation. The mobile communication module 150 may further amplify a signal modulated by the modem processor, convert an amplified signal into an electromagnetic wave by using the antenna 1, and radiate the electromagnetic wave through the antenna 1. In some embodiments, at least some function modules of the mobile communication module 150 may be disposed in the processor 110. In some embodiments, at least some function modules of the mobile communication module 150 may be disposed in a same device as at least some modules of the processor 110.

The modem processor may include a modulator and a demodulator. In some embodiments, the modem processor may be an independent device. In some other embodiments, the modem processor may be independent of the processor 110, and is disposed in a same device as the mobile communication module 150 or another function module.

The wireless communication module 160 may provide a wireless communication solution applied to the electronic device 100, including a wireless local area network (WLAN) (for example, a wireless fidelity (Wi-Fi) network), bluetooth (BT), a global navigation satellite system (GNSS), frequency modulation (FM), a near field communication (NFC) technology, an infrared (IR) technology, and the like. The wireless communication module 160 may be one or more devices integrated with at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification processing on the to-be-sent signal, convert a processed to-be-sent signal into an electromagnetic wave by using the antenna 2, and radiate the electromagnetic wave through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, IR, and/or other technologies. The GNSS may include a global positioning system (GPS), a global navigation satellite system (GLONASS), a beidou navigation satellite system (BDS), a quasi-zenith satellite system (QZSS), and/or a satellite-based augmentation system (SBAS).

The electronic device 100 implements a display function by using the GPU, the display 194, and the application processor. The GPU is a microprocessor for image processing, and is connected to the display 194 and the application processor. The GPU is configured to perform mathematical and geometric calculation, and is configured to perform graphics rendering. The processor 110 may include one or more GPUs, and execute a program instruction to generate or change display information.

The display 194 is configured to display an image, a video, and the like. The display 194 includes a display panel. The display panel may use a liquid crystal display (LCD), an organic light-emitting diode (OLED), an active-matrix organic light emitting diode (AMOLED), a flexible light-emitting diode (FLED), a mini LED, a micro LED, a micro OLED, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, after a shutter is opened, light is transferred to a photosensitive element of the camera, an optical signal is converted into an electrical signal, and the photosensitive element of the camera transfers the electrical signal to the ISP for processing, to convert the electrical signal into an image visible to human eyes. The ISP may further perform algorithm-based optimization on the image in terms of noise, brightness, and skin color. The ISP may further optimize parameters such as an exposure and a color temperature of a photographing scenario. In some embodiments, the ISP may be disposed in the camera 193.

The camera 193 is configured to capture a static image or a video. An optical image of an object is generated through a lens and is projected to the photosensitive element. The photosensitive element may be a charge coupled device (CCD) or a complementary metal-oxide-semiconductor (CMOS)-based phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard RGB or YUV format or the like. In some embodiments, the electronic device 100 may include one or N cameras 193, where N is a positive integer greater than 1.

The digital signal processor is configured to process a digital signal. The digital signal processor not only can process the digital image signal, but also can process another digital signal. For example, when the electronic device 100 selects a frequency, the digital signal processor is configured to perform Fourier transformation on frequency energy, or the like.

The video codec is configured to compress or decompress a digital video. The electronic device 100 can support one or more types of video codecs. In this way, the electronic device 100 may play or record videos in a plurality of encoding formats, for example, moving picture experts group (MPEG)-1, MPEG-2, MPEG-3, and MPEG-4.

The NPU is a neural-network (NN) computation processor that rapidly processes input information by using a biological neural network structure, for example, by using a mode of transfer between human brain neurons, and may further perform continuous self-learning. Application such as intelligent cognition of the electronic device 100, for example, image recognition, facial recognition, voice recognition, and text understanding, can be implemented by using the NPU.

The external memory interface 120 may be configured to connect to an external memory card, for example, a micro SD card, to expand a storage capability of the electronic device 100. The external memory card communicates with the processor 110 through the external memory interface 120, to implement a data storage function, for example, to store music, video, and other files in the external memory card.

The internal memory 121 may be configured to store computer executable program code, where the executable program code includes instructions. The processor 110 runs the instructions stored in the internal memory 121, to execute various function applications and data processing of the electronic device 100. The internal memory 121 may include a program storage area and a data storage area. The program storage area may store an operating system, an application required by at least one function (for example, a voice playing function or an image playing function), and the like. The data storage area may store data (for example, audio data, an address book, and the like) created during use of the electronic device 100 and other data. In addition, the internal memory 121 may include a high-speed random access memory, and may further include a non-volatile memory, such as at least one magnetic disk storage device, at least one flash memory device, and at least one universal flash storage (UFS).

The electronic device 100 may implement an audio function, such as music playing and recording, by using the audio module 170, the speaker 170A, the receiver 170B, the microphone 170C, the headset interface 170D, the application processor, and the like.

The audio module 170 is configured to convert digital audio information into an analog audio signal output, and is also configured to convert an analog audio input into a digital audio signal. The audio module 170 may further be configured to encode and decode an audio signal. In some embodiments, the audio module 170 may be disposed in the processor 110, or some function modules of the audio module 170 may be disposed in the processor 110.

The speaker 170A, also referred to as a "loudspeaker", is configured to convert an electrical audio signal into a voice signal. The electronic device 100 may be used for listening to music or answering a hands-free call by using the speaker 170A.

The receiver 170B, also referred to as an "earpiece", is configured to convert an electrical audio signal into a voice signal. When a call or voice information is received on the electronic device 100, voice can be heard by putting the receiver 170B near a human ear.

The microphone 170C, also referred to as a "mic" or a "mike", is configured to convert a voice signal into an electrical signal. When making a call or sending voice information, a user may put the microphone 170C near the mouth and speak, to input a voice signal into the microphone 170C. The electronic device 100 may be provided with at least one microphone 170C. In some other embodiments, the electronic device 100 may be provided with two microphones 170C, which may further implement a denoising function in addition to voice signal collection. In some other embodiments, the electronic device 100 may alternatively be provided with three, four, or more microphones 170C, which implement voice signal collection and denoising, and may further identify a source of voice, to implement a directional recording function.

The headset interface 170D is configured to connect to a wired headset. The headset interface 170D may be a USB interface 130, or may be a standard 3.5 mm open mobile terminal platform (OMTP) interface, a standard cellular telecommunications industry association of the USA (CTIA) interface, or the like.

The pressure sensor 180A is configured to sense a pressure signal, and may convert the pressure signal into an electrical signal. In some embodiments, the pressure sensor 180A may be disposed on the display 194. The pressure sensor 180A may be of many types, for example, a resistive pressure sensor, an inductive pressure sensor, a capacitive pressure sensor, or the like. A capacitive pressure sensor may include at least two parallel plates that contain a conductive material. When force is exerted on the pressure sensor 180A, a capacitance between electrodes is changed. The electronic device 100 determines a strength of the pressure based on a change of the capacitance. When a touch control operation is exerted on the display 194, the electronic device 100 detects a strength of the touch control operation by using the pressure sensor 180A. The electronic device 100 may also calculate a touch position based on a signal detected by the pressure sensor 180A. In some embodiments, touch control operations that are exerted on a same touch position but have different touch control operation strengths may correspond to different operation instructions. For example, when a touch control operation with a touch control operation strength less than a first pressure threshold is exerted on an icon of an SMS message application, an instruction for viewing an SMS message is executed. When a touch control operation with a touch control operation strength greater than or equal to the first pressure threshold is exerted on the icon of the SMS message application, an instruction for creating an SMS message is executed.

The gyroscope sensor 180B may be configured to determine a motion posture of the electronic device 100.

The barometric pressure sensor 180C is configured to measure an atmospheric pressure.

The magnetic sensor 180D includes a Hall effect sensor.

The acceleration sensor 180E may detect a magnitude of an acceleration of the electronic device 100 in each direction (usually along three axes). When the electronic device 100 is still, the acceleration sensor 180E may detect a magnitude and a direction of gravity. The acceleration sensor 180E may further be configured to identify a posture of the electronic device, and is applied to landscape/portrait mode switching, a pedometer, and the like.

The distance sensor 180F is configured to measure a distance.

The optical proximity sensor 180G may include a light emitting diode (LED), an optical detector, and the like, such as a photodiode.

The ambient light sensor 180L is configured to sense brightness of ambient light.

The fingerprint sensor 180H is configured to collect a fingerprint. By using a feature of the collected fingerprint, the electronic device 100 may implement unlocking by using the fingerprint, access an application lock, take a photo by using the fingerprint, answer a call by using the fingerprint, and the like.

The temperature sensor 180J is configured to detect a temperature. In some embodiments, the electronic device 100 detects a temperature by using the temperature sensor 180J, to execute a temperature processing policy.

The touch sensor 180K is also referred to as a "touch panel". The touch sensor 180K may be disposed on the display 194, and the touch sensor 180K and the display 194 form a touchscreen, which is also referred to as a "touch control screen". The touch sensor 180K is configured to detect a touch control operation exerted on or near the touch sensor 180K. The touch sensor may transfer the detected touch control operation to the application processor, to determine a touch event type. The display 194 may be used to provide a visual output related to the touch control operation. In some other embodiments, the touch sensor 180K may alternatively be disposed on a surface of the electronic device 100 at a different location from the display 194.

The bone conduction sensor 180M may obtain a vibration signal. In some embodiments, the bone conduction sensor 180M may obtain a vibration signal of a vibrating bone of a vocal-cord part of a human body. The bone conduction sensor 180M may also be in contact with pulses of the human body, to receive blood pressure fluctuating signals. In some embodiments, the bone conduction sensor 180M may alternatively be provided in a headset, to form a bone conduction headset. The audio module 170 may obtain a voice signal through parsing the vibration signal of the vibrating bone of the vocal-cord part obtained by the bone conduction sensor 180M, to implement a voice function. The application processor may obtain heart rate information through parsing the blood pressure fluctuating signals obtained by the bone conduction sensor 180M, to implement a heart rate detection function.

The key 190 includes a power on/off key, a volume key, and the like. The key 190 may be a mechanical key, or may be a touch key. The electronic device 100 may receive a key input, to generate a key signal input that is related to user setting or function control of the electronic device 100.

The motor 191 may generate a vibration alert. The motor 191 may be configured to produce an incoming call vibration alert, and may also be configured to provide a touch vibration feedback. For example, touch control operations exerted on different applications (such as photographing and audio playing) may correspond to different vibration feedback effects. The motor 191 may also provide different vibration feedback effects accordingly depending on touch control operations exerted on different regions on the display 194. Different application scenarios (for example, time reminder, information receiving, alarm, and gaming) may also correspond to different vibration feedback effects. A touch vibration feedback effect may also be customized.

The indicator 192 may be an indicator light, may be configured to indicate a charging status and a battery level change, and may also be configured to indicate a message, a missed call, a notification, and the like.

The SIM card interface 195 is configured to connect to a SIM card. The SIM card may be inserted into the SIM card interface 195 or pulled out from the SIM card interface 195, to come into contact with or be separated from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be inserted into the same SIM card interface 195 at a same time. The plurality of cards may be of a same type or may be of different types. The SIM card interface 195 may also be compatible with different types of SIM cards. The SIM card interface 195 may also be compatible with an external memory card. The electronic device 100 interacts with a network by using the SIM card, to implement call and data communication and the like. In some embodiments, the electronic device 100 uses an eSIM card, that is, an embedded SIM card. The eSIM card may be embedded in the electronic device 100 and cannot be separated from the electronic device 100.

Figure 1B:
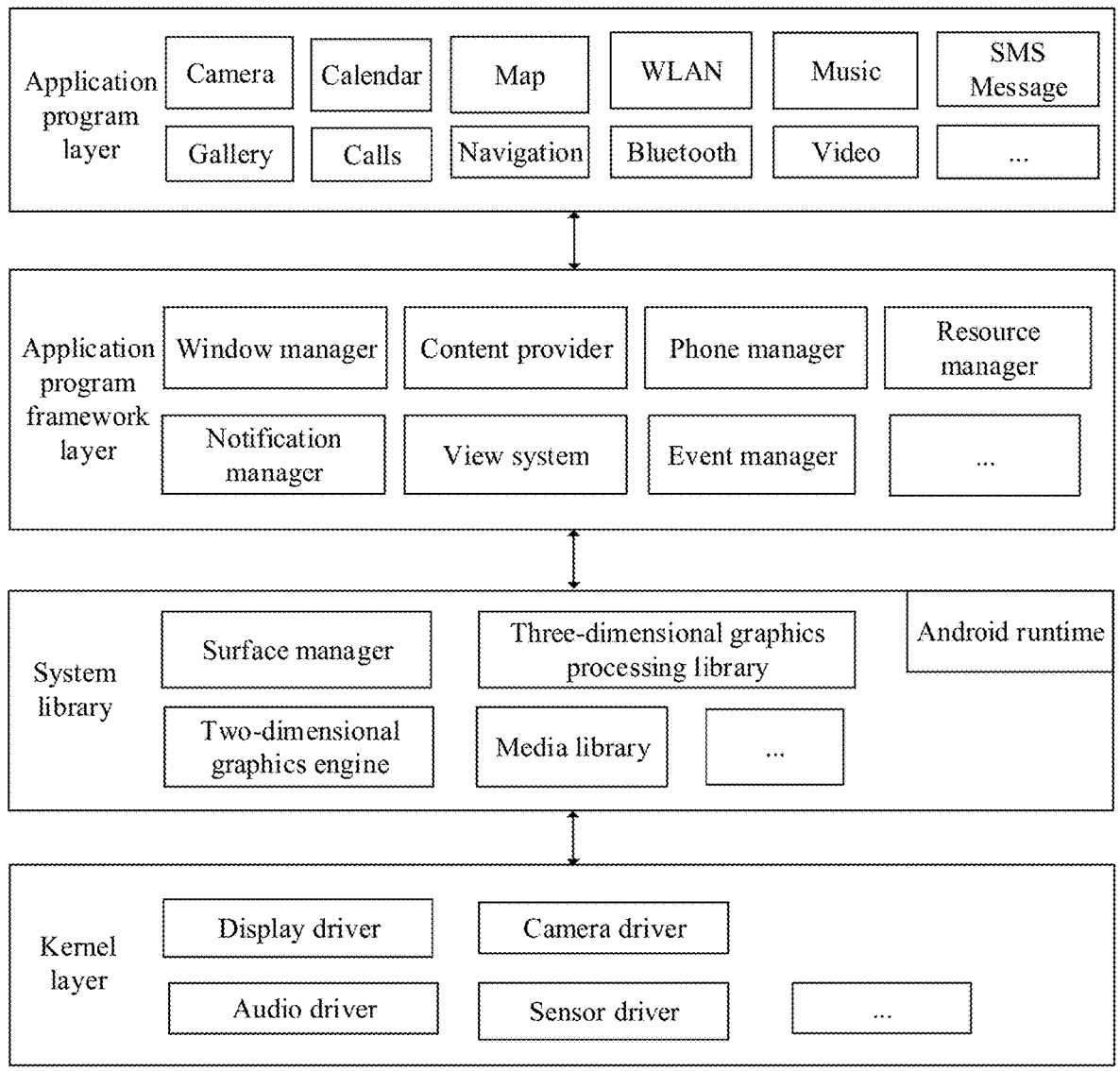
FIG. 1B is a block diagram of a software structure of an electronic device 100 according to an embodiment of this application.

A software system of the electronic device 100 may use a hierarchical architecture, an event driven architecture, a microkernel architecture, a microservice architecture, or a cloud architecture. In this embodiment of this application, an Android system in a hierarchical architecture is used as an example to illustratively describe a software structure of the electronic device 100. FIG. 1B is a block diagram of a software structure of an electronic device 100 according to an embodiment of this application.

It can be understood that the block diagram of the software structure illustrated in this embodiment of this application does not constitute a specific limitation on a block diagram of a software structure of the electronic device 100.

In the hierarchical architecture, software is divided into several layers, and each layer has a clear role and clear division of work. Layers communicate with each other through a software interface. In some embodiments, the Android system is divided into four layers, which are an application layer, an application framework layer, an Android runtime and a system library, and a kernel layer from top to bottom.

The application layer may include a series of application packages.

As shown in FIG. 1B, the application packages may include applications such as camera, gallery, calendar, phone, map, navigation, WLAN, bluetooth, music, video, and SMS messaging.

The application framework layer provides an application-ming interface (API) and a programming framework for an application in the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager can obtain a size of a display, determine whether there is a status bar, lock the screen, capture the screen, and the like.

The content provider is configured to store and obtain data, and enable the data to be accessed by an application. The data may include a video, an image, audio, dialed and received calls, a browsing history and a bookmark, a phone book, and the like.

The view system includes a visual control, for example, a control for displaying a character and a control for displaying a picture. The view system may be configured to construct an application. A display interface may include one or more views. For example, a display interface including an SMS message notification icon may include a view displaying a character and a view displaying a picture.

The phone manager is configured to provide a communication function of the electronic device 100, for example, call status management (including calling up, hang-up, and the like).

The resource manager provides various resources for an application, for example, a localized character string, an icon, a picture, a layout file, and a video file.

The notification manager allows an application to display notification information in the status bar, and may be configured to deliver a notification-type message which disappears automatically after staying for a short time, without requiring interaction from the user. For example, the notification manager is configured to notify that downloading is completed, provide a message reminder, and the like. The notification manager may display a notification in a top status bar of the system in a form of a graph or scrollbar text, for example, a notification concerning an application running in a background; and may further display a notification on a screen in a form of a dialog box. For example, text information is displayed in the status bar, an alert tone is provided, the electronic device vibrates, an indicator flashes, and the like.

The Android runtime includes a kernel library and a virtual machine. The Android runtime is responsible for scheduling and management of the Android system.

The kernel library includes two parts: One part is a performance function that needs to be called by a Java language, and the other part is an Android kernel library.

The application layer and the application framework layer run in the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and fuse a 2D layer and a 3D layer for a plurality of applications.

The media library supports playback and recording of audio and video in a plurality of common formats, static image files, and the like. The media library can support a plurality of audio and video encoding formats, such as MPEG-4, G.264, MP3, AAC, AMR, JPG, and PNG.

The three-dimensional graphics processing library is configured to implement three-dimensional graphics drawing, image rendering and synthesis, layer processing, and the like.

The 2D graphics engine is a drawing engine for 2D drawings.

The kernel layer is a layer between hardware and software. The kernel layer includes at least a display driver, a camera driver, an audio driver, and a sensor driver.

The software system shown in FIG. 1B relates to presentation of an application (for example, the gallery and a file manager) that uses a sharing capability, an instant sharing module that provides a sharing capability, and a print service and a print spooler that provide a printing capability. The application framework layer provides a printing framework, a WLAN service, and a bluetooth service. A kernel and an underlying layer provide WLAN and bluetooth capabilities and a basic communication protocol.

The following illustratively describes a workflow of the software and the hardware of the electronic device 100 with reference to a capturing and photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored in the kernel layer. The application framework layer obtains the original input event from the kernel layer, and identifies a control corresponding to the input event. For example, the touch operation is a touch operation, and a control corresponding to the touch operation is a control of an icon of a camera application. The camera application calls an interface of the application framework layer to start the camera application, further calls the kernel layer to start the camera driver, and captures a static image or a video by using a 3D camera module 193.

The following describes several application scenarios in the embodiments of this application and user interface (UI) embodiments in the application scenarios. It should be noted that a first screen mentioned in the embodiments of this application may be understood as a user interface of an electronic device in the embodiments of this application.

Scenario 1: Application scenario of capturing a single split-screen (where start positions of a plurality of touch control points during movement are all located in a target split-screen in a first screen)

Figure 2A:
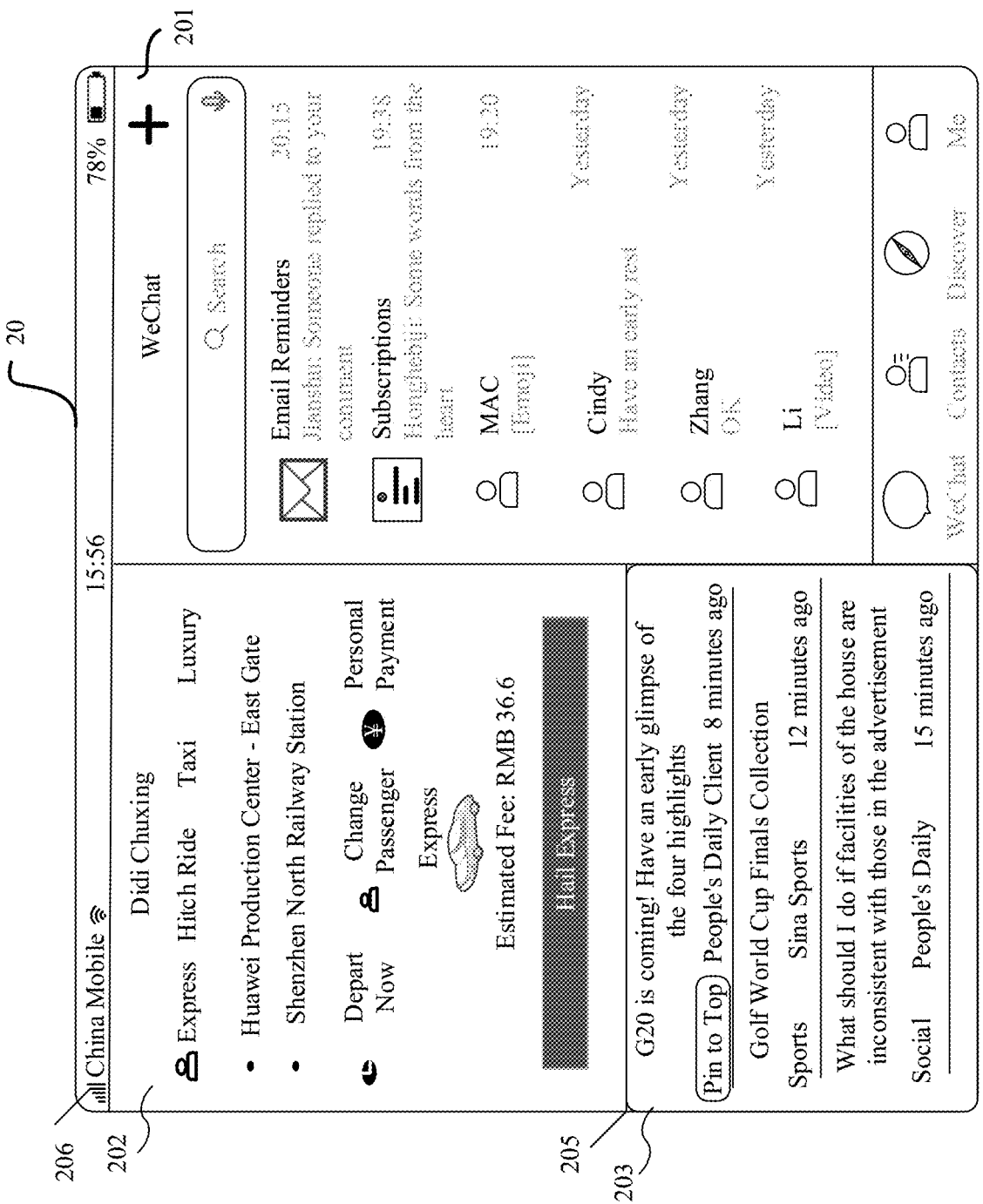
FIG. 2A is a schematic diagram of a user interface with a plurality of windows according to an embodiment of this application.

FIG. 2A is a schematic diagram of a user interface with a plurality of windows according to an embodiment of this application. The user interface includes a WeChat window 201, a Didi Dache window 202, and a news push window 203. The user interface is not limited thereto, and may further include more other windows or fewer windows. Other applications may be, for example, instant messaging software such as QQ or MSN; may be entertainment and video software such as iQIYI, Tencent Video, and Youku; and may further be auxiliary tool applications that come with a system of an electronic device, such as Calculator, Calendar, and Settings.

As shown in FIG. 2A, the user interface 20 may include a window display area 201, a window display area 202, a window display area 203, a window size control 205, and a status bar 206. The electronic device used by a local user is the electronic device 100.

The window display areas 201 to 203 are used to display content of different applications in the electronic device, and can receive and respond to a touch control operation of the user in the window display areas 201 to 203.

The window size control 205 is used to adjust a proportion of a window on the user interface. The electronic device 100 may detect a touch control operation exerted on the window size control 205 (for example, a drag operation on the window size control 205). In response to the operation, the electronic device 100 may move a position of the window size control 205, to adjust sizes of current windows 202 and 203.

The status bar 206 may include a carrier indicator (for example, a carrier name "China Mobile), one or more signal strength indicators of a wireless fidelity (Wi-Fi) signal, one or more signal strength indicators of a mobile communication signal (which may also be referred to as a cellular signal), a time indicator, a battery status indicator, and the like.

In this scenario, a first screen of the electronic device used by the user is divided into three split-screen areas: The window display area 201 is used to display a main interface of WeChat, the window display area 202 is used to display a Didi Dache interface, and the window display area 203 is used to display a news push interface. It is assumed that the user needs to share, to a WeChat contact, only Didi Dache, which does not include the WeChat and news push interfaces. In the conventional technology, a screenshot of all display content of the first screen at the time needs to be taken and then be placed in a picture editor for cropping, to finally keep only a picture of the Didi Dache interface. This operation may result in a cumbersome screenshot taking operation for the user, and a picture editing time is relatively long, resulting in poor experience in screenshot taking.

Based on the foregoing application scenario, the following describes some UI embodiments implemented in the electronic device 100.

When a screenshot of display content of the window display area 202 (that is, the Didi Dache window) needs to be taken and shared to the window display area 201 (that is, the WeChat window), the electronic device 100 may receive a touch control operation and determine a first touch control operation; then determine a target split-screen based on start positions of a plurality of touch control points included in the first touch control operation; and finally take a screenshot of the target split-screen and share the screenshot.

Detailed Descriptions are Provided from the Following Several Aspects:

(1) How to Determine a Screen Capture Operation

Figure 2B:
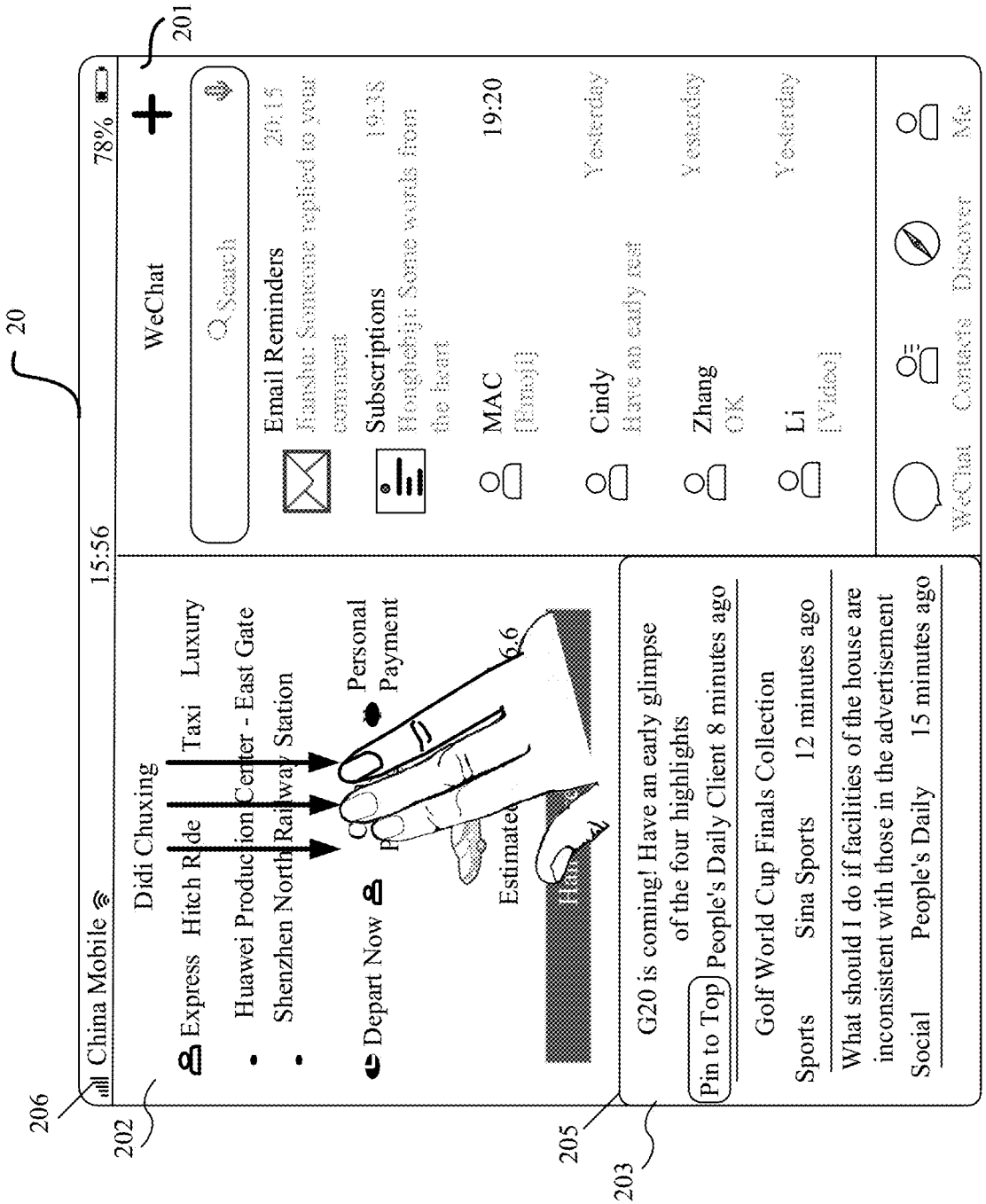
FIG. 2B is a schematic diagram of a user operation identified as a first touch control operation according to an embodiment of this application.

FIG. 2B is a schematic diagram of a user operation identified as a first touch control operation according to an embodiment of this application.

As shown in FIG. 2B, the electronic device 100 may detect a touch control operation of a user by using the touch sensor 180K (for example, the touch sensor 180K identifies a movement operation made by the user on a plurality of touch control points in the window display area 202). In response to the touch control operation, the electronic device 100 may identify a motion track of the movement operation.

Figure 2C:
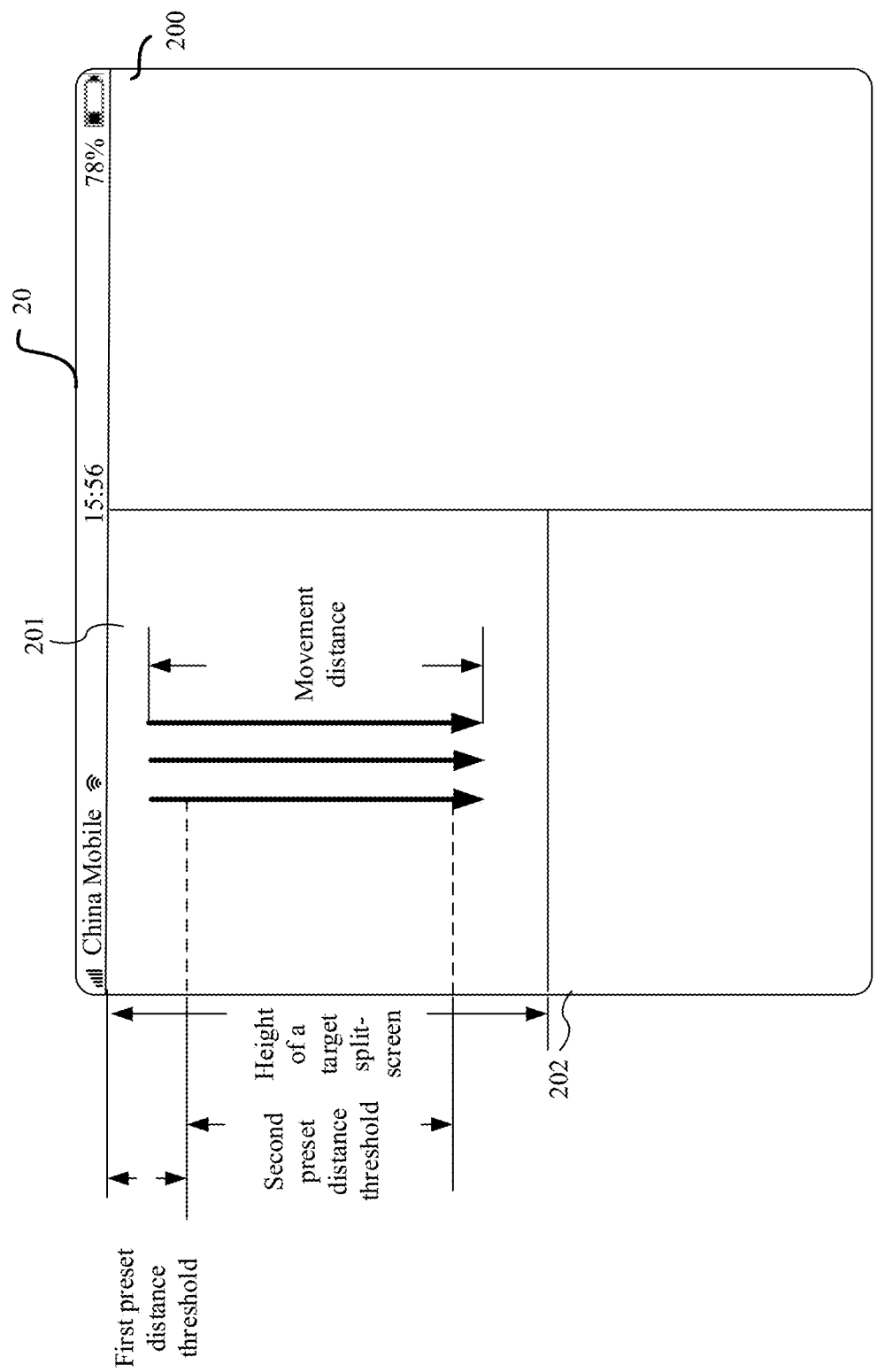
FIG. 2C is a schematic diagram of determining a comparison relationship between a movement distance and a first preset distance threshold according to an embodiment of this application.

In an embodiment, when the touch sensor 180K detects the touch control operation of the user, different optical and/or acoustic effects may be generated as hold duration of the touch control operation, a motion track of movement, a quantity of touch control points (for example, three touch control points or four touch control points), and position relationships of start positions and end positions of the plurality of touch control points relative to a split-screen vary, and a corresponding signal (including a value of pressure produced on the electronic device by the movement operation, and the like) is generated. Signals generated by different touch control operations may be captured by a sensor of the electronic device 100 (for example, a touch sensor, an acceleration sensor, an impact sensor, a vibration sensor, an acoustic sensor, a displacement sensor, or a speed sensor). FIG. 2C is a schematic diagram of determining a comparison relationship between a movement distance and a first preset distance threshold according to an embodiment of this application. As shown in FIG. 2C, the touch sensor 180K detects a movement distance of a touch control operation of a user and determines whether the movement distance is greater than the first preset distance threshold. If the movement distance is greater than the first preset distance threshold, the electronic device 100 may determine that the touch control operation is the first touch control operation. Therefore, the electronic device 100 may distinguish between, based on captured signals, specific touch control operations used by the user; and then determine whether a touch control operation of the user detected by the touch sensor 180K is the first touch control operation (that is, a movement operation in which a plurality of touch control points move by a distance greater than or equal to the first preset distance threshold in the window display area 202). If it is determined that the touch control operation of the user detected by the touch sensor 180K is the first touch control operation, the electronic device 100 then determines whether start positions of the plurality of touch control points included in the first touch control operation are all located in the window display area 202, and if yes, captures current display content of the window display area 202 as a first screenshot. In this case, the electronic device 100 may indicate, through vibration and/or through marking on the user interface (for example, lighting a motion track of the touch control operation, thickening a border, or adding a shadow), that the touch control operation of the user detected by the touch sensor 180K is the first touch control operation.

It should be noted that a second preset distance threshold shown in FIG. 2C is used to determine whether to take a long screen capture of a target split-screen. The second preset distance threshold is greater than the first preset distance threshold, and a ratio of the second preset distance threshold to a height of the target split-screen is greater than a preset ratio threshold. The height of the target split-screen may be understood as a length of a side of the target split-screen along a movement direction of the plurality of touch control points during the movement in the target split-screen.

In an embodiment, other manners for identifying a user operation may further exist, without being limited to the foregoing listed manner of identifying a user operation as the first touch control operation by using the touch sensor 180K. For example, the electronic device 100 may alternatively identify an operation of the user on the first screen by using an infrared sensor or the like, which is not limited in this embodiment of this application.

(2) How to Capture Screen Content

Figure 2D:
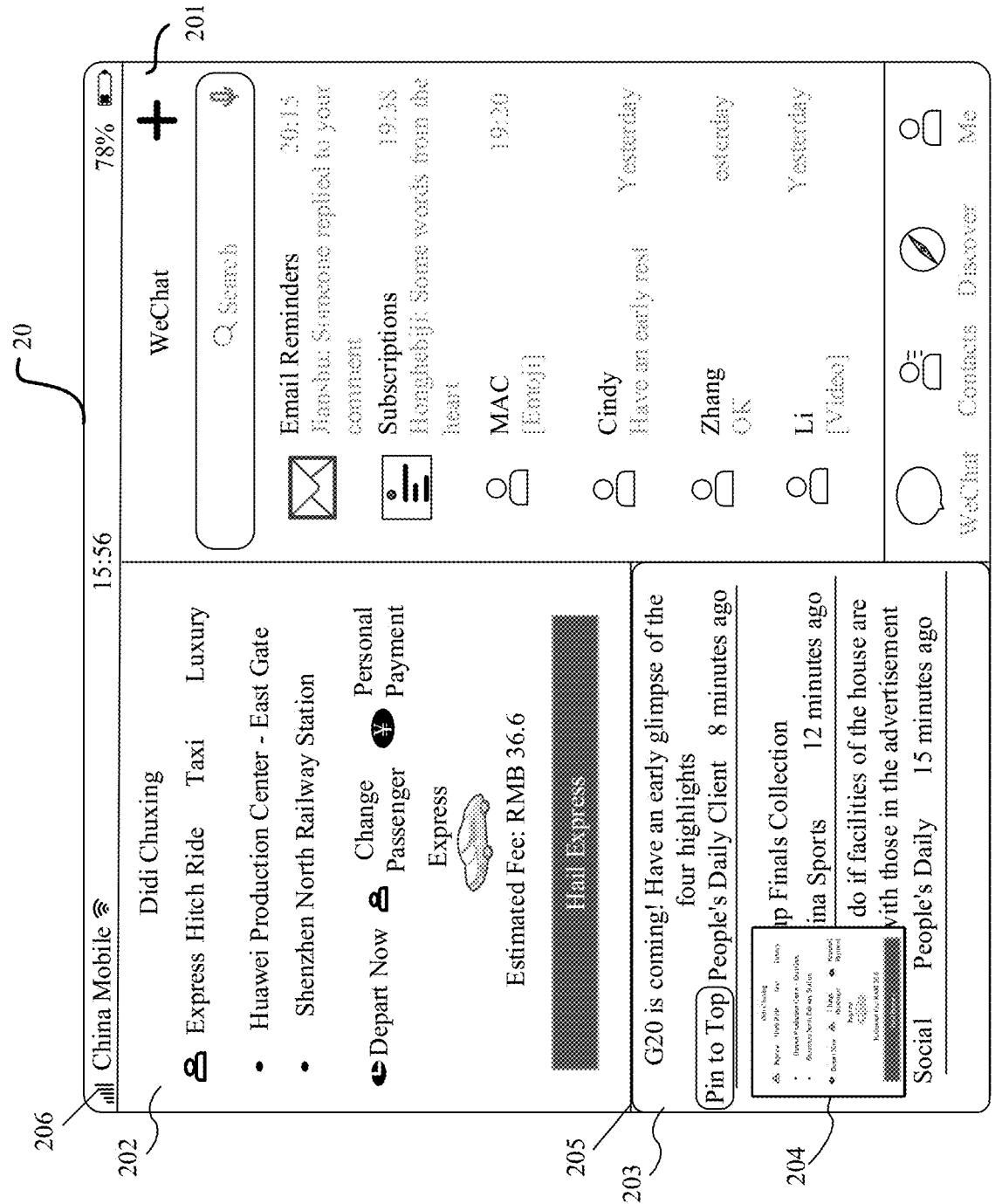
FIG. 2D shows a user interface on which display content of a target split-screen is captured as a picture by using a first touch control operation according to an embodiment of this application.

FIG. 2D shows a user interface on which display content of a target split-screen is captured as a picture by using a first touch control operation according to an embodiment of this application. In this embodiment of this application, the electronic device 100 further includes a picture switching control 204. The picture switching control 204 is used to display a captured user interface or a screenshot of a part of the user interface during screen capture, and may also be used to share a picture through tapping. The electronic device 100 may detect a touch control operation exerted on the picture switching control 307 (for example, a drag operation on the picture switching control 307). In response to the operation, the electronic device 100 may control the picture to be shared or inserted to a window in which an end position of movement of the drag operation is located.

As shown in FIG. 2D, in response to the user operation exerted on the touch sensor 180K in the embodiment corresponding to FIG. 2B, the electronic device 100 may identify whether the user operation is a movement operation in which a plurality of touch control points move by a distance greater than or equal to the first preset distance threshold on the user interface, and determine start positions of the plurality of touch control points during the movement in the touch control operation of the user detected by the touch sensor 180K, to determine whether the user operation is intended to capture current display content of the target split-screen or capture current display content of the entire user interface. Then, when the start positions of the plurality of touch control points during the movement detected by the touch sensor 180K are all located in the window display area 202, the current display content of the window display area 202 is accordingly captured as the first screenshot based on the user operation detected by the touch sensor 180K.

Figure 2E:
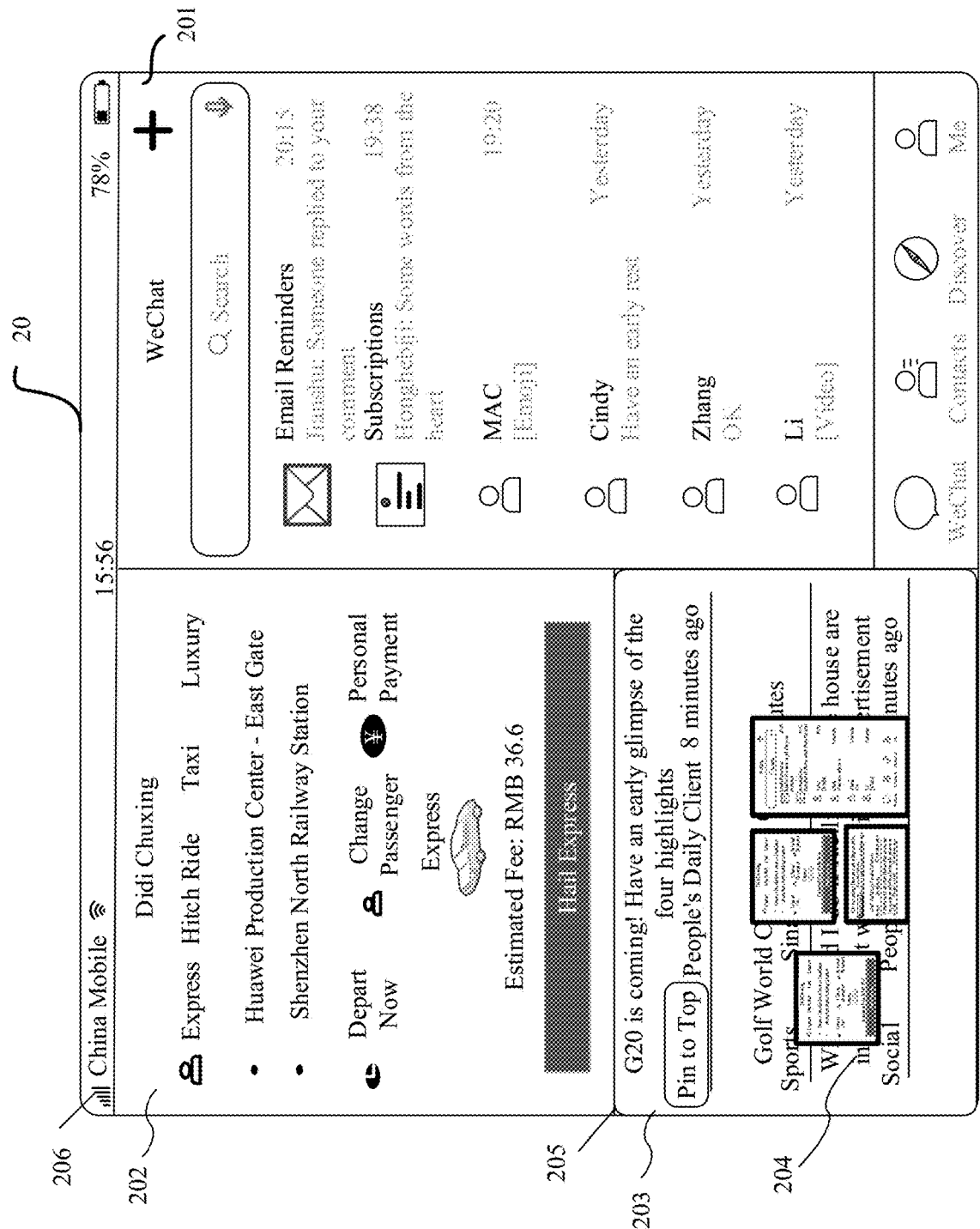
FIG. 2E shows another user interface on which display content of a target split-screen is captured as a picture by using a first touch control operation according to an embodiment of this application.

In an embodiment, FIG. 2E shows another user interface on which display content of a target split-screen is captured as a picture by using a first touch control operation according to an embodiment of this application.

As shown in FIG. 2E, in response to a gesture operation exerted on the touch sensor 180K in the embodiment corresponding to FIG. 2B, the electronic device 100 may identify whether the user operation is a movement operation in which a plurality of touch control points move by a distance greater than or equal to the first preset distance threshold on the user interface, and determine the start positions of the plurality of touch control points during the movement in the touch control operation of the user detected by the touch sensor 180K, to determine whether the user operation is intended to capture current display content of the target split-screen or capture current display content of the entire user interface. Then, when the start positions of the plurality of touch control points during the movement detected by the touch sensor 180K are all located in the window display area 202, not only the current display content of the window display area 202 is captured as the first screenshot based on the user operation detected by the touch sensor 180K, all split-screens on the user interface further need to be captured based on the user operation detected by the touch sensor 180K, and a second screenshot is generated. In other words, current display content of N split-screens in the first screen is captured as corresponding screenshots, and the second screenshot is generated. The second screenshot includes the screenshots corresponding to the N split-screens, the screenshots are arranged in the second screenshot in a manner in which the corresponding split-screens are distributed in the first screen, and each of the screenshots corresponding to the N split-screens is a thumbnail that is allowed to receive a touch control operation. It can be understood that when it is detected that the start positions of the plurality of touch control points during the movement are all located in the window display area 202, not only current display content of Didi Dache in the window display area 202 needs to be captured, current display content of WeChat in the window display area 201, the current display content of Didi Dache in the window display area 202, and current display content of news push in the window display area 203 further need to be captured separately. It should be noted that, in the second screenshot, a thumbnail corresponding to the current display content of WeChat in the window display area 201, a thumbnail corresponding to the current display content of Didi Dache in the window display area 202, and a thumbnail corresponding to the current display content of news push in the window display area 203 are not associated with each other, and each can receive a touch control operation from the user. Therefore, after a screenshot of the current display content of Didi Dache in the window display area 202 is taken, screenshots of all the split-screens are taken. This can prevent misjudgment, by the electronic device, of an operation intention of the user or misjudgment of the target split-screen caused by a misoperation of the user, thereby improving accuracy of screenshot taking and user experience in screenshot taking.

(3) How to Save and Share a Screenshot

Figure 2F:
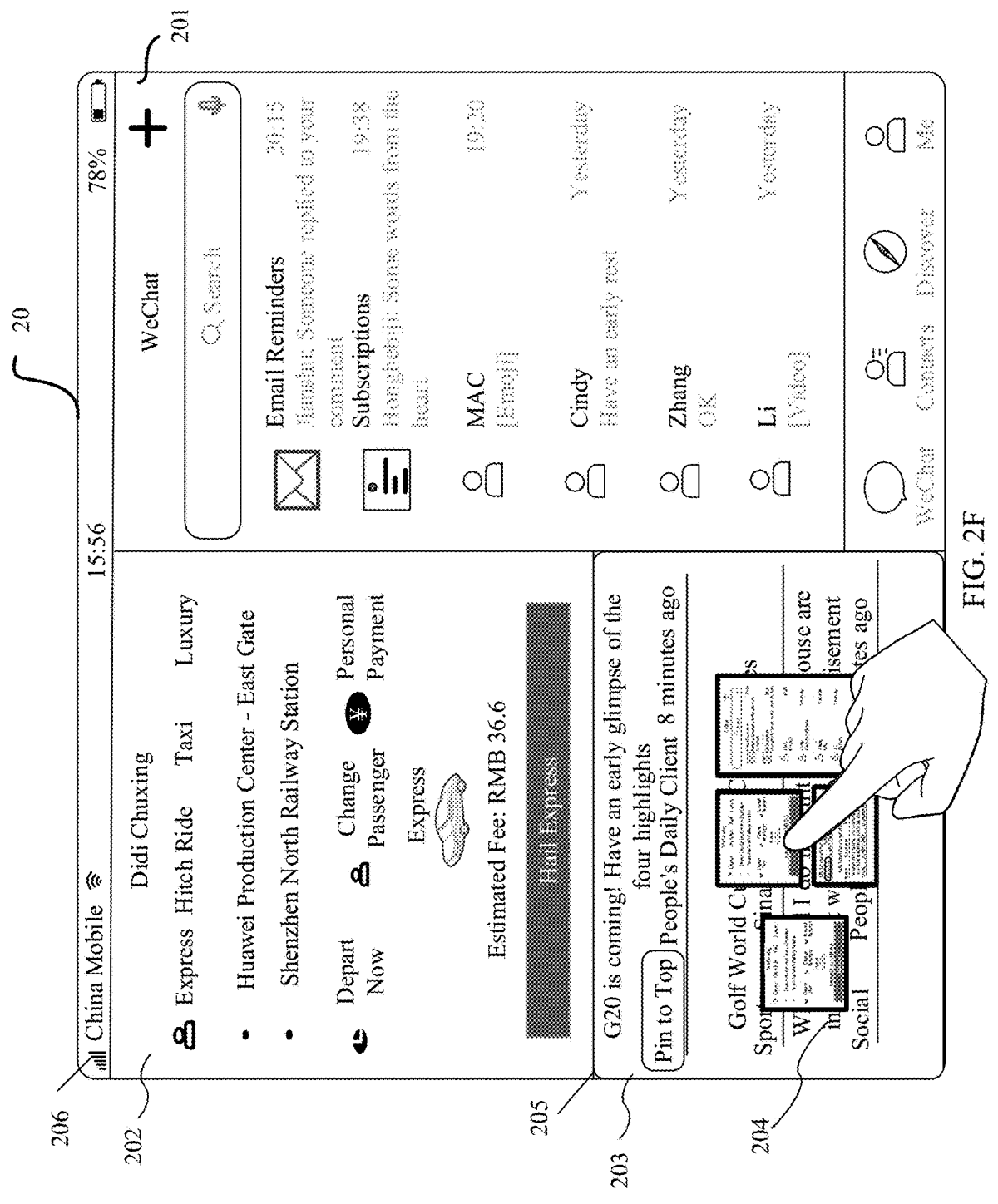
Figure 2G:
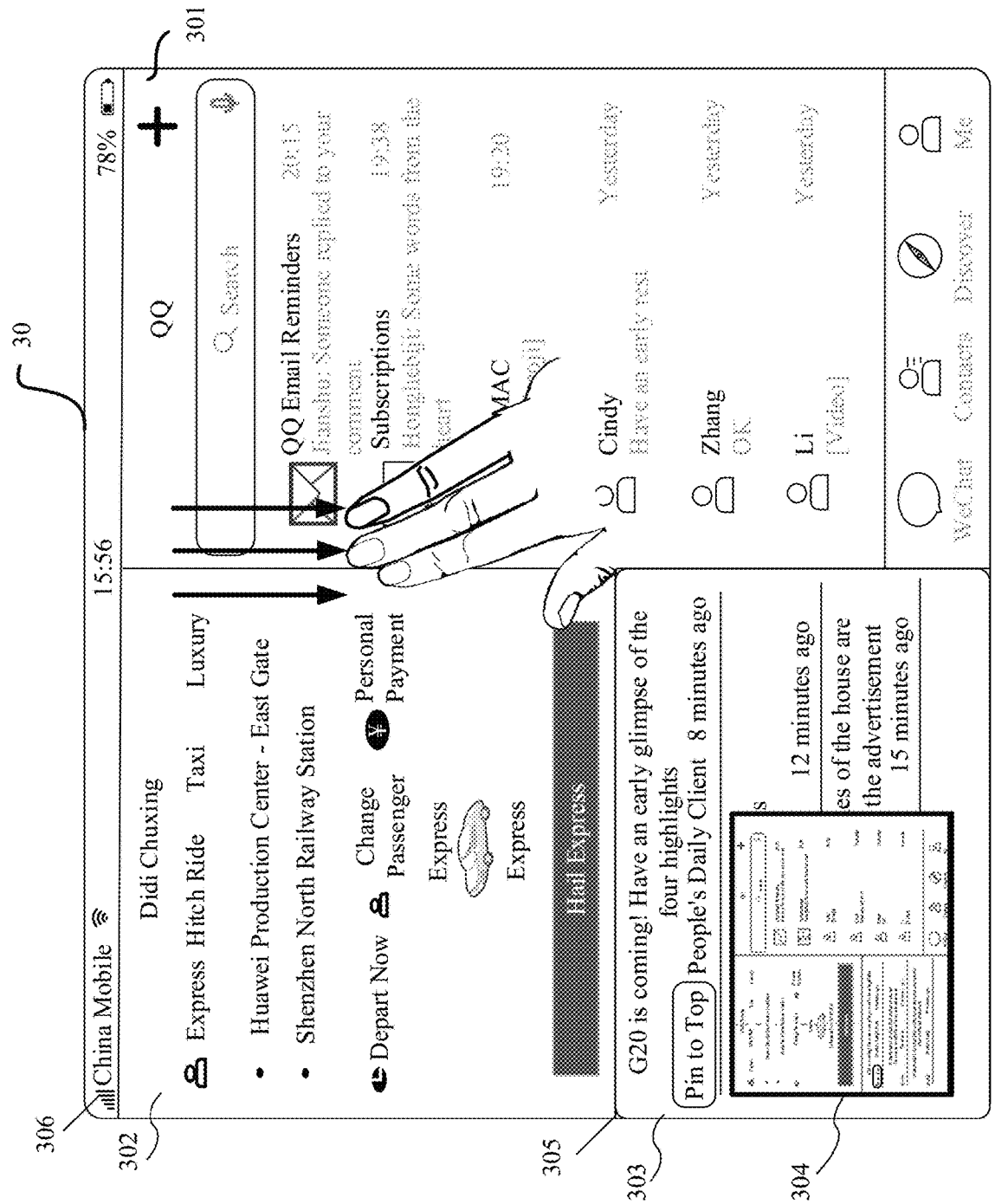
Figure 2H:
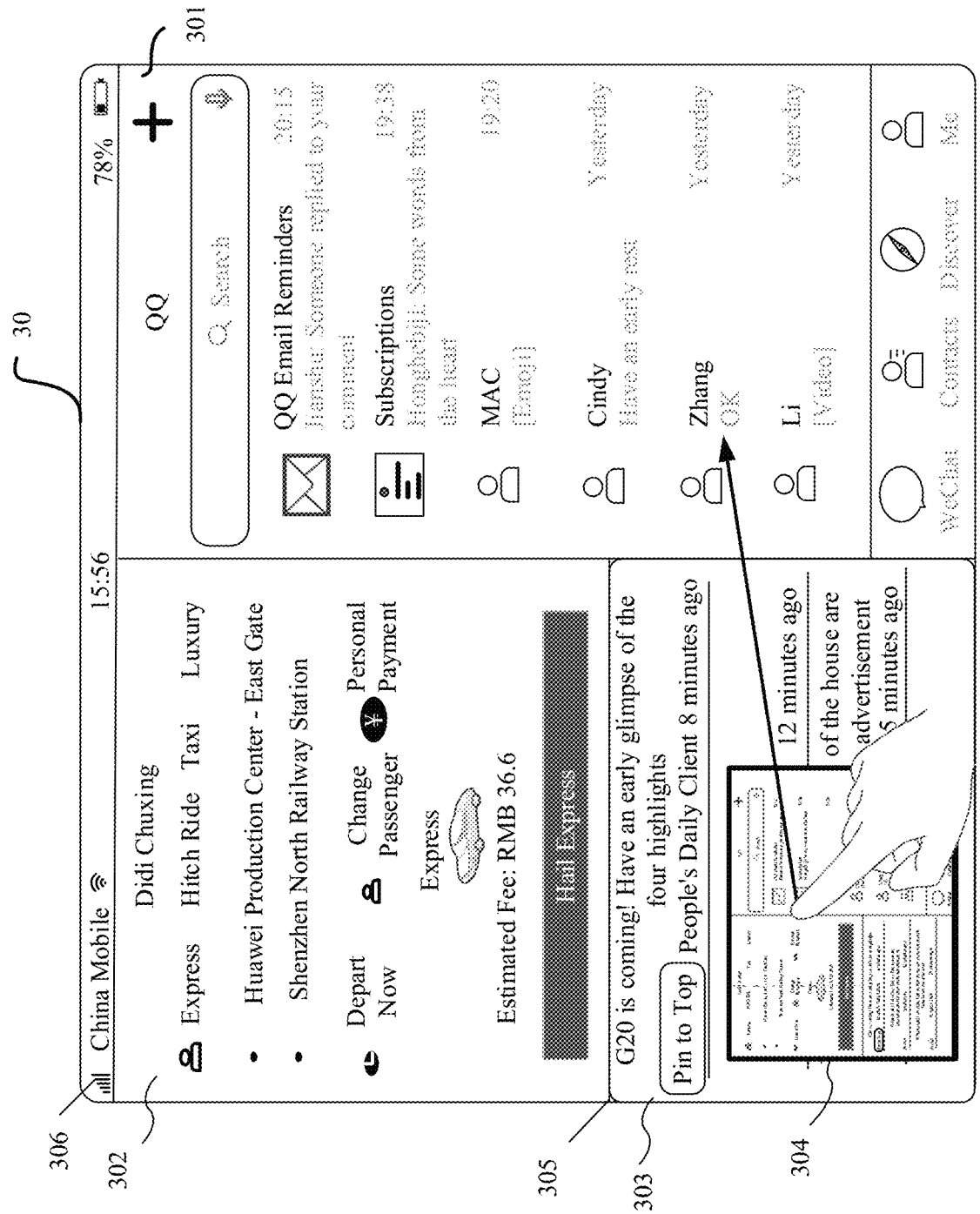

FIG. 2F to FIG. 2H show a group of user interfaces for confirming, saving, and sharing a screen capture thumbnail according to an embodiment of this application.

As shown in FIG. 2F and FIG. 2G, after the first screenshot and the second screenshot are obtained, the electronic device 100 receives a user operation exerted on the touch sensor 180K. The electronic device 100 may identify whether the user operation is a second touch control operation. For example, the second touch control operation is an operation of tapping a target screen capture thumbnail in the first screenshot or the second screenshot. The target screen capture thumbnail is at least one of screen capture thumbnails corresponding to the N split-screens in the first screenshot or the second screenshot. For example, the target screen capture thumbnail is the thumbnail corresponding to the current display content of Didi Dache in the window display area 202. The electronic device 100 saves the target screen capture thumbnail to the gallery based on the second touch control operation, and deletes all screenshots except the target screen capture thumbnail in the first screenshot or the second screenshot. As shown in FIG. 2H, a drag operation on the thumbnail corresponding to the current display content of Didi Dache in the window display area 202 is received. The drag operation is an operation of moving, by using a touch control point, the thumbnail corresponding to the current display content of Didi Dache in the window display area 202. The thumbnail corresponding to the current display content of Didi Dache in the window display area 202 is controlled, based on the drag operation, to be shared or inserted to the WeChat application in the window display area 201.

Figure 2I:
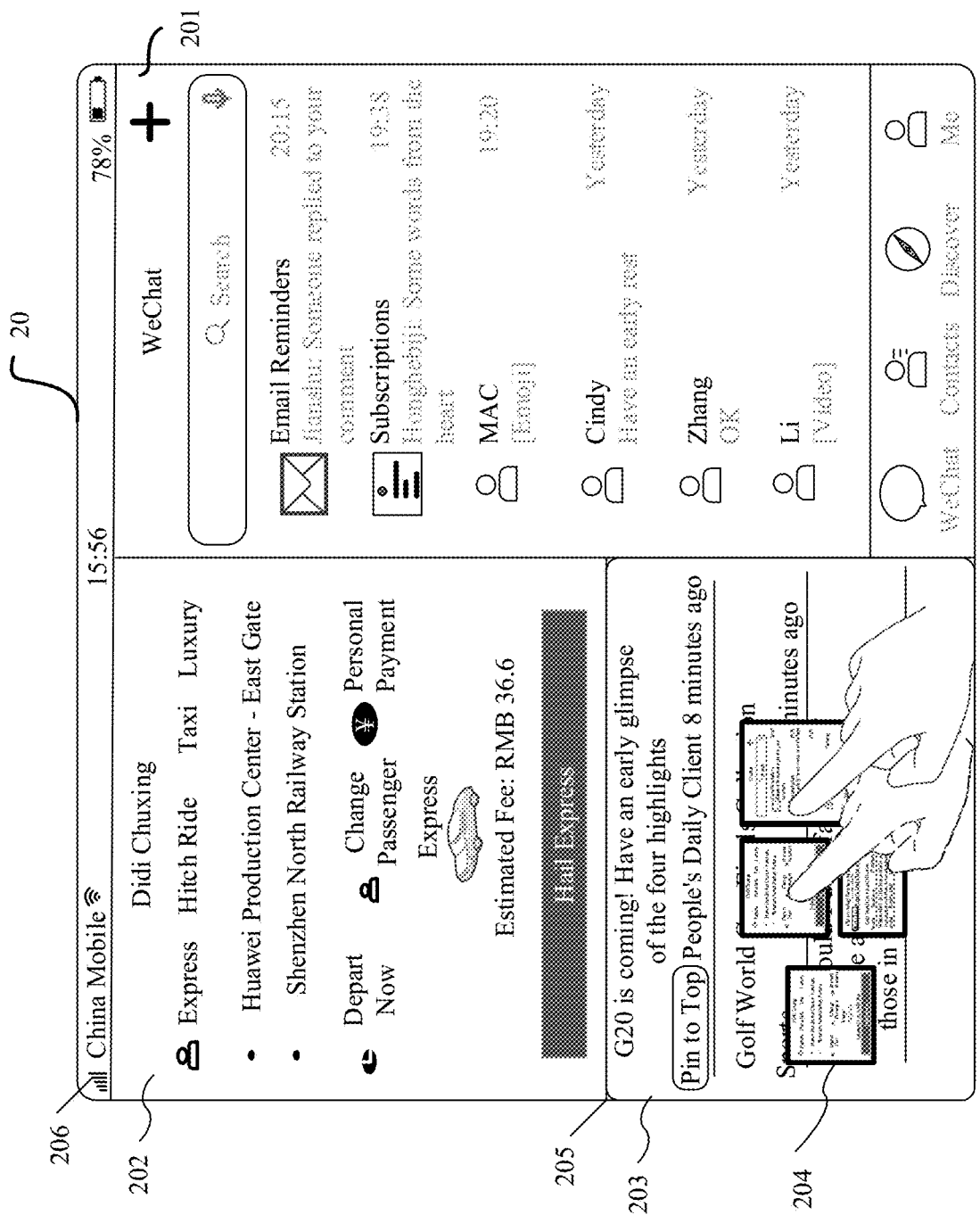
FIG. 2I to FIG. 2K show another group of user interfaces for confirming and saving a screen capture thumbnail according to an embodiment of this application.
Figure 2J:
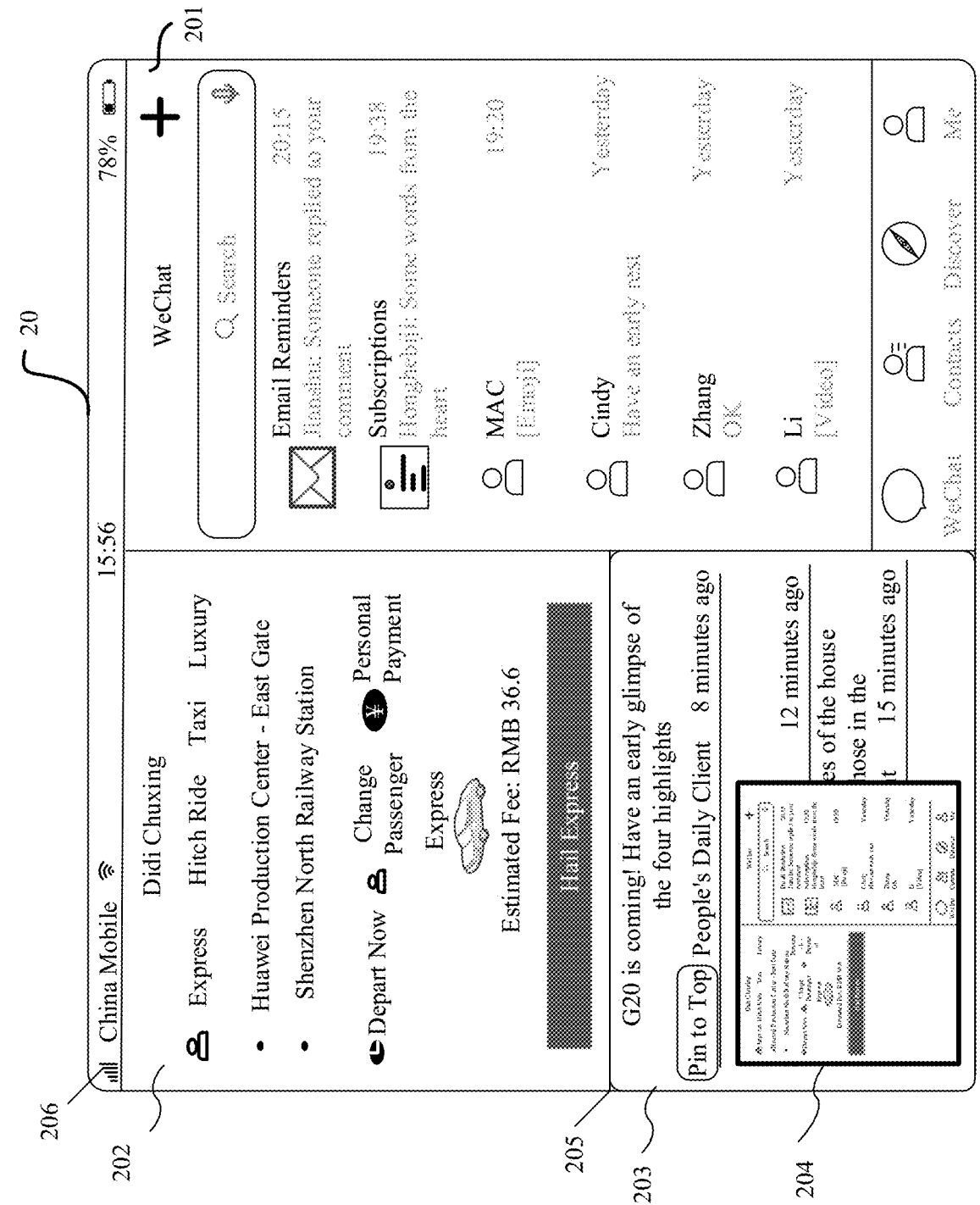
Figure 2K:
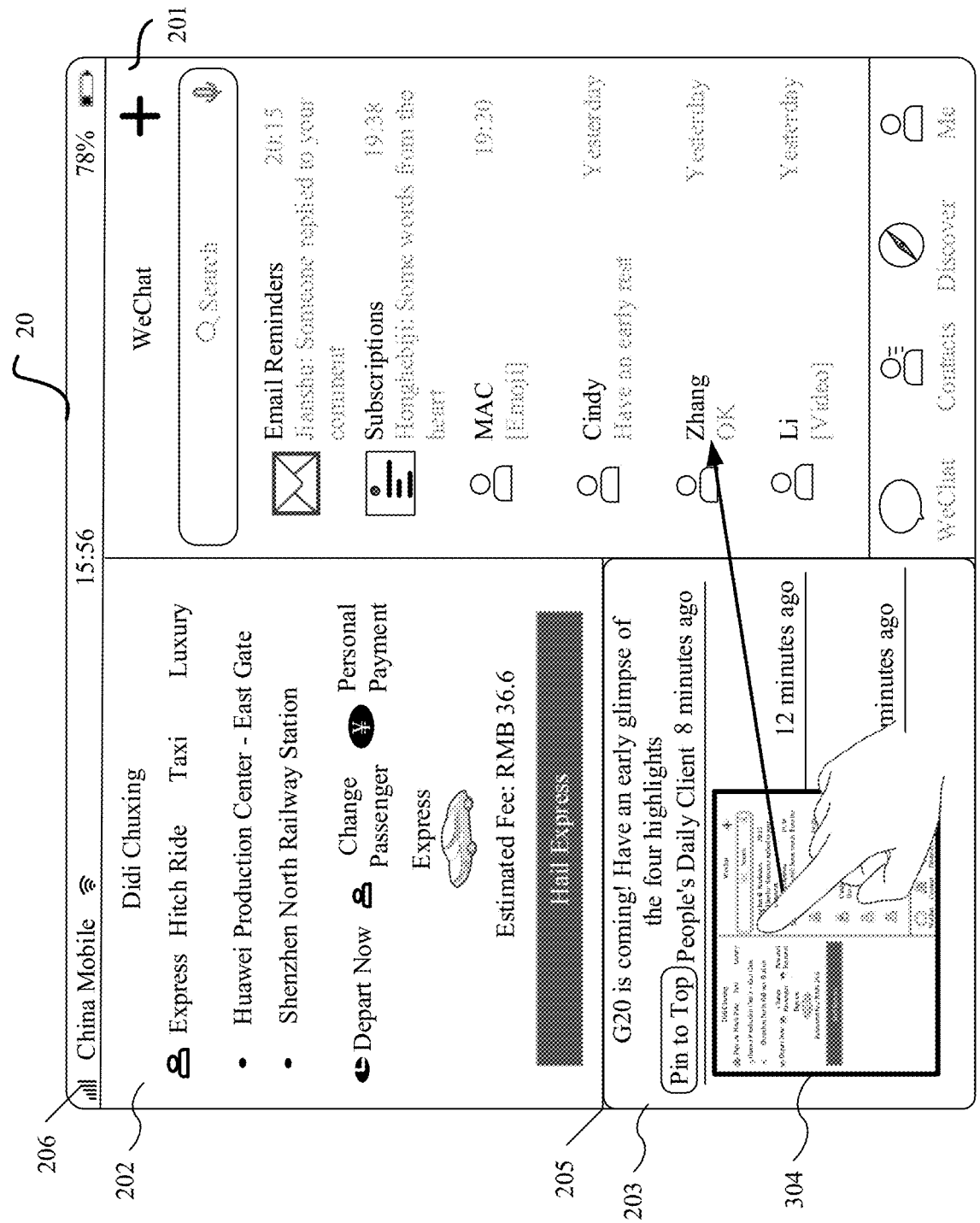

In an embodiment, FIG. 2I to FIG. 2K show another group of user interfaces for confirming and saving a screen capture thumbnail according to an embodiment of this application.

As shown in FIG. 2I and FIG. 2J, after the first screenshot and the second screenshot are obtained, the electronic device 100 receives a user operation exerted on the touch sensor 180K. The electronic device 100 may identify whether the user operation is a second touch control operation. For example, the second touch control operation is an operation of tapping a target screen capture thumbnail in the first screenshot or the second screenshot, and there are a plurality of target screen capture thumbnails. In this case, the electronic device 100 may control, based on the second touch control operation, the plurality of screenshots to be spliced into one screenshot. If a graph obtained by splicing the plurality of screenshots is in an irregular shape, the electronic device may automatically fill in a missing part, so that the spliced screenshot is in a regular geometrical shape. As shown in FIG. 2K, a drag operation on a spliced target screen capture thumbnail generated from the thumbnail corresponding to the current display content of Didi Dache in the window display area 202 and the thumbnail corresponding to the current display content of WeChat in the window display area 201 is received. The drag operation is an operation of moving the target screen capture thumbnail by using a touch control point. The target screen capture thumbnail is controlled, based on the drag operation, to be shared or inserted to the WeChat application in the window display area 201.

In this embodiment of this application, the electronic device may further determine the first touch control operation from a plurality of touch control operations received by the touch sensor 180K, and determine whether the start positions of the plurality of touch control points during the movement in the first touch control operation are all located in the target split-screen in the first screen. If yes, the current display content of the target split-screen is captured as the first screenshot. Therefore, in this way, after it is determined that the start positions of the plurality of touch control points are all located in the same screen, a screenshot of the single screen can be directly obtained from a plurality of windows. This can achieve the purpose of flexibly and rapidly obtaining a screenshot of a target split-screen area, so that the user can obtain the screenshot within a relatively short time. In addition, it is unnecessary to first capture the entire display and place an obtained screenshot of the entire screen in picture editing software to manually remove display information of other screens in the screen capture picture, thereby simplifying a screenshot taking operation for the user.

Scenario 2: Application scenario of taking a screenshot of an entire screen (start positions of a plurality of touch control points during movement are not all located in a target split-screen in a first screen)

Figure 3A:
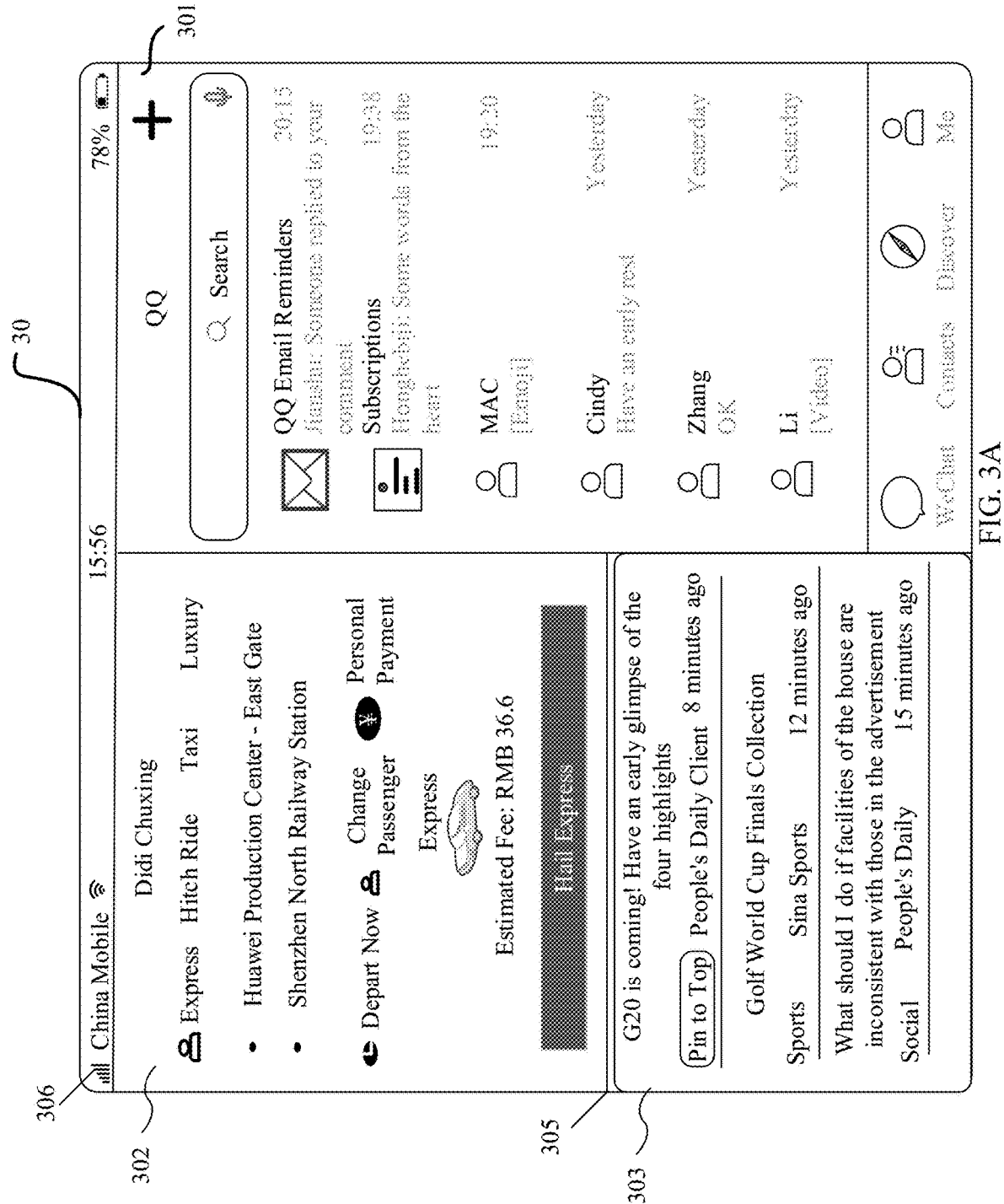
FIG. 3A is a schematic diagram of another user interface with a plurality of windows according to an embodiment of this application.

FIG. 3A is a schematic diagram of another user interface with a plurality of windows according to an embodiment of this application. The user interface includes a QQ window 301, a Didi Dache window 302, and a news push window 303. The user interface is not limited thereto, and may further include more other windows or fewer windows. Other applications may be, for example, instant messaging software such as WeChat or MSN; may be entertainment and video software such as iQiyi, Tencent Video, and Youku; and may further be auxiliary tool applications that come with a system of an electronic device, such as, calculator, calendar, and settings.

As shown in FIG. 3A, the user interface 30 may include a window display area 301, a window display area 302, a window display area 303, a window size control 305, and a status bar 306. The electronic device used by a local user is the electronic device 100.

The window display areas 301 to 303 are used to display content of different applications in the electronic device (or the electronic device 100), and can receive and respond to a touch control operation of the user in the window display areas 301 to 303.

The window size control 305 is used to adjust a proportion of a window on the user interface. The electronic device 100 may detect a touch control operation exerted on the window size control 305 (for example, a drag operation on the window size control 305). In response to the operation, the electronic device 100 may adjust sizes of current windows 302 and 303.

The status bar 306 may include a carrier indicator (for example, a carrier name "China Mobile"), one or more signal strength indicators of a wireless fidelity (Wi-Fi) signal, one or more signal strength indicators of a mobile communication signal (which may also be referred to as a cellular signal), a time indicator, and a battery status indicator.

In this scenario, a first screen of the electronic device used by the user is divided into three split-screen areas: The window display area 301 is used to display a main interface of QQ, the window display area 303 is used to display a Didi Dache interface, and the window display area 303 is used to display a news push interface. If the user needs to share the entire screen to a QQ contact, which includes both QQ and news push interfaces, this may also be implemented by using a first touch control operation, in addition to screen capture performed by pressing a key combination or screen capture controlled by using a knuckle in an existing technology. Start positions of a plurality of touch control points during movement in the first touch control operation are located in a plurality of split-screen windows, for example, located in both the QQ window and the Didi Dache window.

Based on the foregoing application scenario, the following describes some UI embodiments implemented in the electronic device 100.

When a screenshot of display content on the user interface 30 (that is, the QQ window, the Didi Dache window, and the news push window) needs to be shared to the window display area 201 (that is, the QQ window), the electronic device 100 may receive a touch control operation and determine a first touch control operation; then determine capture the user interface 30 based on start positions of a plurality of touch control points included in the first touch control operation, to obtain a third screenshot; and finally save and share the third screenshot.

Detailed Descriptions are Provided from the Following Several Aspects:

(1) How to Determine a Screen Capture Operation

Figure 3B:
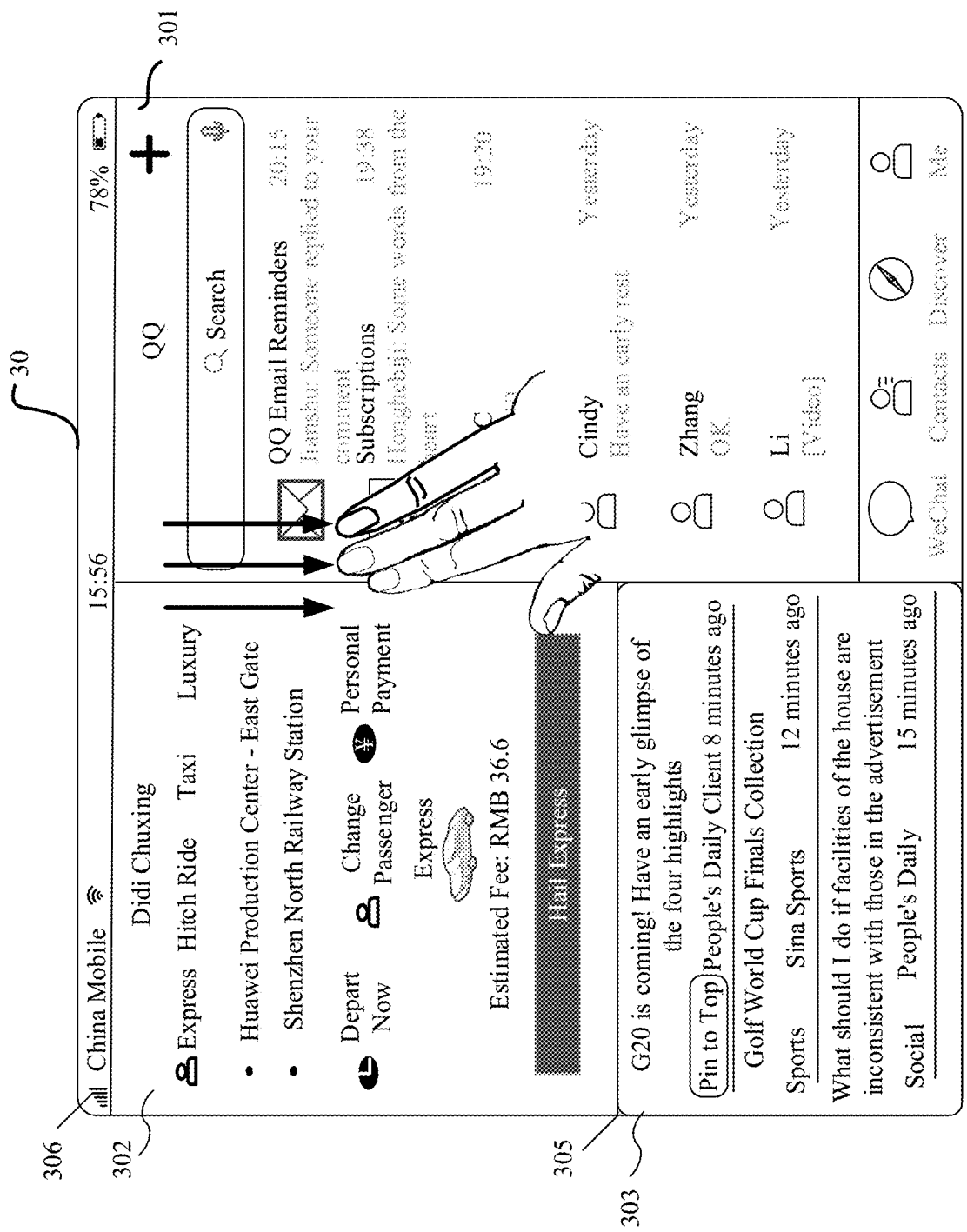
FIG. 3B is a schematic diagram of another user operation identified as a first touch control operation according to an embodiment of this application.

FIG. 3B is a schematic diagram of another user operation identified as a first touch control operation according to an embodiment of this application. The electronic device 100 shown in FIG. 3B further includes a picture switching control 304. The picture switching control 304 is used to display a captured picture of the electronic device 100 during screen capture, and may also be used to share a picture through tapping. The electronic device 100 may detect a touch control operation exerted on the picture switching control 307 (for example, a drag operation on the picture switching control 307). In response to the operation, the electronic device 100 may control the picture to be shared or inserted to a window in which an end position of movement of the drag operation is located.

As shown in FIG. 3B, the electronic device 100 may detect a touch control operation of the user by using the touch sensor 180K (for example, the touch sensor 180K identifies a movement operation made by the user on a plurality of touch control points in the window display area 202). In response to the touch control operation, the electronic device 100 may identify a motion track of the movement operation.

In an embodiment, when the touch sensor 180K detects a touch control operation of the user, different optical and/or acoustic effects may be generated as hold duration of the touch control operation, a motion track of movement, a quantity of touch control points (for example, three touch control points or four touch control points), and position relationships of start positions and end positions of the plurality of touch control points relative to a split-screen vary, and a corresponding signal (including a value of pressure produced on the electronic device by the movement operation, and the like) is generated. Signals generated by different touch control operations may be captured by a sensor of the electronic device 100 (for example, a touch sensor, an acceleration sensor, an impact sensor, a vibration sensor, an acoustic sensor, a displacement sensor, or a speed sensor). The touch sensor 180K detects a movement distance of the touch control operation of the user and determines whether the movement distance is greater than a first preset distance threshold. If the movement distance is greater than the first preset distance threshold, the electronic device 100 may determine that the touch control operation is the first touch control operation. Therefore, the electronic device 100 may distinguish between, based on captured signals, specific touch control operations used by the user; and then determine whether a touch control operation of the user detected by the touch sensor 180K is the first touch control operation (that is, a movement operation in which a plurality of touch control points move by a distance greater than or equal to the first preset distance threshold in the window display area 202). If it is determined that the touch control operation of the user detected by the touch sensor 180K is the first touch control operation, the electronic device 100 then determines whether start positions of the plurality of touch control points included in the first touch control operation are all located in the window display area 202, and if yes, captures current display content of the window display area 202 as a first screenshot. In this case, the electronic device 100 may indicate, through vibration and/or through marking on the user interface (for example, lighting a motion track of the touch control operation, thickening a border, or adding a shadow), that the touch control operation of the user detected by the touch sensor 180K is the first touch control operation.

In an embodiment, other manners for identifying a user operation may further exist, without being limited to the foregoing listed manner of identifying a user operation as the first touch control operation by using the touch sensor 180K. For example, the electronic device 100 may alternatively identify an operation of the user on the first screen by using an infrared sensor or the like, which is not limited in this embodiment of this application.

(2) How to Determine Screen Content to be Captured

Figure 3C:
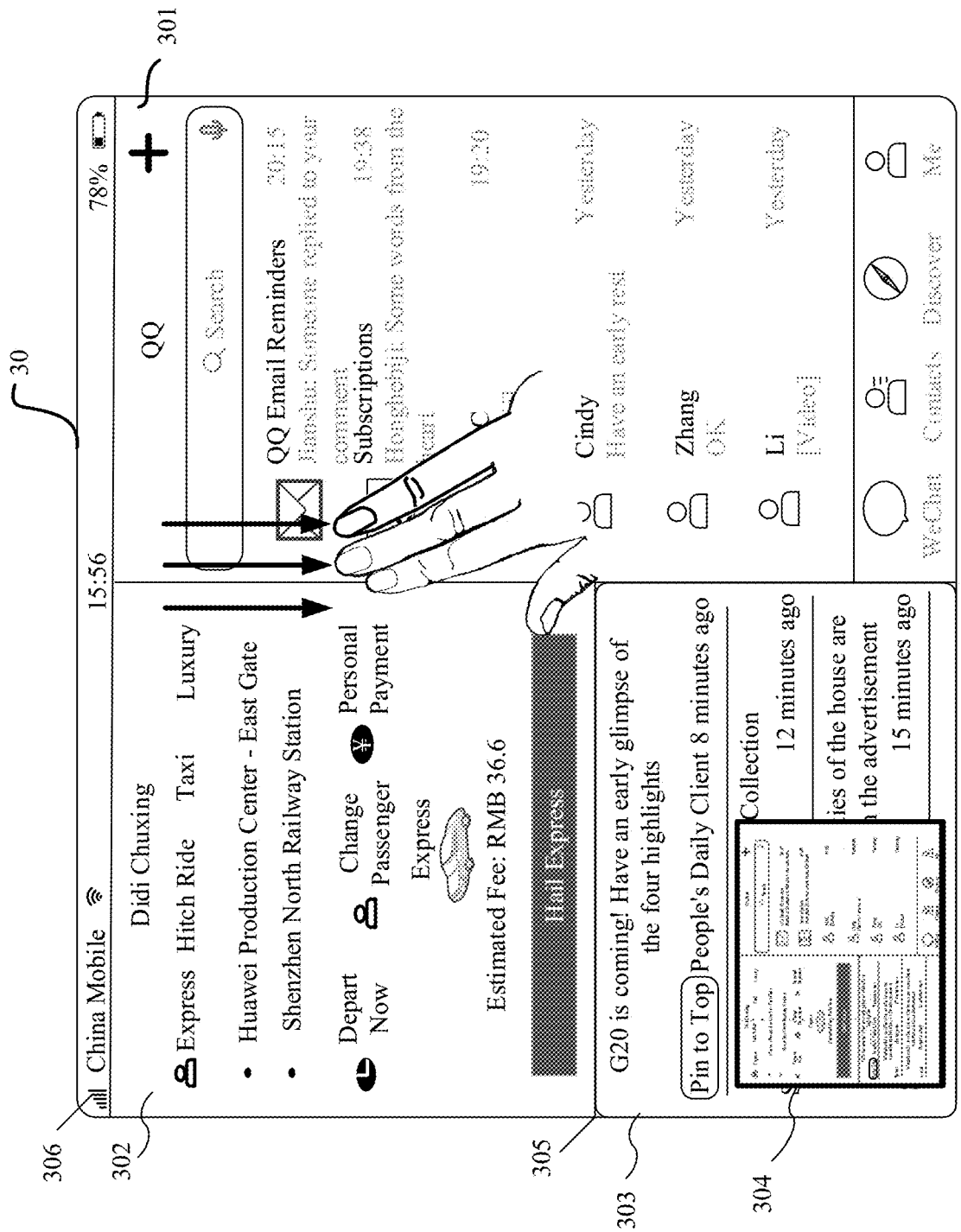
FIG. 3C and FIG. 3D show a group of user interfaces on which display content of a first screen is captured as a picture by using a first touch control operation and shared according to an embodiment of this application.
Figure 3D:
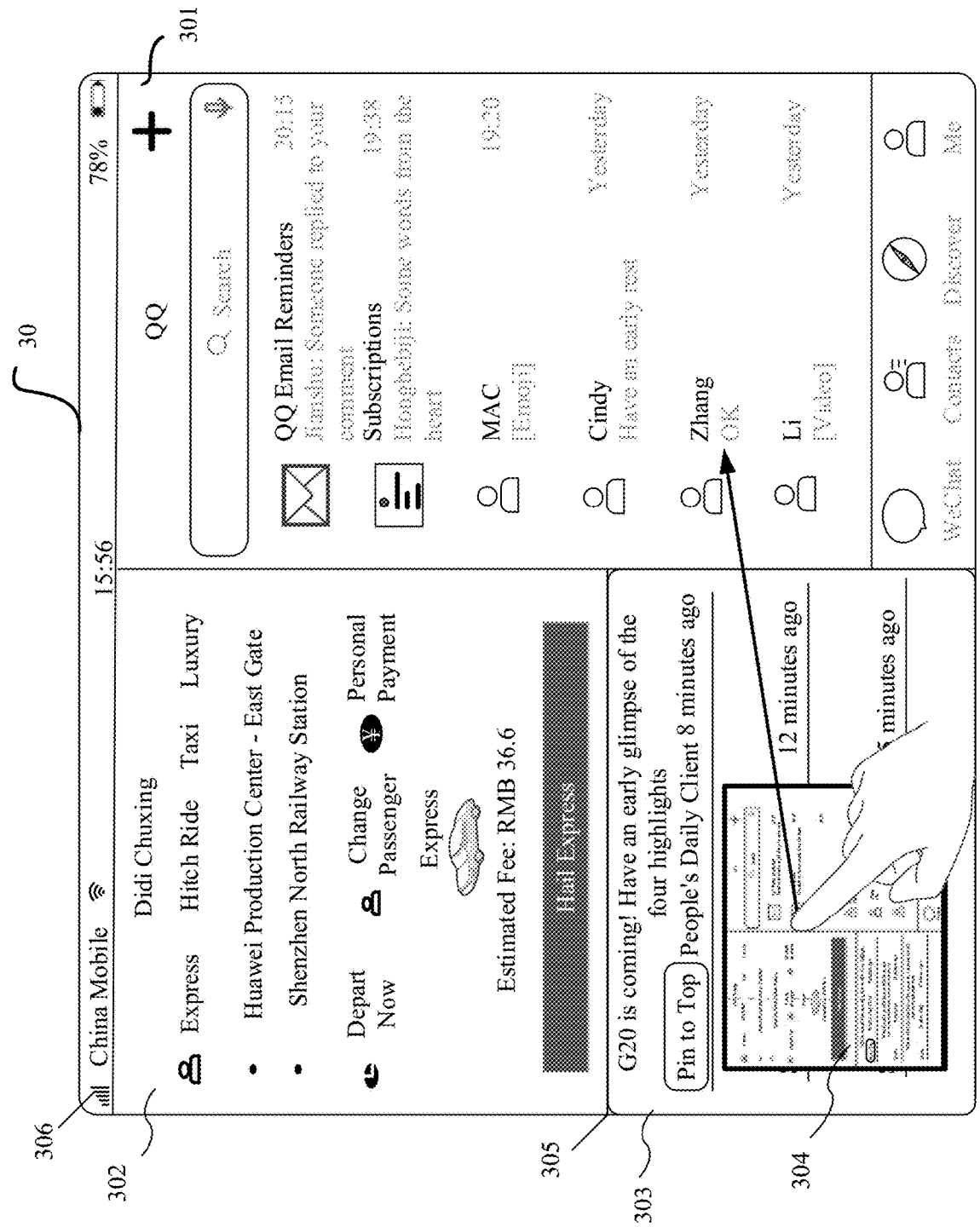

FIG. 3C and FIG. 3D show a group of user interfaces on which display content of a first screen is captured as a picture by using a first touch control operation and shared according to an embodiment of this application.

As shown in FIG. 3C, the electronic device 100 may respond to the user operation exerted on the touch sensor 180K in the embodiment corresponding to FIG. 2B. The electronic device 100 may identify whether the user operation is a movement operation in which a plurality of touch control points move by a distance greater than or equal to the first preset distance threshold on the user interface, and determine start positions of the plurality of touch control points during movement in the touch control operation of the user detected by the touch sensor 180K, to determine whether the user operation is intended to capture current display content of the target split-screen or capture current display content of the entire user interface. Then, when the start positions of the plurality of touch control points during the movement detected by the touch sensor 180K are not all located in the window display area 202, that is, start positions of a motion track corresponding to the plurality of touch control points are located in a plurality of split-screens, the current display content of the user interface 20 is accordingly captured as the third screenshot based on the user operation detected by the touch sensor 180K. FIG. 3D shows a user interface for confirming, saving, and sharing a screen capture thumbnail according to an embodiment of this application. For a manner of saving and sharing the third screenshot, refer to related descriptions in the foregoing embodiment and the following method embodiment. Details are not described herein again.

In an embodiment, FIG. 3E(1) and FIG. 3E(2) show another group of user interfaces on which display content of a first screen is captured as a picture by using a first touch control operation according to an embodiment of this application. When the user performs a multi-window operation by using a large-screen device, if start positions of a first touch control operation detected by the touch sensor 180K, that is, an operation of sliding down with three fingers, span across a plurality of windows, the electronic device 100 captures content of a plurality of windows. For example, as shown in FIG. 3E(1), if start positions span across an application A and an application B, the electronic device 100 may take a screenshot of current display content of all split-screens in the first screen, that is, take a screenshot of the application A and the application B. FIG. 3E(2) shows an obtained third screenshot, which is a screenshot of an entire screen.

In this embodiment of this application, the electronic device first determines whether the start positions of the plurality of touch control points during the movement in the first touch control operation are all located in the target split-screen in the first screen. If not, to be specific, if the start positions of the plurality of touch control points during the movement in the first touch control operation are located in areas of at least two split-screens, current display content of all the split-screens in the first screen is captured as the third screenshot. Therefore, if the user needs to capture display content of the entire screen, the user only needs to place the start positions of the plurality of touch control points during the movement in areas of at least two split-screens and a screenshot of the first screen can be taken. This avoids problems of a cumbersome screen capture operation and a relatively long time of screen capture for the user, thereby improving user experience in screen capture.

Scenario 3: Application Scenario of Taking a Long Screen Capture

Figure 4A:
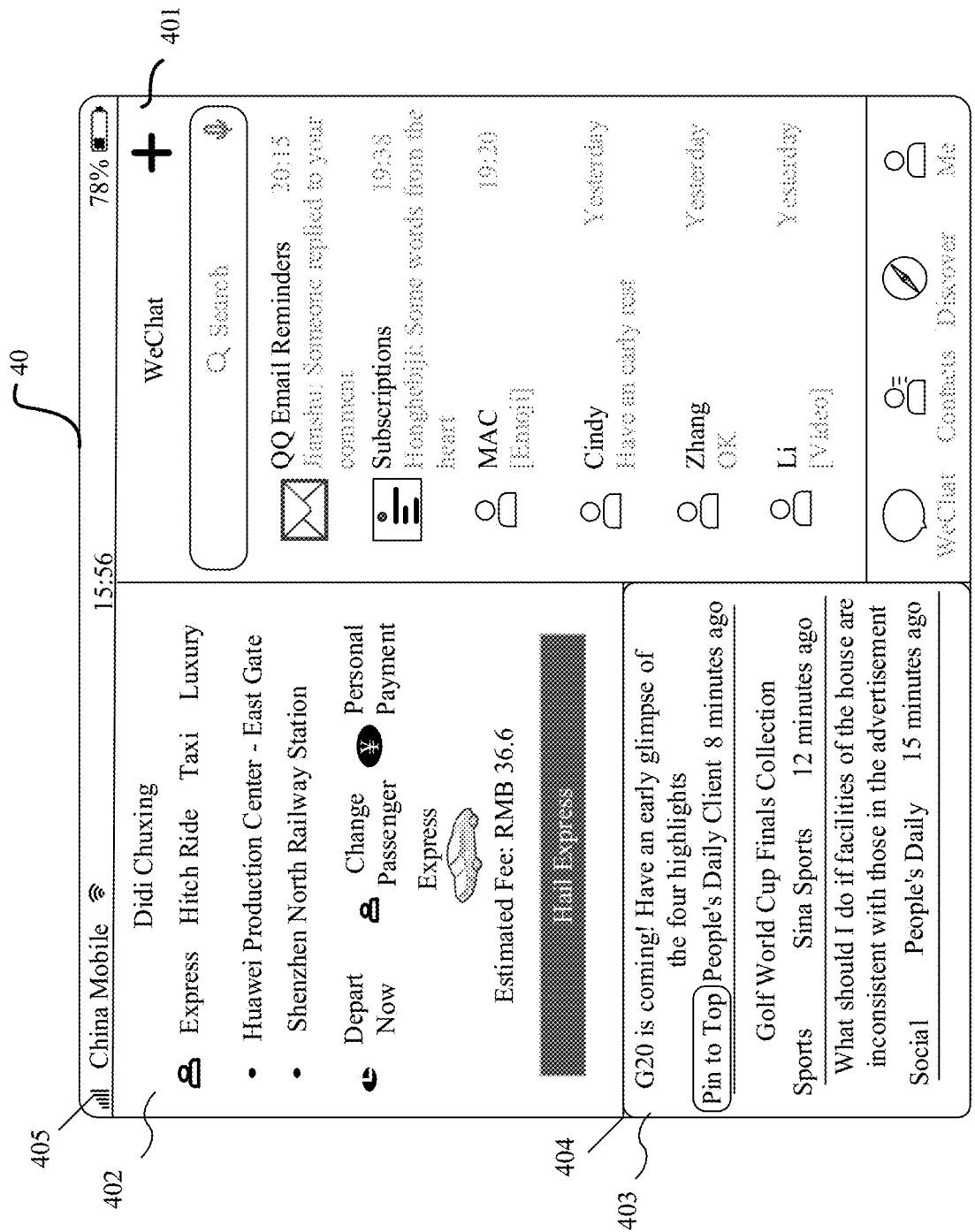
FIG. 4A is a schematic diagram of still another user interface with a plurality of windows according to an embodiment of this application.

FIG. 4A is a schematic diagram of still another user interface with a plurality of windows according to an embodiment of this application. The user interface includes a WeChat window 401, a Didi Dache window 402, and a news push window 403. The user interface is not limited thereto, and may further include more other windows or fewer windows. Other applications may be, for example, instant messaging software such as QQ or MSN; may be entertainment and video software such as iQiyi, Tencent Video, and Youku; and may further be auxiliary tool applications that come with a system of an electronic device, such as, calculator, calendar, and settings.

As shown in FIG. 4A, the user interface 40 may include a window display area 401, a window display area 402, a window display area 403, a window size control 404, and a status bar 405. The electronic device used by a local user is the electronic device 100.

The window display areas 401 to 403 are used to display content of different applications in the electronic device (or the electronic device 100), and can receive and respond to a touch control operation of the user in the window display areas 401 to 403.

The status bar 405 may include a carrier indicator (for example, a carrier name "China Mobile), one or more signal strength indicators of a wireless fidelity (Wi-Fi) signal, one or more signal strength indicators of a mobile communication signal (which may also be referred to as a cellular signal), a time indicator, and a battery status indicator.

In this scenario, a first screen of the electronic device used by the user is divided into three split-screen areas: The window display area 401 is used to display a main interface of WeChat, the window display area 402 is used to display a Didi Dache interface, and the window display area 403 is used to display a news push interface. If the user needs to share, to a WeChat contact, a long screen capture that is of the Didi Dache interface displayed in the window display area 402 and that does not include the WeChat and news push interfaces, the following three operation modes may be implemented:

Based on the foregoing application scenario, the following describes some UI embodiments for taking a long screen capture implemented in the electronic device 100.

If a long screenshot of the window display area 402 (that is, the Didi Dache window) needs to be shared to the window display area 401 (that is, the WeChat window), the electronic device 100 may first determine a type of a user operation that triggers an operation of taking a long screen capture. If a plurality of touch control points move by a distance length greater than or equal to a second preset distance threshold during movement in a target split-screen, a long screen capture of a split-screen area of the target split-screen is taken, where the second preset distance threshold is greater than a first preset distance threshold and a ratio between the second preset distance threshold and a height of the target split-screen is greater than a preset ratio threshold. Alternatively, if a first touch control operation on a target split-screen is received again within a second time period after the first touch control operation is received, a long screen capture of a split-screen area of the target split-screen is taken. Alternatively, if a first touch control operation includes four touch control points, a long screen capture of a split-screen area of a target split-screen.

(1) When the plurality of touch control points of the first touch control operation move by a distance length greater than or equal to the second preset distance threshold during movement in the target split-screen, the electronic device takes a long screen capture of the target split-screen.

Figure 4B:
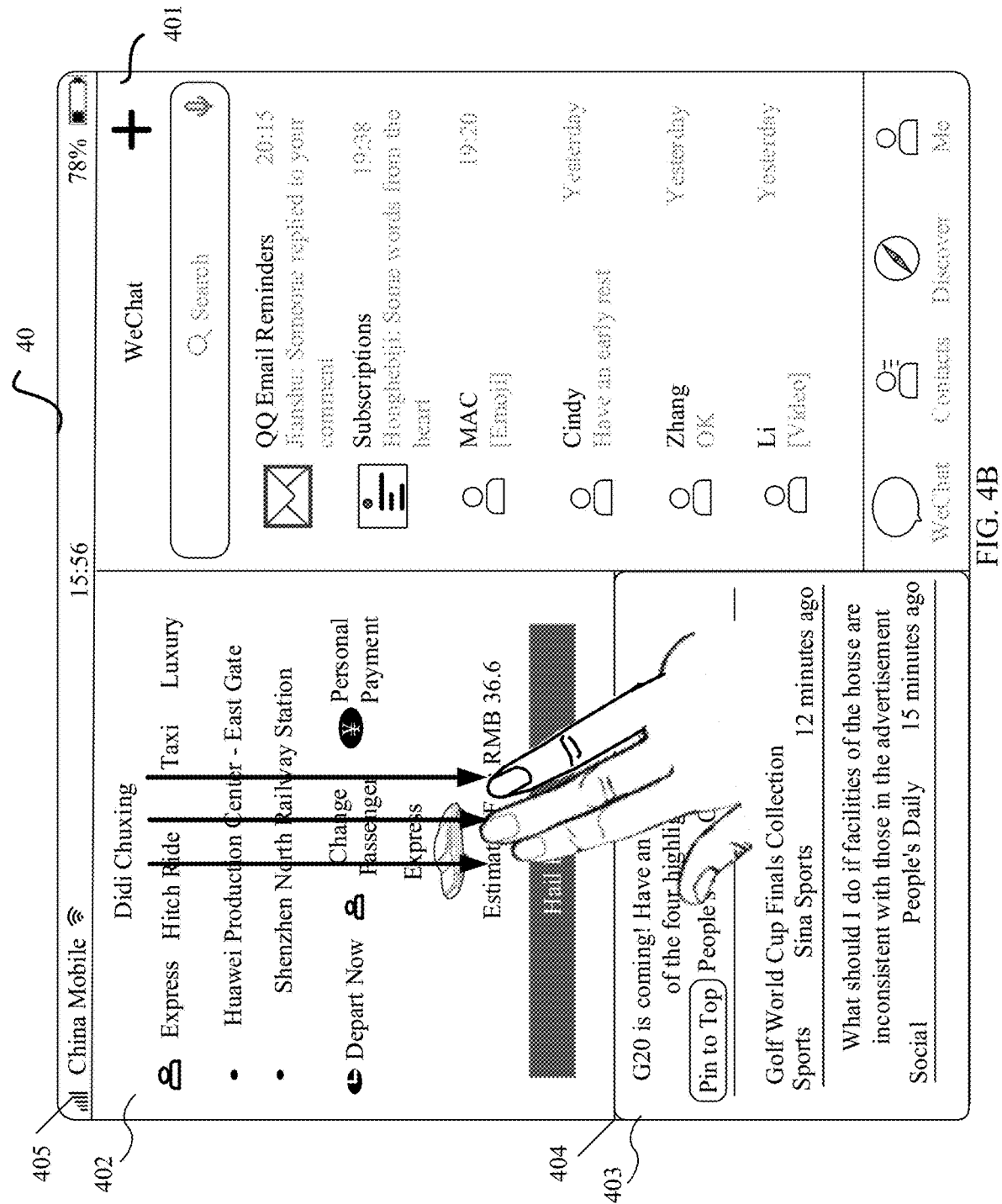
FIG. 4B and FIG. 4C are schematic diagrams of a group of user interfaces for taking a long screen capture according to an embodiment of this application.
Figure 4C:
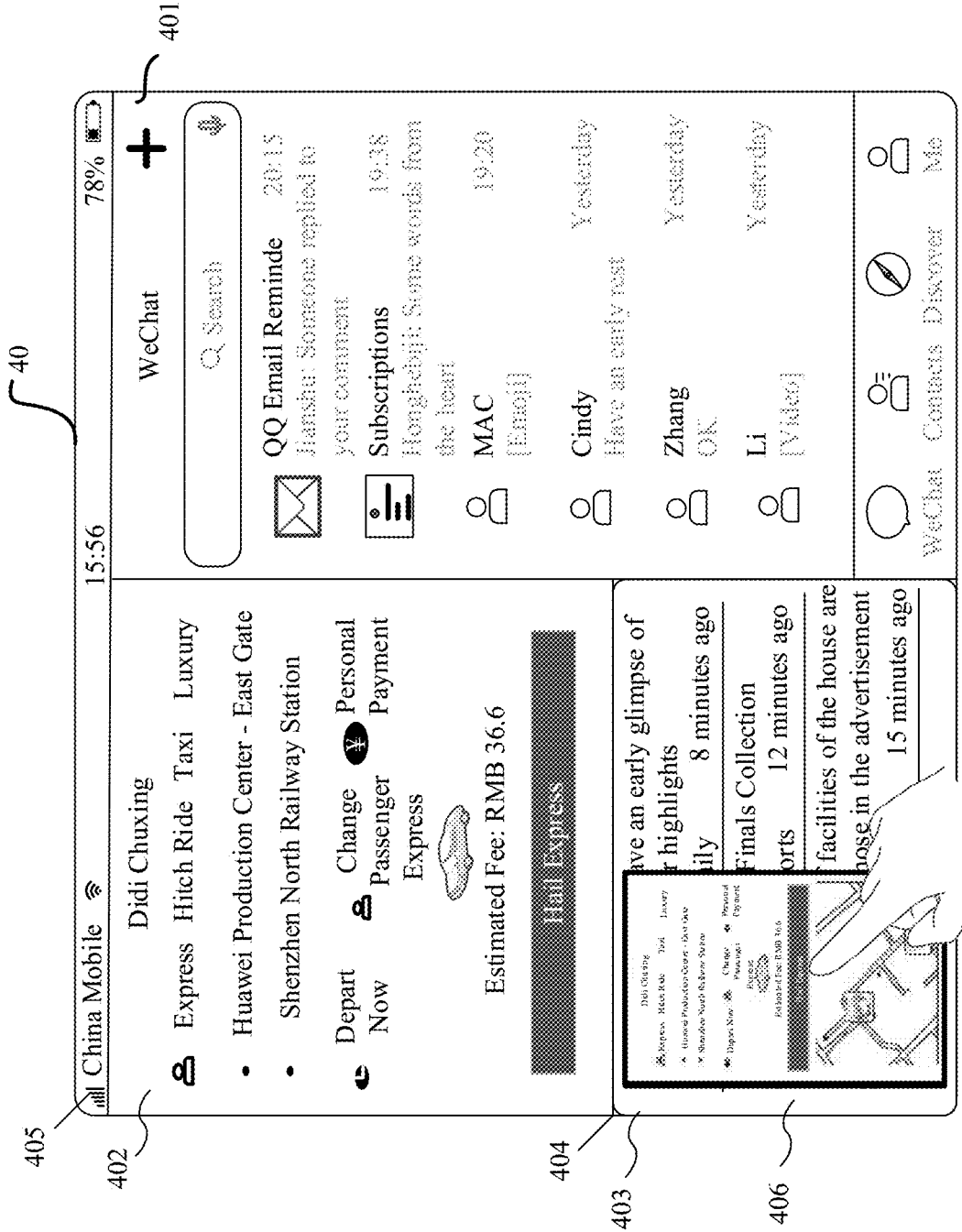

FIG. 4B and FIG. 4C are schematic diagrams of a group of user interfaces for taking a long screen capture according to an embodiment of this application. The electronic device 10 further includes a window size control 404. The window size control 404 is used to adjust a proportion of a window on the user interface. The electronic device 100 may detect a touch control operation exerted on the window size control 406 (for example, a drag operation on the window size control 406). In response to the operation, the electronic device 100 may adjust sizes of current windows 401 and 402.

When the plurality of touch control points move by a distance length greater than or equal to the second preset distance threshold during the movement in the target split-screen, the electronic device takes a long screen capture of the target split-screen. In addition to current display content of the target split-screen, a screenshot range of the long screen capture may further include next-page display content that is of the target split-screen and that is in direct proportion to a part, exceeding the second preset threshold, of a movement distance of the plurality of touch control points during the movement in the target split-screen. It should be noted that the second preset distance threshold is greater than the first preset distance threshold and the ratio between the second preset distance threshold and the height of the target split-screen is greater than the preset ratio threshold. The height of the target split-screen may be understood as a length of a side of the target split-screen along a movement direction of the plurality of touch control points in the target split-screen. For a manner of saving and sharing the third screenshot, refer to related descriptions in the foregoing embodiments and the following method embodiment. Details are not described herein again.

(4) When the electronic device receives the first touch control operation on the target split-screen again within the second time period after receiving the first touch control operation, a long screen capture is taken.

Figure 4D:
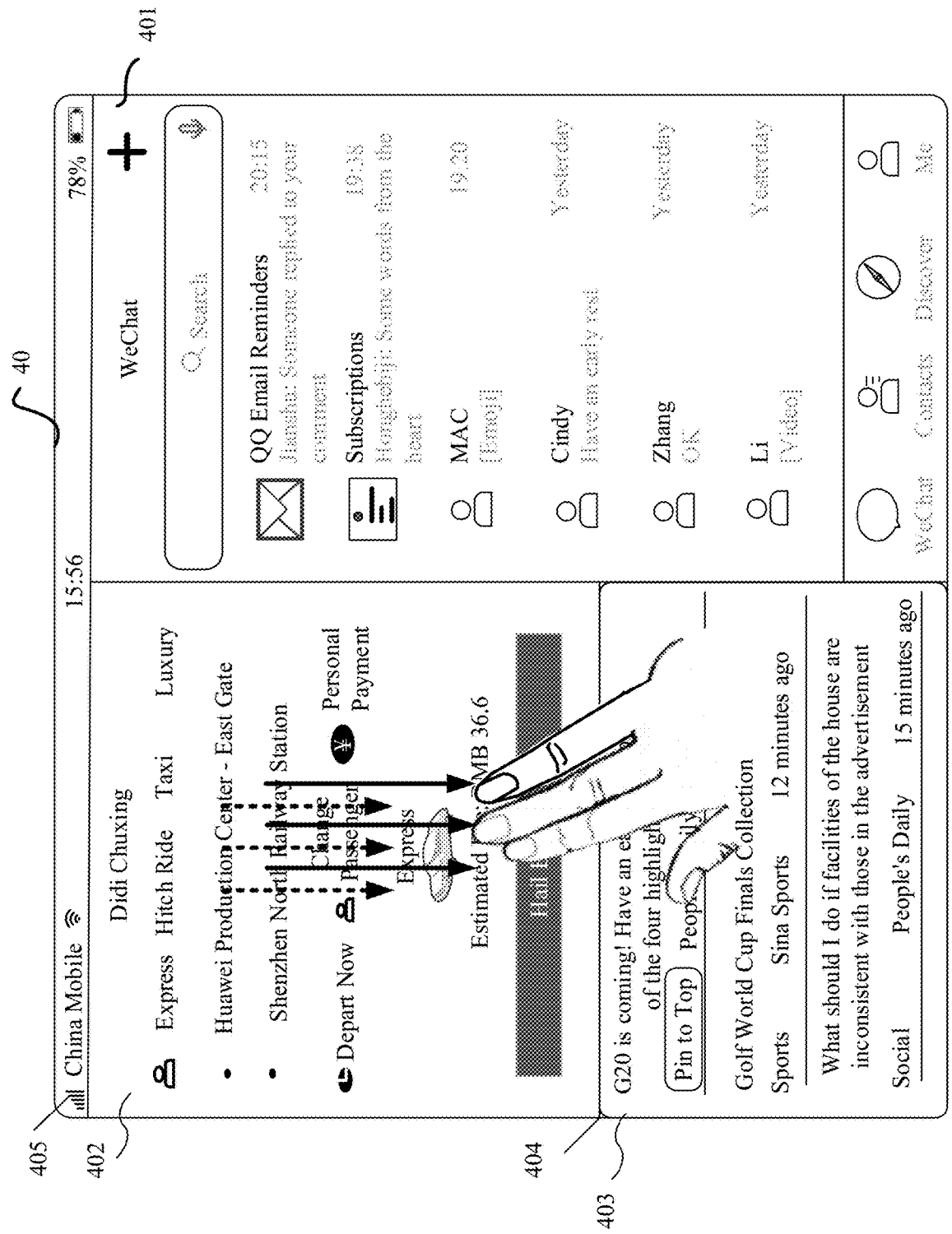
FIG. 4D and FIG. 4E are schematic diagrams of another group of user interfaces for taking a long screen capture according to an embodiment of this application.
Figure 4E:
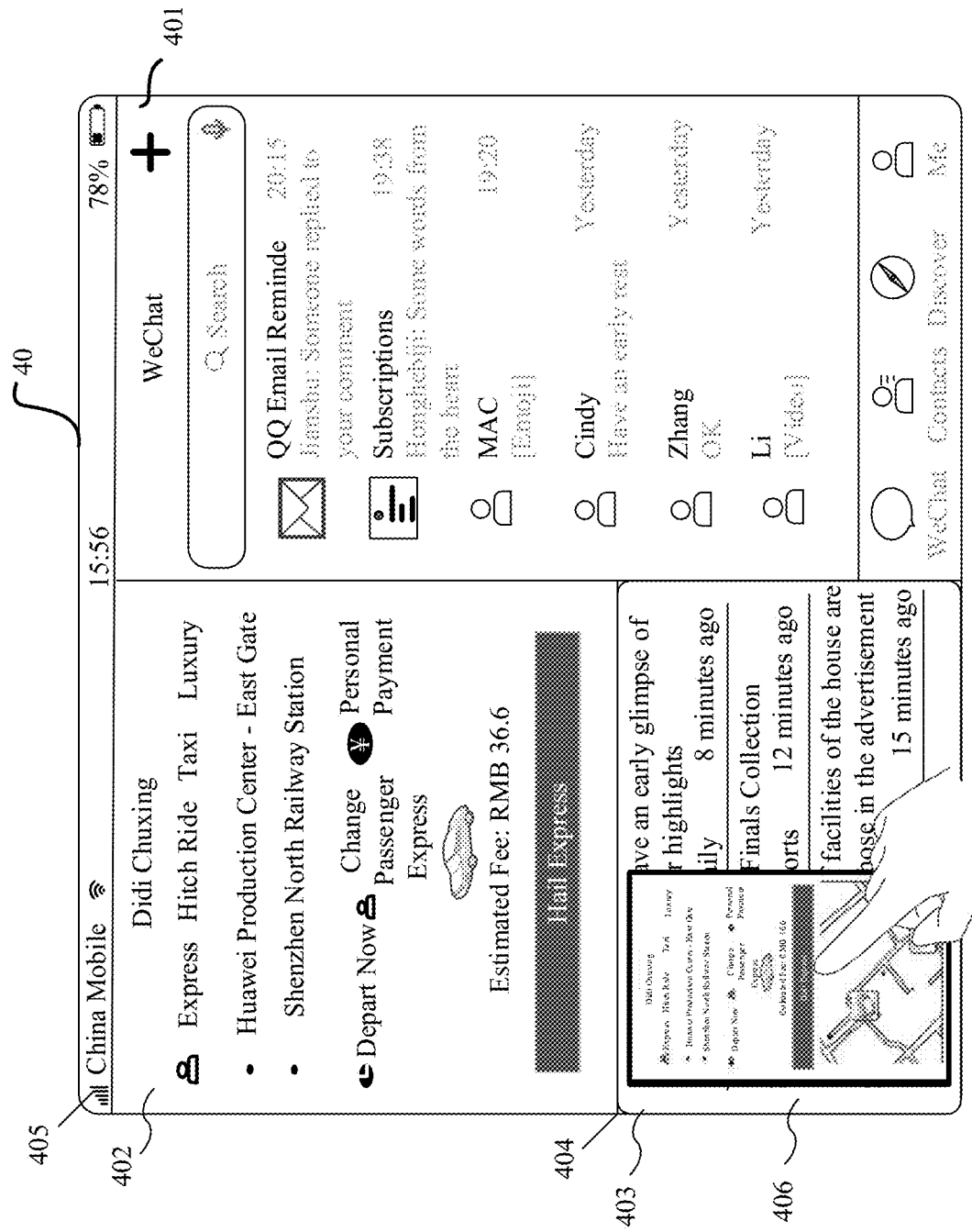

FIG. 4D and FIG. 4E are schematic diagrams of another group of user interfaces for taking a long screen capture according to an embodiment of this application.

When the electronic device 100 detects, by using the touch sensor 180K, the first touch control operation on the target split-screen again within the second time period after detecting the first touch control operation by using the touch sensor 180K, the electronic device 100 takes a long screen capture of the target split-screen. In addition to current display content of the target split-screen, a screenshot range of the long screen capture may further include content of the long screen capture that varies with a quantity of first touch control operations received consecutively within the second time period. For example, next-page display content of the target split-screen is added to current display content each time one more first touch control operation is received within the second time period. It can be understood that, the long screen capture includes more display content of the target split-screen when a larger quantity of first touch control operations are received within the second time period, until all display content of the target split-screen is captured. For a manner of saving and sharing the third screenshot, refer to related descriptions in the foregoing embodiments and the following method embodiment. Details are not described herein again.

(3) When the first touch control operation includes four touch control points, the electronic device takes a long screen capture of the target split-screen.

Figure 4F:
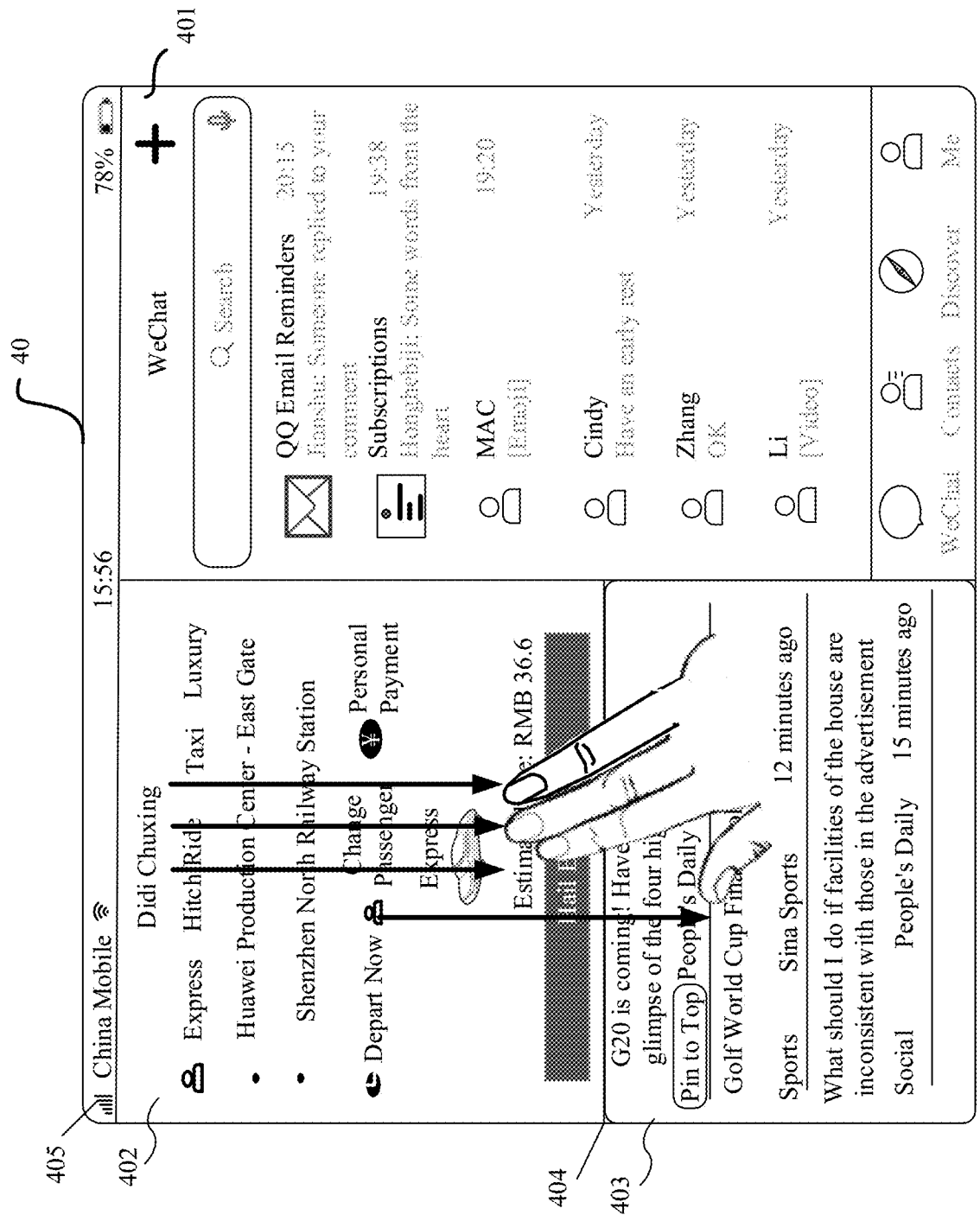
FIG. 4F and FIG. 4G are schematic diagrams of a user interface with a plurality of windows according to an embodiment of this application.
Figure 4G:
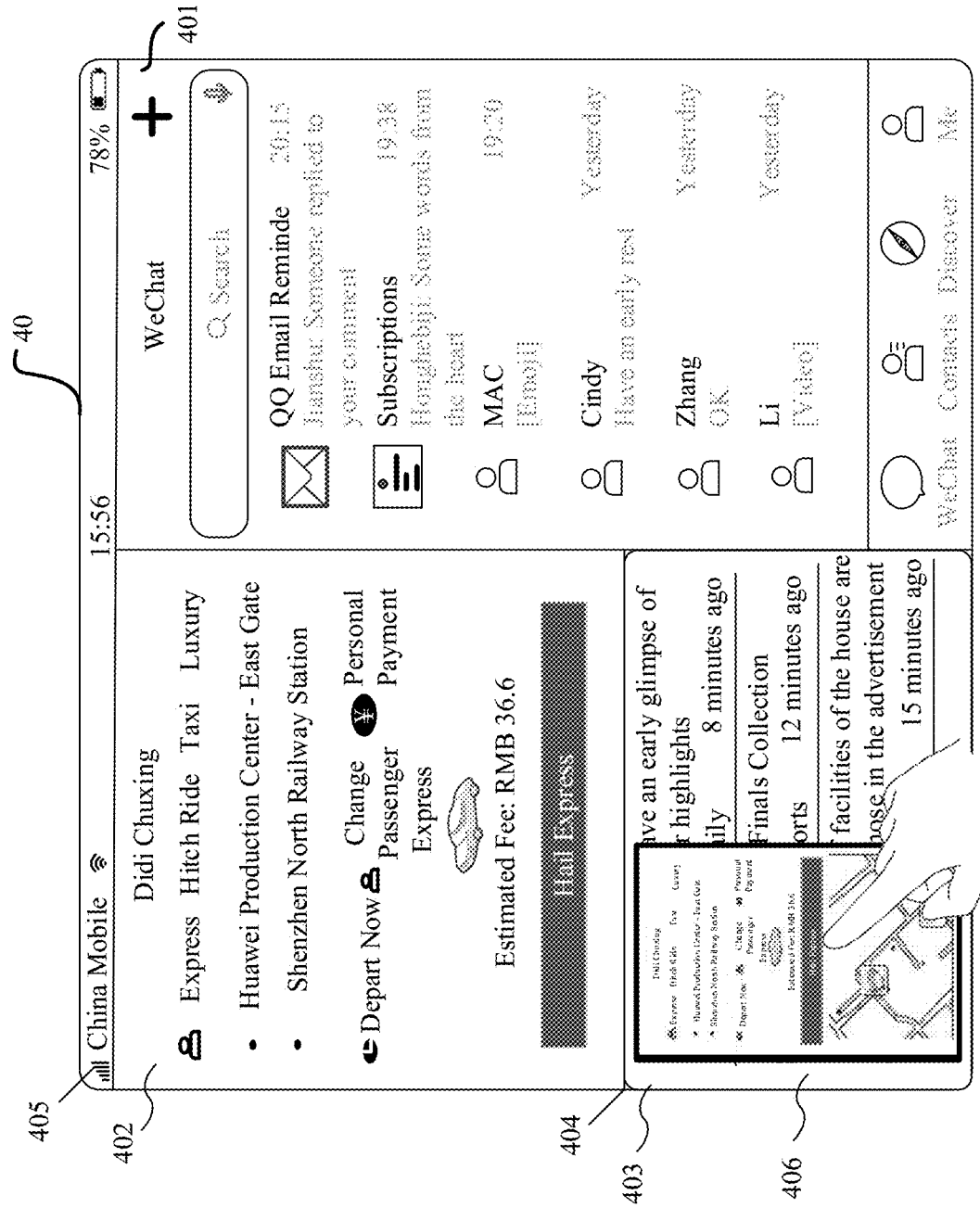

FIG. 4F and FIG. 4G are schematic diagrams of a user interface with a plurality of windows according to an embodiment of this application.

When the electronic device 100 detects, by using the touch sensor 180K, that the first touch control operation includes four touch control points, the electronic device takes a long screen capture of the target split-screen. In addition to current display content of the target split-screen, a screenshot range of the long screen capture may further include next-page display content that is of the target split-screen and that is in direct proportion to a time for which the four touch control points stay at an end position of a movement operation after the movement operation is performed, where in the movement operation, the four touch control points move by a distance greater than or equal to the first preset distance threshold in the first screen. Alternatively, in addition to current display content of the target split-screen, a screenshot range of the long screen capture may further include next-page display content that is of the target split-screen and that is in direct proportion to a plurality of pressure values corresponding to the four touch control points at an end position of a movement operation after the movement operation is performed, where in the movement operation, the four touch control points move by a distance greater than or equal to the first preset distance threshold in the first screen. For example, when the user slides down with four fingers, a finally obtained long screenshot corresponds to more display content as the four fingers stay longer at an end position. For another example, when the user slides down with four fingers, a finally obtained long screenshot corresponds to more display content as a pressure value corresponding to an end position increases. For a manner of saving and sharing the third screenshot, refer to related descriptions in the foregoing embodiments and the following method embodiment. Details are not described herein again.

It should be noted that the electronic device in this application may be a touch control smart terminal that can display a plurality of windows in a display area, for example, a smart terminal with a display, such as a smart terminal, an in-vehicle smart terminal, a smart TV, or a wearable device. The electronic device may alternatively be a touch control dual-screen terminal, for example, a foldable-screen terminal, a touch control computer, a tablet, a touch control TV, or a full-screen mobile phone.

It can be understood that in this embodiment of this application, an instruction for taking a long screen capture may be triggered based on different operation modes, to take a long screen capture of the target split-screen. In this way, a long screen capture is taken in various touch control modes. This avoids problems of a cumbersome screen capture operation and a relatively long time of screen capture for the user, thereby improving user experience in screen capture.

It can be understood that the foregoing three application scenarios are merely several example implementations of the embodiments of this application. Application scenarios of the embodiments of this application include but are not limited to the foregoing application scenarios.

Figure 5A:
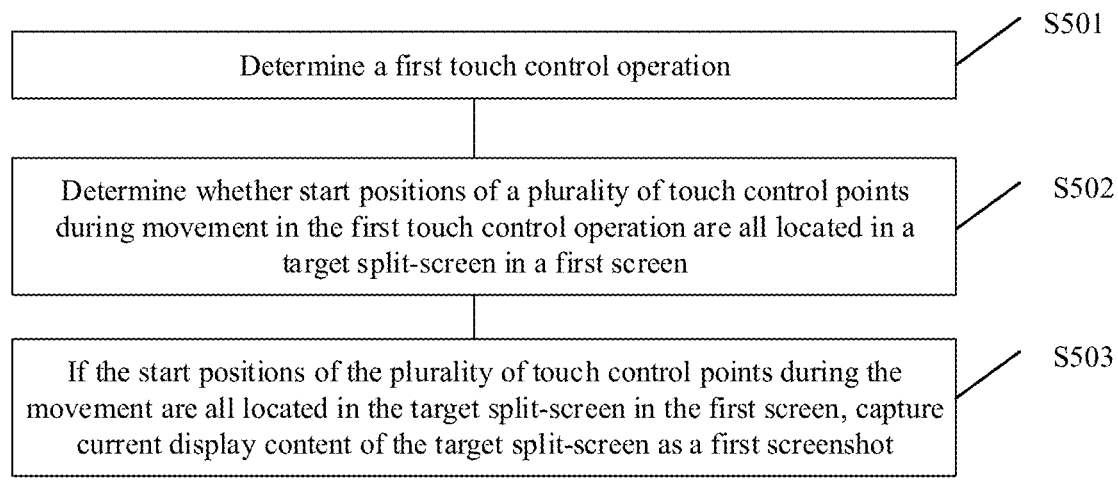
FIG. 5A is a schematic flowchart of a screen capture method according to an embodiment of this application.
Figure 5B:
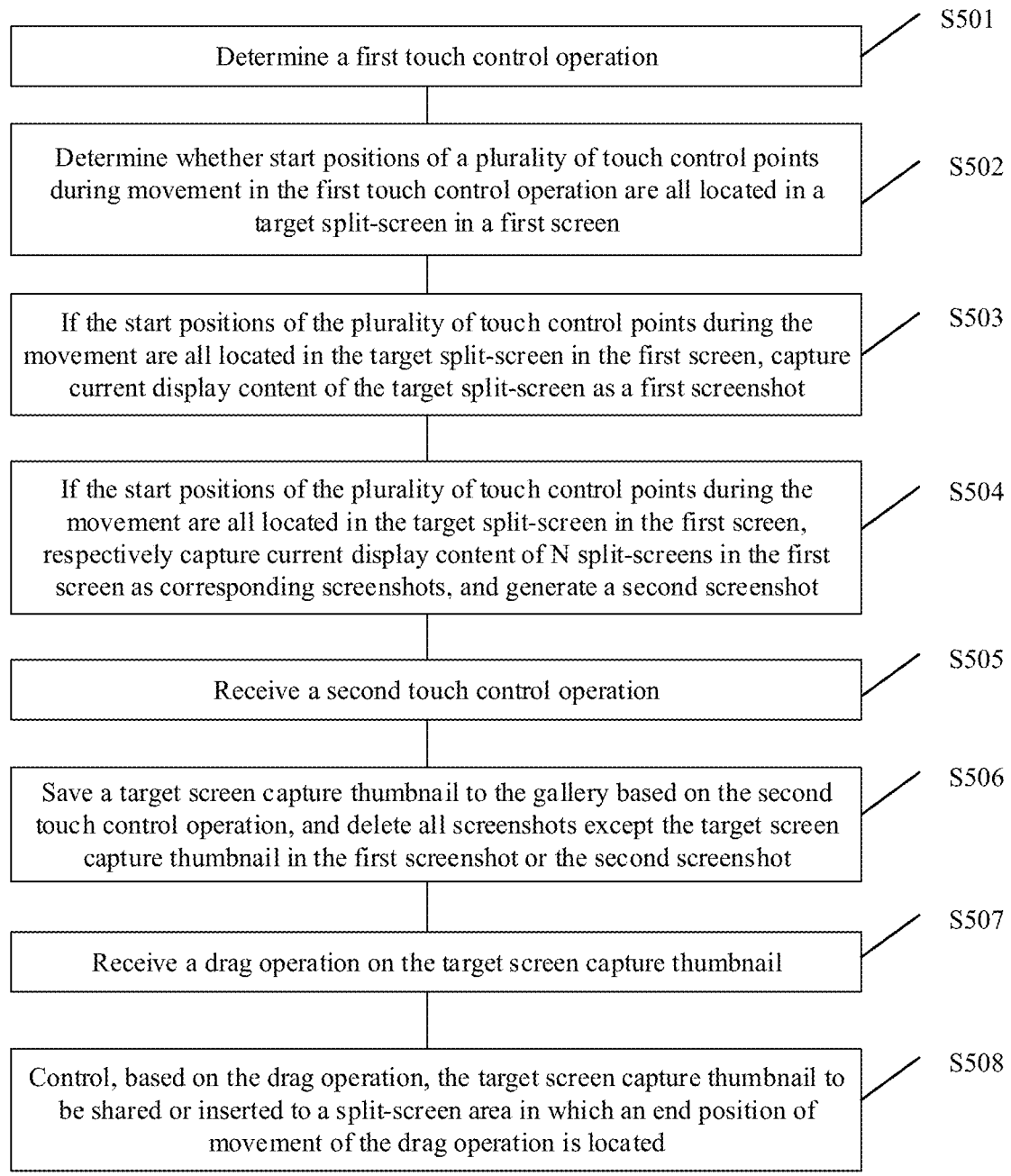
FIG. 5B is a schematic flowchart of another screen capture method according to an embodiment of this application.

Based on the five scenarios provided in FIG. 2A to FIG. 4G and the UI embodiments in the scenarios, the following describes a screen capture method provided in an embodiment of this application. The method may be applied to the electronic device described in FIG. 1A. FIG. 5A is a schematic flowchart of a screen capture method according to an embodiment of this application. FIG. 5B is a schematic flowchart of another screen capture method according to an embodiment of this application. The following descriptions are provided by using an electronic device as an execution entity. The method may include the following operation S501 to operation S503, as shown in FIG. 5A; and may further include operation S504 to operation S508, as shown in FIG. 5B.

Operation S501. Determine a first touch control operation.

Specifically, the electronic device determines a first touch control operation, where the first touch control operation is a movement operation in which a plurality of touch control points move by a distance greater than or equal to a first preset distance threshold in a first screen, the first screen includes N split-screens, and N is a positive integer greater than 1. It can be understood that the electronic device may receive a plurality of touch control operations and determine the first touch control operation from the plurality of touch control operations, that is, the movement operation in which the plurality of touch control points move by a distance greater than or equal to the first preset distance threshold in the first screen. The plurality of touch control points are at least more than two touch control points, and the first preset distance threshold needs to reach a preset ratio to a shortest side of a smallest split-screen of the N split-screens included in the first screen. It can be understood that if the first preset distance threshold is excessively small, a high probability of erroneously triggering an operation may be caused. In addition, each of N split-screen windows included in the first screen may vary in size. Therefore, the first preset distance threshold needs to reach the preset ratio to the shortest side of the smallest split-screen of the N split-screens included in the first screen. Otherwise, a screen capture operation, that is, the first touch control operation, cannot be triggered. For example, the first preset distance threshold is one third the shortest side of the smallest split-screen.

Operation S502: Determine whether start positions of the plurality of touch control points during the movement in the first touch control operation are all located in a target split-screen in the first screen.

Specifically, the electronic device determines whether the start positions of the plurality of touch control points during the movement in the received first touch control operation are all located in the target split-screen in the first screen, where the target split-screen is any one of the N split-screens. It should be noted that the plurality of touch control points in the first touch control operation may be generated by touch control of a user by using a finger or generated by an operation performed by a user by using an external touch control tool. The touch control tool includes, but is not limited to, a stylus, touch control gloves, or the like. It should be further noted that a quantity of the touch control points may be two or more. In some embodiments, during the movement, the plurality of touch control points may move simultaneously.

In an embodiment, if the plurality of touch control points move by a distance length greater than or equal to a second preset distance threshold during movement in the target split-screen, a long screen capture of a split-screen area of the target split-screen is taken, where the second preset distance threshold is greater than the first preset distance threshold and a ratio between the second preset distance threshold and a height of the target split-screen is greater than a preset ratio threshold. Alternatively, if the first touch control operation on the target split-screen is received again within a second time period after the first touch control operation is received, a long screen capture of a split-screen area of the target split-screen is taken. Alternatively, if the first touch control operation includes four touch control points, a long screen capture of a split-screen area of the target split-screen is taken. For example, in this embodiment of this application, the user is also allowed to take a long screen capture of a single window. If the user performs a screen capture operation by using a screen capture gesture of sliding down with three fingers, in this embodiment of this application, a quantity of consecutive gestures of the user of sliding down with three fingers is determined, to determine whether the user intends to take a long screen capture. Alternatively, an end position of a screen capture gesture (sliding down with three fingers) of the user, that is, a position at which the three fingers move away from the screen, is determined, to determine whether the user needs to take a long screen capture. Alternatively, an operation of taking a long screen capture operation may also be triggered when the user slides down with four fingers.

Figure 5C:
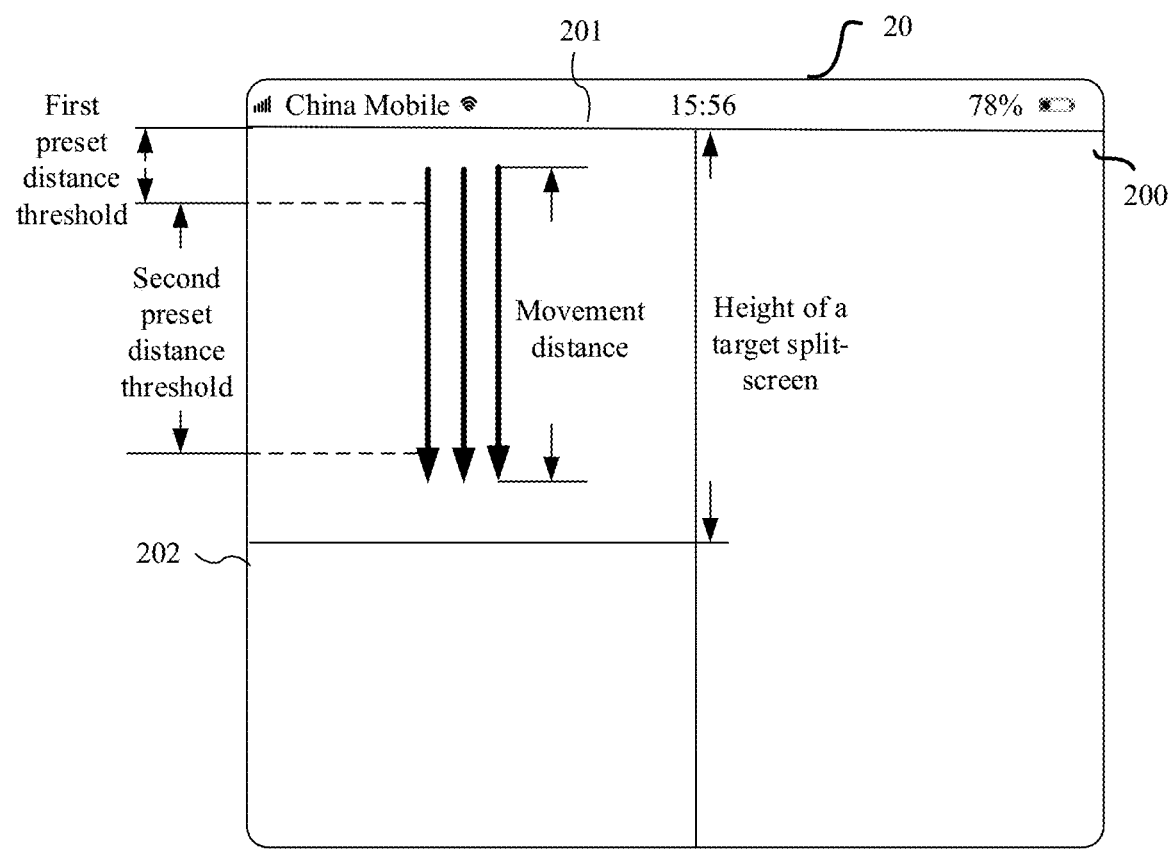
FIG. 5C is a schematic diagram of an operation of taking a long screen capture based on the electronic device 100 according to an embodiment of this application.

It can be understood that when the plurality of touch control points move by a distance length greater than or equal to the second preset distance threshold during the movement in the target split-screen, the electronic device takes a long screen capture of the target split-screen. In addition to current display content of the target split-screen, a screenshot range of the long screen capture may further include next-page display content that is of the target split-screen and that is in direct proportion to a part, exceeding the second preset threshold, of a movement distance of the plurality of touch control points during the movement in the target split-screen. FIG. 5C is a schematic diagram of an operation of taking a long screen capture based on the electronic device 100 according to an embodiment of this application. It should be noted that the second preset distance threshold is greater than the first preset distance threshold, and the ratio of the second preset distance threshold to the height of the target split-screen is greater than the preset ratio threshold. The height of the target split-screen may be understood as a length of a side of the target split-screen along a movement direction of the plurality of touch control points during the movement in the target split-screen. For example, if the start positions of the plurality of touch control points during the movement in the target split-screen are at a top part of the target split-screen and end positions are at a bottom part of the target split-screen, a long screen capture of the target split-screen is taken.

It can further be understood that when the first touch control operation on the target split-screen is received again within the second time period after the first touch control operation is received, the electronic device takes a long screen capture of the target split-screen. In addition to current display content of the target split-screen, a screenshot range of the long screen capture may further include content of the long screen capture that varies with a quantity of first touch control operations received consecutively within the second time period. For example, next-page display content of the target split-screen is added to current display content each time one more first touch control operation is received within the second time period. It can be understood that, the long screen capture includes more display content of the target split-screen when a larger quantity of first touch control operations are received within the second time period, until all display content of the target split-screen is captured.

It can further be understood that when the first touch control operation includes four touch control points, the electronic device takes a long screen capture of the target split-screen. In addition to current display content of the target split-screen, a screenshot range of the long screen capture may further include next-page display content that is of the target split-screen and that is in direct proportion to a time for which the four touch control points stay at an end position of a movement operation after the movement operation is performed, where in the movement operation, the four touch control points move by a distance greater than or equal to the first preset distance threshold in the first screen. Alternatively, in addition to current display content of the target split-screen, a screenshot range of the long screen capture may further include next-page display content that is of the target split-screen and that is in direct proportion to a plurality of pressure values corresponding to the four touch control points at an end position of a movement operation after the movement operation is performed, where in the movement operation, the four touch control points move by a distance greater than or equal to the first preset distance threshold in the first screen. For example, when the user slides down with four fingers, a finally obtained long screenshot corresponds to more display content as the four fingers stay longer at an end position. For another example, when the user slides down with four fingers, a finally obtained long screenshot corresponds to more display content as a pressure value corresponding to an end position increases.

Operation S503. If the start positions of the plurality of touch control points during the movement are all located in the target split-screen in the first screen, capture the current display content of the target split-screen as a first screenshot.

Specifically, if the electronic device determines that the start positions of the plurality of touch control points during the movement in the first touch control operation are all located in the target split-screen in the first screen, the electronic device captures the current display content of the target split-screen as the first screenshot. FIG. 5D(1) to FIG. 5D(4) are schematic diagrams of a group of user interfaces on which a screenshot of a single screen is taken and shared to a current split-screen according to an embodiment of this application. FIG. 5D(1) shows an operation of sliding down with three fingers (that is, a first touch control operation) in a target window (that is, an application B). FIG. 5D(2) shows that when the three fingers slide down in the target window, only a current interface of the target window is captured to obtain a first screenshot. The first screenshot may receive a touch control operation (for example, a drag operation). The first screenshot may further be a screenshot thumbnail. FIG. 5D(3) shows that the first screenshot is shared to an application C after receiving the drag operation. FIG. 5D(4) shows a flowchart of the foregoing three figures.

To be specific, for example, when a user performs a multi-window operation on a foldable-screen device, if the user performs a screen capture operation by using a screen capture gesture of sliding down with three fingers, in this application, an intention of the user is determined in advance by determining a start position of the screen capture gesture (of sliding down with three fingers) of the user. If the start position of the operation of sliding down with three fingers falls at a top part of a single window, a screen capture operation is performed on the window. In this way, a screenshot of a single screen is obtained based on whether start positions of a plurality of touch control points are all located in the same screen. This can flexibly and rapidly obtain a screenshot of a target split-screen area in a multi-window task, so that the user can obtain the screenshot within a relatively short time and does not need to perform secondary editing in picture editing software, thereby simplifying a screenshot taking operation for the user.

In some embodiments, if the electronic device determines the start positions of the plurality of touch control points during the movement are not all located in the target split-screen in the first screen, the electronic device captures current display content of the first screen as a third screenshot and saves the third screenshot to the gallery. FIG. 5E(1) to FIG. 5E(3) are schematic diagrams of a group of user interfaces on which a screenshot of an entire screen is taken and shared to a current split-screen according to an embodiment of this application. FIG. 5E(1) shows that a user performs an operation of sliding down with three fingers (that is, a first touch control operation) in at least two windows (that is, an application A and an application B). FIG. 5E(2) shows that when the three fingers slide down in the at least two windows, display content of a current display interface of the first screen is captured to obtain a third screenshot. FIG. 5E(3) shows that a screenshot thumbnail corresponding to an application C receives a drag operation and is shared to the application A. An end position of the drag operation is a split-screen in which the application A is located.

Operation S504: If the start positions of the plurality of touch control points during the movement are all located in the target split-screen in the first screen, capture current display content of the N split-screens in the first screen as corresponding screenshots, and generate a second screenshot.

Specifically, if the electronic device determines that the start positions of the plurality of touch control points during the movement are all located in the target split-screen in the first screen, the method further includes: the second screenshot generated by the electronic device includes the screenshots corresponding to the N split-screens, the screenshots are arranged in the second screenshot in a manner in which the corresponding split-screens are distributed in the first screen, and each of the screenshots corresponding to the N split-screens is a thumbnail that is allowed to receive a touch control operation. It can be understood that if the electronic device determines that the start positions of the plurality of touch control points during the movement in the first touch control operation are all located in the target split-screen in the first screen, not only the current display content of the target split-screen is captured as the first screenshot, the current display content of the N split-screens in the first screen may further be captured as corresponding screenshots, and the second screenshot is generated. The second screenshot includes the screenshots corresponding to the N split-screens, the screenshots are arranged in the second screenshot in a manner in which the corresponding split-screens are distributed in the first screen, and each of the screenshots corresponding to the N split-screens is a thumbnail that is allowed to receive a touch control operation. FIG. 5F(1) to FIG. 5F(4) are schematic diagrams of another group of user interfaces on which a screenshot of a single screen is taken and shared to a current split-screen according to an embodiment of this application. FIG. 5F(1) shows an operation of sliding down with three fingers (that is, a first touch control operation) in a target window (that is, an application B). FIG. 5F(2) shows that when the three fingers slide down in the target window, display content of all split-screens in a current display interface of the first screen is captured to obtain a second screenshot. The second screenshot includes a screenshot thumbnail corresponding to an application A, a screenshot thumbnail corresponding to the application B, and a screenshot thumbnail corresponding to an application C. The three screenshot thumbnails each may independently receive a touch control operation (for example, a drag operation). FIG. 5F(3) shows that the screenshot thumbnail corresponding to the application C receives a drag operation. FIG. 5F(4) shows that the screenshot thumbnail corresponding to the application C is shared to the application B after receiving the drag operation. It should be noted that the first screenshot and the second screenshot float on the first screen, and the first screenshot does not intersect with the second screenshot.

In some embodiments, a screen capture operation performed by using a knuckle or a screen capture operation performed by pressing a key combination is received; current display content of all split-screens in the first screen is captured as corresponding screenshots based on an instruction of the screen capture operation performed by using a knuckle or an instruction of the screen capture operation performed by pressing a key combination; and a second screenshot is generated. The second screenshot includes screenshots corresponding to the N split-screens, the screenshots are arranged in the second screenshot in a manner in which the corresponding split-screens are distributed in the first screen, and each of the screenshots corresponding to the N split-screens is a thumbnail that is allowed to receive a touch control operation. FIG. 5G(1) to FIG. 5G(4) are schematic diagrams of still another group of user interfaces on which a screenshot of a single screen is taken and shared to a current split-screen according to an embodiment of this application. FIG. 5G(1) shows that an electronic device receives a screen capture operation performed by using a knuckle or a screen capture operation performed by pressing a key combination. FIG. 5G(2) shows that after the electronic device receives the screen capture operation performed by using a knuckle or the screen capture operation performed by pressing a key combination, display content of all split-screens in a current display interface of a first screen is captured to obtain a second screenshot. The second screenshot includes a screenshot thumbnail corresponding to an application A, a screenshot thumbnail corresponding to an application B, and a screenshot thumbnail corresponding to an application C. The three screenshot thumbnails each may independently receive a touch control operation (for example, a drag operation). FIG. 5G(3) shows that the screenshot thumbnail corresponding to the application C receives a drag operation. FIG. 5G(4) shows that the screenshot thumbnail corresponding to the application C is shared to the application B after receiving the drag operation.

Operation S505. Receive a second touch control operation.

Specifically, the second touch control operation is an operation of tapping a target screen capture thumbnail in the first screenshot or the second screenshot, and the target screen capture thumbnail is at least one of screen capture thumbnails corresponding to the N split-screens in the first screenshot or the second screenshot. It should be noted that the target screen capture thumbnail included in the second touch control operation may be a plurality of the screen capture thumbnails corresponding to the N split-screens in the first screenshot or the second screenshot. Therefore, the plurality of screenshots may be spliced into one screenshot based on the second touch control operation. If a graph obtained by splicing the plurality of screenshots together is in an irregular shape, the electronic device may automatically fill in a missing part, so that the spliced graph is in a regular geometrical shape.

Operation S506. Save the target screen capture thumbnail to the gallery based on the second touch control operation, and delete all screenshots except the target screen capture thumbnail in the first screenshot or the second screenshot.

In some embodiments, if the second touch control operation is not received within a first time period after any one of the first touch control operation, the instruction of the screen capture operation performed by using a knuckle, or the instruction of the screen capture operation performed by pressing a key combination is received, all screen captures in the second screenshot are spliced into one picture, and the picture and the first screenshot are saved to the gallery. FIG. 5H(1) to FIG. 5H(5) are schematic diagrams of another group of user interfaces on which a screenshot of an entire screen is taken and shared to a current split-screen according to an embodiment of this application. FIG. 5H(1) shows that an electronic device receives a screen capture operation performed by using a knuckle or a screen capture operation performed by pressing a key combination. FIG. 5H(2) shows that all screen captures in a second screenshot are spliced into one screenshot because the electronic device does not receive a second touch control operation within a first time period after receiving the screen capture operation performed by using a knuckle or the screen capture operation performed by pressing a key combination. The screenshot includes a screenshot thumbnail corresponding to an application A, a screenshot thumbnail corresponding to an application B, and a screenshot thumbnail corresponding to an application C. FIG. 5H(3) shows that a thumbnail of the spliced screenshot receives a drag operation. FIG. 5H(4) shows that the thumbnail of the spliced screenshot is shared to the application C after receiving the drag operation. FIG. 5H(5) shows a method flowchart of the foregoing four pictures. To be specific, when a user performs a multi-window operation on a foldable-screen device, if the user captures a screen by using a knuckle or captures a screen by pressing a key combination, in an existing screen capture solution, a screen capture of all windows in a current screen is taken. In this application, thumbnails of all the windows obtained after a screen capture operation are presented as a picture mosaic in a corner of the screen, and the user can later select a screen capture as needed. If the user does not make selection within a specific time, the thumbnails of screen captures of the plurality of windows are spliced into a whole thumbnail. In this way, all screenshots are spliced into one picture and saved to the gallery.

Operation S507. Receive a drag operation on the target screen capture thumbnail.

Specifically, the drag operation is an operation of moving the target screen capture thumbnail by using at least one touch control point. When the user performs a multi-window operation by using a foldable-screen device and wants to insert a screenshot of an application B into an application C, the user only needs to slide down with three fingers starting from a top part of a window in the application B, and a screen capture of an interface of the application B is taken. When a screen capture thumbnail of the application B is dragged and the thumbnail is dropped to a window of the application C, the screenshot can be inserted into the application C, to complete content sharing, for example, the operation shown in FIG. 5D(2), the operation shown in FIG. 5E(2), the operation shown in FIG. 5F(3), the operation shown in FIG. 5G(3), and the operation shown in FIG. 5H(3).

Operation S508: Control, based on the drag operation, the target screen capture thumbnail to be shared or inserted to a split-screen area in which an end position of movement of the drag operation is located.

Specifically, the electronic device may control, based on the drag operation, the target screen capture thumbnail to be shared or inserted to the split-screen area in which the end position of the movement of the drag operation is located, for example, the case shown in FIG. 5D(3), the case shown in FIG. 5E(3), the case shown in FIG. 5F(4), the case shown in FIG. 5G(4), and the case shown in FIG. 5H(4). FIG. 5I(1) and FIG. 5I(2) are schematic diagrams of a group of user interfaces on which a screenshot of a single screen is taken and shared to an application included in a current interface in actual application according to an embodiment of this application. FIG. 5I(1) shows an operation of sliding down with three fingers in a split-screen in which the gallery is located. FIG. 5I(2) shows that after the three fingers slide down in the split-screen in which the gallery is located, display content of the gallery is captured to obtain a first screenshot, and the first screenshot is dragged and shared to a split-screen in which phone contacts are located, to insert the screenshot to the phone contacts.

In this embodiment of this application, the electronic device may determine the first touch control operation from a plurality of received touch control operations, and determine whether the start positions of the plurality of touch control points during the movement in the first touch control operation are all located in the target split-screen in the first screen. If yes, the electronic device captures the current display content of the target split-screen as the first screenshot, and captures the current display content of the first screen to generate the second screenshot. Otherwise, the electronic device captures the current display content of the first screen as the third screenshot. Therefore, in this way, after it is determined that the start positions of the plurality of touch control points are all located in the same screen, a screenshot of the single screen can be directly obtained from a plurality of windows. This can achieve the purpose of flexibly and rapidly obtaining a screenshot of a target split-screen area, so that the user can obtain the screenshot within a relatively short time. In addition, it is unnecessary to first capture the entire display and place an obtained screenshot of the entire screen in picture editing software to manually remove display information of other screens in the screen capture picture, thereby simplifying a screenshot taking operation for the user.

In the foregoing embodiments, the description of each embodiment has respective focuses. For a part that is not described in detail in an embodiment, reference may be made to related descriptions in other embodiments.

It should be noted that, to make the description brief, the foregoing method embodiments are expressed as a series of actions. However, persons skilled in the art should appreciate that this application is not limited to the described action sequence, because according to this application, some operations may be performed in other sequences or performed simultaneously. In addition, persons skilled in the art should also appreciate that all the embodiments described in the specification are example embodiments, and the related actions and modules are not necessarily mandatory to this application.

It should be understood that the apparatuses disclosed in the several embodiments provided in this application can be implemented in other ways. For example, the described apparatus embodiment is merely an example. For example, the unit division is merely logical function division and may be other division methods in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

If the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, or a network device, and may specifically be a processor in the computer device) to perform all or some of the operations of the methods described in the embodiments of this application. The storage medium may include various media that can store program code, such as a USB flash drive, a removable hard disk, a magnetic disk, an optical disc, a read-only memory (ROM), or a random access memory (RAM).

In summary, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A screen capture method, comprising:
displaying a first screen comprising three split-screens, wherein the three split-screens comprise a first application, a second application and a third application, and wherein the first application is displayed adjacent the second application in a first direction;
displaying, in response to a first user operation, a first thumbnail of a first screenshot corresponding to the first application, a second thumbnail of a second screenshot corresponding to the second application and a third thumbnail of a third screenshot corresponding to the third application, wherein the first thumbnail is also displayed adjacent the second thumbnail in the first direction;
responsive to receiving a second user operation on the first thumbnail in a first time period, saving the first screenshot as a picture to a gallery, wherein the gallery does not comprise the second screenshot or the third screenshot after the second user operation; and
responsive to receiving no user operation in the first time period, saving the first screenshot, the second screenshot and the third screenshot to the gallery together as a single picture.

2. The screen capture method according to claim 1, wherein the method further comprises:
responsive to receiving a third user operation on the first thumbnail, sending the first screenshot to the second application.

3. The screen capture method according to claim 2, wherein the third user operation comprises an operation to share or insert the first screenshot.

4. The screen capture method according to claim 2, wherein the third user operation comprises a sliding operation starting from the first thumbnail and ending at the second application.

5. The screen capture method according to claim 1, wherein the first user operation comprises a pressing operation on a key combination.

6. The screen capture method according to claim 1, wherein the first user operation comprises a sliding gesture, and wherein starting positions of the sliding gesture span across at least two of the first application, the second application and the third application.

7. The screen capture method according to claim 1, wherein the first application and the second application are different types.

8. The screen capture method according to claim 1, wherein the first thumbnail, the second thumbnail and the third thumbnail are displayed floating over the first screen.

9. The screen capture method according to claim 1, wherein a size of the first thumbnail, the second thumbnail and the third thumbnail is smaller than a size of the first application, the second application and the third application, respectively.

10. The screen capture method according to claim 1, wherein the first thumbnail and the first screenshot comprise next-page display content of the first application.

11. The screen capture method according to claim 1, wherein the third application is displayed adjacent the second application and the third thumbnail is also displayed adjacent the second thumbnail.

12. An electronic device comprising one or more processors and a memory, wherein the memory is configured to store computer program code, the computer program code comprises computer instructions, and the one or more processors execute the computer instructions to perform:
displaying a first screen comprising three split-screens, wherein the three split-screens comprise a first application, a second application and a third application, and wherein the first application is displayed adjacent the second application in a first direction;

displaying, in response to a first user operation, a first thumbnail of a first screenshot corresponding to the first application, a second thumbnail of a second screenshot corresponding to the second application and a third thumbnail of a third screenshot corresponding to the third application, wherein the first thumbnail is also displayed adjacent the second thumbnail in the first direction;

responsive to receiving a second user operation on the first thumbnail in a first time period, saving the first screenshot as a picture to a gallery, wherein the gallery does not comprise the second screenshot or the third screenshot after the second user operation; and responsive to receiving no user operation in the first time period, saving the first screenshot, the second screenshot and the third screenshot to the gallery together as a single picture.

13. The electronic device according to claim 12, wherein the electronic device is further enabled to:

responsive to receiving a third user operation on the first thumbnail, sending the first screenshot to the second application.

14. The electronic device according to claim 13, wherein the third user operation comprises an operation to share or insert the first screenshot.

15. The electronic device according to claim 13, wherein the third user operation comprises a sliding operation starting at the first thumbnail and ending at the second application.

16. The electronic device according to claim 12, wherein the first user operation comprises a pressing operation on a key combination.

17. The electronic device according to claim 12, wherein the first user operation comprises a sliding gesture, and wherein starting positions of the sliding gesture span across at least two of the first application, the second application and the third application.

18. The electronic device according to claim 12, wherein the first application and the second application are different types.

19. The electronic device according to claim 12, wherein the first thumbnail, the second thumbnail and the third thumbnail are displayed floating over the first screen.

20. The electronic device according to claim 12, wherein a size of the first thumbnail, the second thumbnail and the third thumbnail is smaller than a size of the first application, the second application and the third application, respectively.

21. The electronic device according to claim 12, wherein the third application is displayed adjacent the second application and the third thumbnail is also displayed adjacent the second thumbnail.

22. A non-transitory computer-readable storage medium, wherein the computer-readable storage medium stores a computer program, the computer program comprises program instructions, and when the program instructions are executed by a computer, the computer is enabled to perform:

displaying a first screen comprising three split-screens, wherein the three split-screens comprise a first application, a second application and a third application, and wherein the first application is displayed adjacent the second application in a first direction;

displaying, in response to a first user operation, a first thumbnail of a first screenshot corresponding to the first application, a second thumbnail of a second screenshot corresponding to the second application and a third thumbnail of a third screenshot corresponding to the third application, wherein the first thumbnail is also displayed adjacent the second thumbnail in the first direction;

responsive to receiving a second user operation on the first thumbnail in a first time period, saving the first screenshot as a picture to a gallery, wherein the gallery does not comprise the second screenshot or the third screenshot after the second user operation; and responsive to receiving no user operation in the first time period, saving the first screenshot, the second screenshot and the third screenshot to the gallery together as a single picture.

* * * * *